US011526590B2

(12) United States Patent
Wexler et al.

(10) Patent No.: US 11,526,590 B2
(45) Date of Patent: Dec. 13, 2022

(54) AUTOMATIC LOW RADIATION MODE FOR A WEARABLE DEVICE

(71) Applicant: Orcam Technologies Ltd., Jerusalem (IL)

(72) Inventors: Yonatan Wexler, Jerusalem (IL); Amnon Shashua, Mevaseret Zion (IL)

(73) Assignee: OrCam Technologies Ltd., Jerusalem (IL)

(*) Notice: Subject to any disclaimer, the term of this patent is extended or adjusted under 35 U.S.C. 154(b) by 293 days.

(21) Appl. No.: 16/856,281

(22) Filed: Apr. 23, 2020

(65) Prior Publication Data

US 2020/0250289 A1 Aug. 6, 2020

Related U.S. Application Data

(63) Continuation of application No. PCT/IB2018/001270, filed on Oct. 23, 2018.
(Continued)

(51) Int. Cl.
*G06F 21/32* (2013.01)
*G06F 1/16* (2006.01)
(Continued)

(52) U.S. Cl.
CPC ............ *G06F 21/32* (2013.01); *G06F 1/163* (2013.01); *G06F 3/011* (2013.01); *G06F 3/017* (2013.01); *H04L 9/3231* (2013.01)

(58) Field of Classification Search
CPC .. G06F 3/163; G06F 3/011–017; G06F 1/163; H04B 1/3838
See application file for complete search history.

(56) References Cited

U.S. PATENT DOCUMENTS 8,223,024 B1* 7/2012 Petrou .................. H04W 12/33
340/573.7
8,963,806 B1 2/2015 Starner et al.
(Continued)

FOREIGN PATENT DOCUMENTS

| EP | 2922212 | 9/2015 |
|----|---------|--------|
| EP | 3118762 | 1/2017 |
| WO | WO2015051253 | 4/2015 |

OTHER PUBLICATIONS

International Search Report and Written Opinion issued in PCT International Application No. PCT/IB2018/001270, dated Apr. 1, 2019, 19 pages.

*Primary Examiner* — Patrick F Marinelli
(74) *Attorney, Agent, or Firm* — Finnegan, Henderson, Farabow, Garrett & Dunner, LLP

(57) ABSTRACT

A wearable device may include a housing, a sensor in the housing configured to generate an output, and a transmitter in the housing. The wearable device may also include a processor programmed to alternatively operate in a normal radiation mode and a low radiation mode. The transmitter may be permitted to function at a normal capacity when operating in the normal radiation mode and may be caused to function at a reduced capacity when operating in the low radiation mode. During operation at the normal capacity, the transmitter may transmit at a higher radiation intensity than during operation at the reduced capacity. The processor may also be programmed to detect, based on the output generated by the sensor, whether the housing is currently worn by the user, and cause the transmitter to operate in the low radiation mode after detecting that the housing is being worn by the user.

25 Claims, 35 Drawing Sheets

Related U.S. Application Data

(60) Provisional application No. 62/578,769, filed on Oct. 30, 2017, provisional application No. 62/576,311, filed on Oct. 24, 2017.

(51) Int. Cl.
*G06F 3/01* (2006.01)
*H04L 9/32* (2006.01)

(56) References Cited

U.S. PATENT DOCUMENTS

| | | | | |
|---|---|---|---|---|
| 11,089,416 B1* | 8/2021 | Zhong | | H04R 29/004 |
| 11,288,933 B1* | 3/2022 | Zalewski | | G06Q 30/0633 |
| 11,296,904 B1* | 4/2022 | Benyamin | | H04L 12/40045 |
| 2003/0148760 A1* | 8/2003 | Takayanagi | | H04W 88/02 |
| | | | | 455/420 |
| 2008/0273795 A1* | 11/2008 | Ofek | | G06V 10/50 |
| | | | | 382/170 |
| 2009/0193109 A1* | 7/2009 | Kuo | | G06F 1/3209 |
| | | | | 713/320 |
| 2012/0068914 A1* | 3/2012 | Jacobsen | | G06F 1/163 |
| | | | | 345/8 |
| 2012/0212593 A1* | 8/2012 | Na'aman | | G06V 20/20 |
| | | | | 348/E7.085 |
| 2013/0035110 A1* | 2/2013 | Sridhara | | G01S 5/0205 |
| | | | | 455/456.1 |
| 2014/0085050 A1 | 3/2014 | Luna | | |
| 2015/0029088 A1* | 1/2015 | Kim | | G02B 27/017 |
| | | | | 345/156 |
| 2015/0135310 A1 | 5/2015 | Lee | | |
| 2015/0215443 A1* | 7/2015 | Heo | | H04M 1/05 |
| | | | | 455/556.1 |
| 2015/0271766 A1* | 9/2015 | Gao | | A61B 5/0022 |
| | | | | 455/127.2 |
| 2016/0118015 A1* | 4/2016 | Stamer | | G06F 3/147 |
| | | | | 345/8 |
| 2016/0142816 A1 | 5/2016 | Weast et al. | | |
| 2016/0170493 A1* | 6/2016 | Park | | B60K 37/06 |
| | | | | 345/156 |
| 2016/0283808 A1 | 9/2016 | Oganezov et al. | | |
| 2017/0017785 A1 | 1/2017 | Rice et al. | | |
| 2017/0038848 A1 | 2/2017 | Yuen et al. | | |
| 2017/0041856 A1* | 2/2017 | Kim | | H04W 4/029 |
| 2017/0160819 A1* | 6/2017 | Yi | | G06F 3/0445 |
| 2017/0181093 A1* | 6/2017 | Lin | | G04G 19/12 |
| 2017/0273033 A1* | 9/2017 | Lee | | H04W 52/283 |
| 2018/0246334 A1* | 8/2018 | Yajima | | G06F 3/14 |
| 2019/0182415 A1* | 6/2019 | Sivan | | G06F 3/012 |
| 2019/0302484 A1* | 10/2019 | Zhang | | A61B 90/50 |
| 2020/0250289 A1* | 8/2020 | Wexler | | G06F 1/163 |
| 2020/0252218 A1* | 8/2020 | Wexler | | H04L 9/3231 |
| 2020/0383024 A1* | 12/2020 | Nie | | H04W 24/08 |
| 2022/0100760 A1* | 3/2022 | De Santis | | G06F 12/0238 |

* cited by examiner

AUTOMATIC LOW RADIATION MODE FOR A WEARABLE DEVICE

CROSS REFERENCES TO RELATED APPLICATIONS

This application claims the benefit of priority of International Application No. PCT/IB2018/001270, filed Oct. 23, 2018, which claims the benefit of priority to U.S. Provisional Patent Application No. 62/576,311, filed Oct. 24, 2017, and of U.S. Provisional Patent Application No. 62/578,769, filed Oct. 30, 2017, which is incorporated herein by reference in its entirety. All of the foregoing are incorporated herein by reference in their entirety.

BACKGROUND

Technical Field

This disclosure generally relates to devices and methods for capturing and processing images from an environment of a user, and to devices and methods for using information derived from captured images.

Background Information

Today, technological advancements make it possible for wearable devices to automatically capture images and store information that is associated with the captured images. Certain devices have been used to digitally record aspects and personal experiences of one's life in an exercise typically called "lifelogging." Some individuals log their life so they can retrieve moments from past activities, for example, social events, trips, etc. Lifelogging may also have significant benefits in other fields (e.g., business, fitness and healthcare, and social research). Lifelogging devices, while useful for tracking daily activities, may be improved with capability to enhance one's interaction in his environment with feedback and other advanced functionality based on the analysis of captured image data.

Even though users can capture images with their smartphones and some smartphone applications can process the captured images, smartphones may not be the best platform for serving as lifelogging apparatuses in view of their size and design. Lifelogging apparatuses should be small and light, so they can be easily worn. Moreover, with improvements in image capture devices, including wearable apparatuses, additional functionality may be provided to assist users in navigating in and around an environment, identifying persons and objects they encounter, and providing feedback to the users about their surroundings and activities. Therefore, there is a need for apparatuses and methods for automatically capturing and processing images to provide useful information to users of the apparatuses, and for systems and methods to process and leverage information gathered by the apparatuses.

SUMMARY

Embodiments consistent with the present disclosure provide devices and methods for automatically capturing and processing images from an environment of a user, and systems and methods for processing information related to images captured from the environment of the user.

In one embodiment, a wearable device for authenticating an identity of a wearer may comprise a housing configured to be worn by the wearer and at least one sensor in the housing. The at least one sensor may be configured to generate an output indicative of at least one aspect of an environment of the wearer and at least one processor. The at least one processor may be programmed to: alternatively operate in an unrestricted operation mode and a restricted operation mode; detect, based on the output generated by the at least one sensor, whether the wearer of the housing is authenticated with the wearable device; and operate in the unrestricted operation mode after the at least one processor detects that the wearer of the housing is authenticated with the wearable device.

In one embodiment, a system for authenticating an identity of a wearer of a wearable device may comprise at least one processing device. The at least one processing device may be programmed to: analyze authentication information captured by at least one sensor included in the wearable device; determine, based on the authentication information, whether the wearer of the wearable device is authenticated with the wearable device; and operate in an unrestricted operation mode after the at least one processor determines that the wearer is authenticated with the wearable device.

In one embodiment, a method for authenticating an identity of a wearer of a wearable device may comprise: analyzing, via at least one processor included in the wearable device, authentication information captured by at least one sensor included in the wearable device; determining, based on the authentication information, whether the wearer of the wearable device is authenticated with the wearable device; and operating in an unrestricted operation mode after the at least one processor determines that the wearer is authenticated with the wearable device.

In one embodiment, a wearable device may comprise a housing configured to be worn by a user and at least one sensor in the housing. The at least one sensor may be configured to generate an output indicative of at least one aspect of an environment of the user. The wearable device may further comprise a transmitter in the housing and at least one processor. The at least one processor may be programmed to: alternatively operate in a normal radiation mode and a low radiation mode, wherein the transmitter is permitted to function at a normal capacity when operating in the normal radiation mode and the transmitter is caused to function at a reduced capacity when operating in the low radiation mode, and during operation at the normal capacity the transmitter transmits at a higher radiation intensity than during operation at the reduced capacity; detect, based on the output generated by the at least one sensor, whether the housing is currently worn by the user; and cause the transmitter to operate in the low radiation mode after detecting that the housing is being worn by the user.

In one embodiment, a wearable device may comprise a housing configured to be worn by a user and at least one sensor in the housing. The at least one sensor may be configured to generate an output indicative of at least one aspect of an environment of the user. The wearable device may further comprise a transmitter in the housing and at least one processor. The at least one processor may be programmed to: alternatively operate in a normal radiation mode and a low radiation mode, wherein the transmitter is permitted to function at a normal capacity when operating in the normal radiation mode and the transmitter is caused to function at a reduced capacity when operating in the low radiation mode, and during operation at the normal capacity the transmitter transmits at a higher radiation intensity than during operation at the reduced capacity; detect, based on the output generated by at least one sensor, whether the housing is in an environment associated with the low radiation mode; and cause the transmitter to operate in the low radiation mode after detecting the housing is in an environment associated with the low radiation mode.

In one embodiment, a system for managing radiation exposure of a wearer of a wearable device may comprise a housing configured to be worn by the wearer. The housing may comprise at least one sensor and at least one transmitter. The at least one transmitter may be permitted to function at a normal capacity when operating in a normal radiation mode and wherein the transmitter is caused to function at a reduced capacity when operating in a low radiation mode, such that during operation at the normal capacity the transmitter transmits at a higher radiation intensity than during operation at the reduced capacity. The system may further comprise at least one processor. The at least one processor may be programmed to: analyze information captured by the at least one sensor; determine, based on the analyzed information, that the housing is currently worn by the wearer; cause the at least one transmitter to operate in the low radiation mode when the wearable device is currently worn by the wearer.

In one embodiment, a method for reducing radiation to a wearer of a wearable device may comprise: analyzing, via at least one processor included in the wearable device, information captured by the at least one sensor; determining, based on the analyzed information, that a housing is currently worn by the wearer, the housing comprising the at least one sensor and at least one transmitter; causing the at least one transmitter to operate in a low radiation mode when the wearable device is currently worn by the wearer, wherein the at least one transmitter is permitted to function at a normal capacity when operating in a normal radiation mode and wherein the transmitter is caused to function at a reduced capacity when operating in the low radiation mode, such that during operation at the normal capacity the transmitter transmits at a higher radiation intensity than during operation at the reduced capacity.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1A:
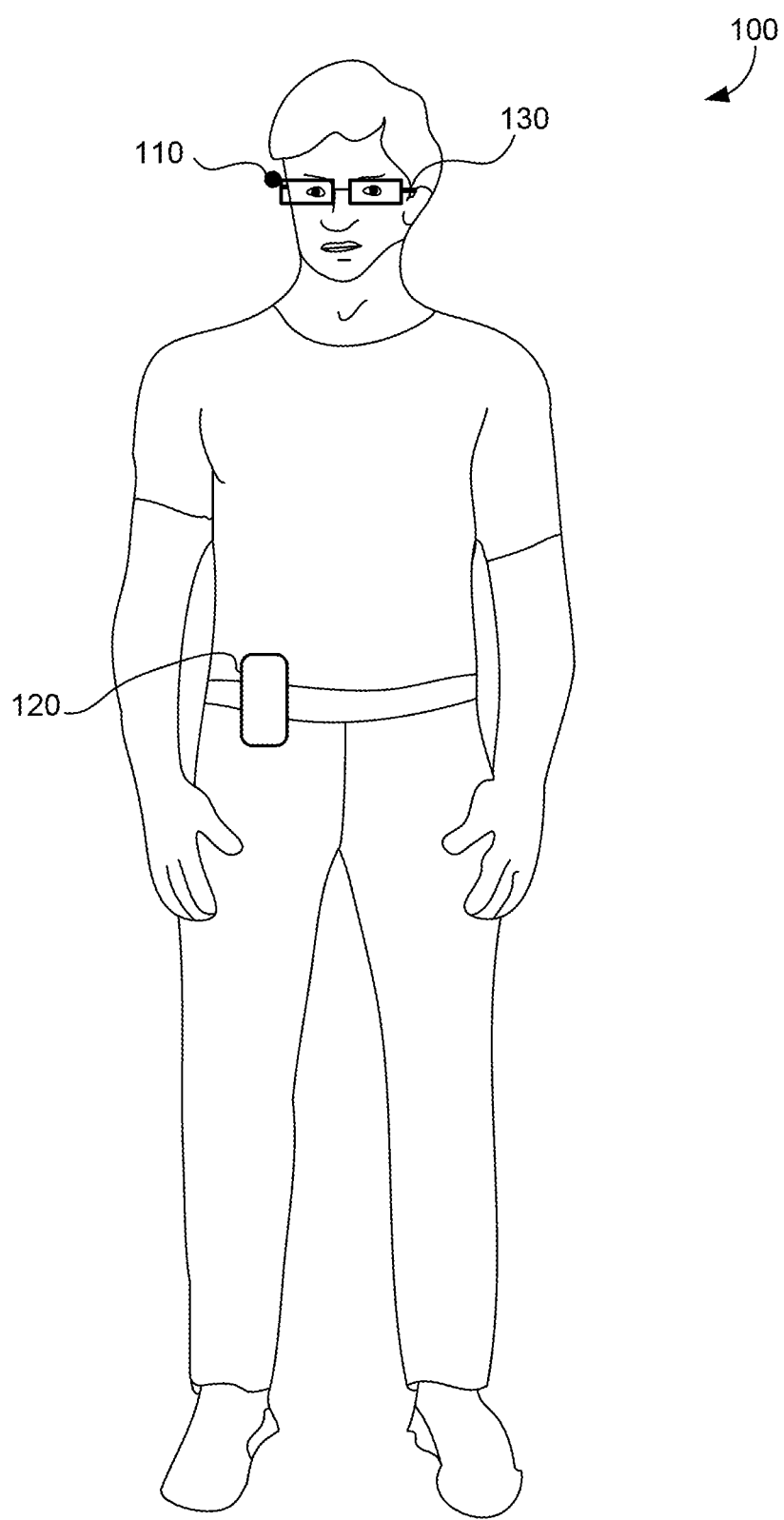
FIG. 1A is a schematic illustration of an example of a user wearing a wearable apparatus according to a disclosed embodiment.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1A illustrates a user 100 wearing an apparatus 110 that is physically connected (or integral) to glasses 130, consistent with the disclosed embodiments. Glasses 130 may be prescription glasses, magnifying glasses, non-prescription glasses, safety glasses, sunglasses, etc. Additionally, in some embodiments, glasses 130 may include parts of a frame and earpieces, nosepieces, etc., and one or no lenses. Thus, in some embodiments, glasses 130 may function primarily to support apparatus 110, and/or an augmented reality display device or other optical display device. In some embodiments, apparatus 110 may include an image sensor (not shown in FIG. 1A) for capturing real-time image data of the field-of-view of user 100. The term "image data" includes any form of data retrieved from optical signals in the near-infrared, infrared, visible, and ultraviolet spectrums. The image data may include video clips and/or photographs.

In some embodiments, apparatus 110 may communicate wirelessly or via a wire with a computing device 120. In some embodiments, computing device 120 may include, for example, a smartphone, or a tablet, or a dedicated processing unit, which may be portable (e.g., can be carried in a pocket of user 100). Although shown in FIG. 1A as an external device, in some embodiments, computing device 120 may be provided as part of wearable apparatus 110 or glasses 130, whether integral thereto or mounted thereon. In some embodiments, computing device 120 may be included in an augmented reality display device or optical head mounted display provided integrally or mounted to glasses 130. In other embodiments, computing device 120 may be provided as part of another wearable or portable apparatus of user 100 including a wrist-strap, a multifunctional watch, a button, a clip-on, etc. And in other embodiments, computing device 120 may be provided as part of another system, such as an on-board automobile computing or navigation system. A person skilled in the art can appreciate that different types of computing devices and arrangements of devices may implement the functionality of the disclosed embodiments. Accordingly, in other implementations, computing device 120 may include a Personal Computer (PC), laptop, an Internet server, etc.

Figure 1B:
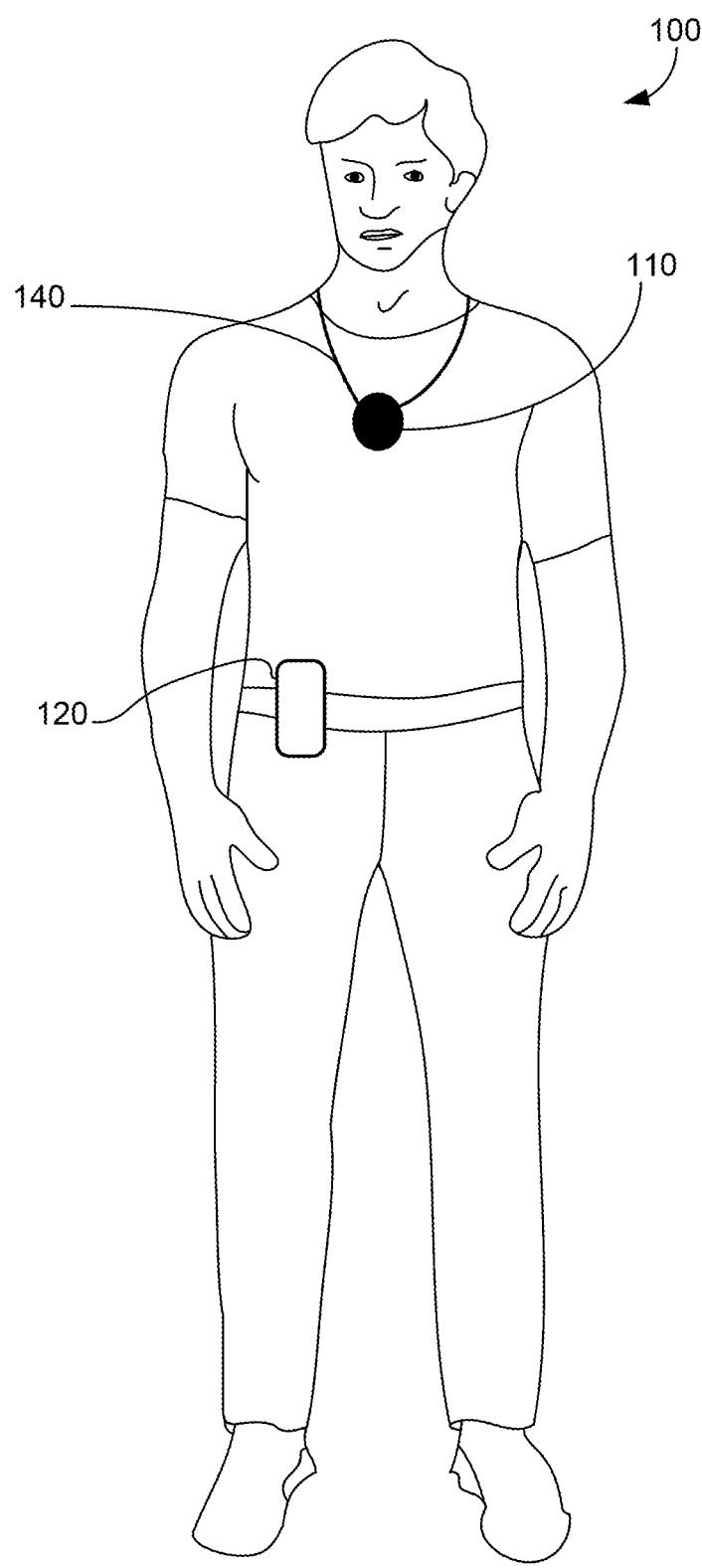
FIG. 1B is a schematic illustration of an example of the user wearing a wearable apparatus according to a disclosed embodiment.

FIG. 1B illustrates user 100 wearing apparatus 110 that is physically connected to a necklace 140, consistent with a disclosed embodiment. Such a configuration of apparatus 110 may be suitable for users that do not wear glasses some or all of the time. In this embodiment, user 100 can easily wear apparatus 110, and take it off.

Figure 1C:
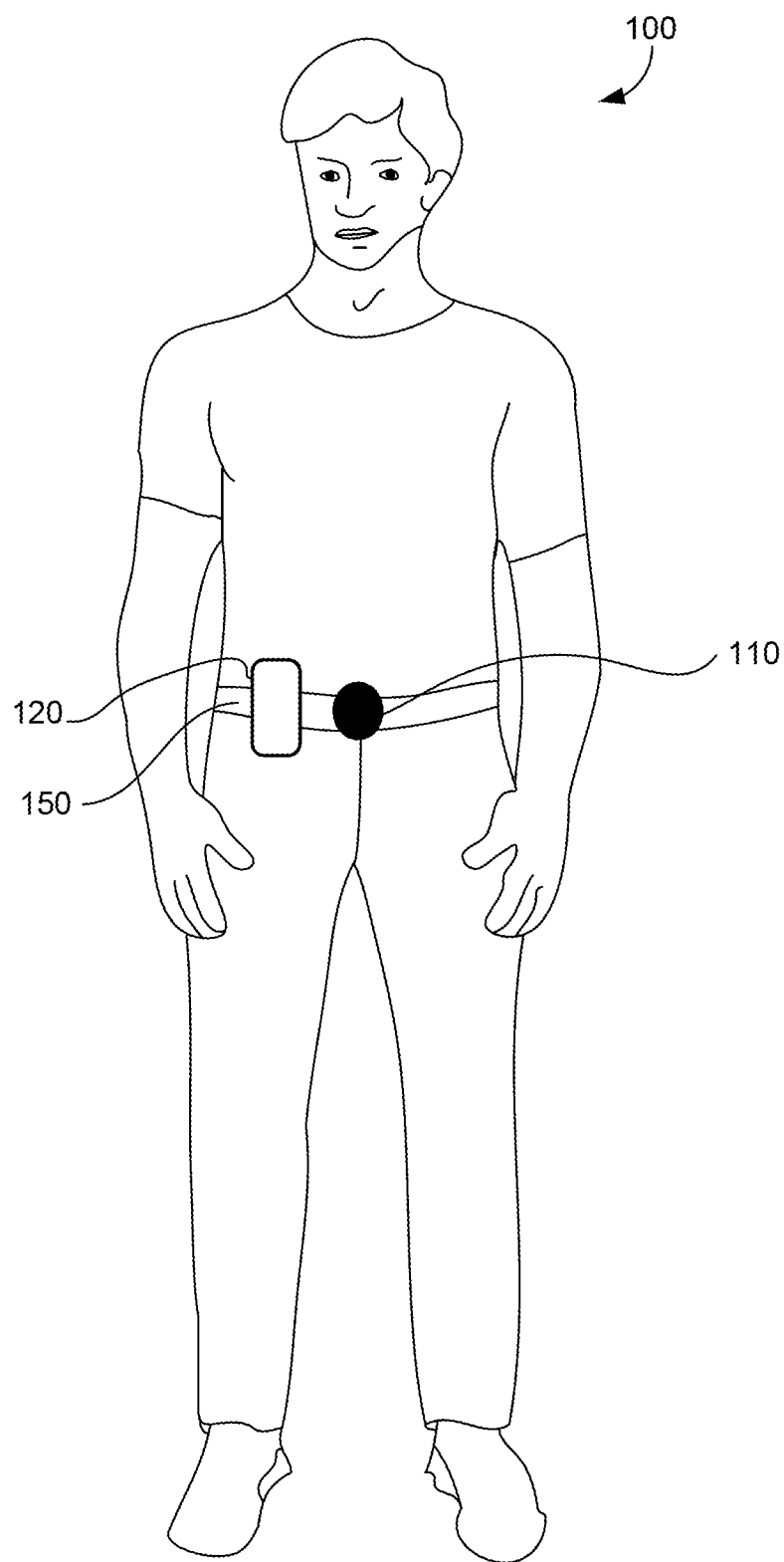
FIG. 1C is a schematic illustration of an example of the user wearing a wearable apparatus according to a disclosed embodiment.

FIG. 1C illustrates user 100 wearing apparatus 110 that is physically connected to a belt 150, consistent with a disclosed embodiment. Such a configuration of apparatus 110 may be designed as a belt buckle. Alternatively, apparatus 110 may include a clip for attaching to various clothing articles, such as belt 150, or a vest, a pocket, a collar, a cap or hat or other portion of a clothing article.

Figure 1D:
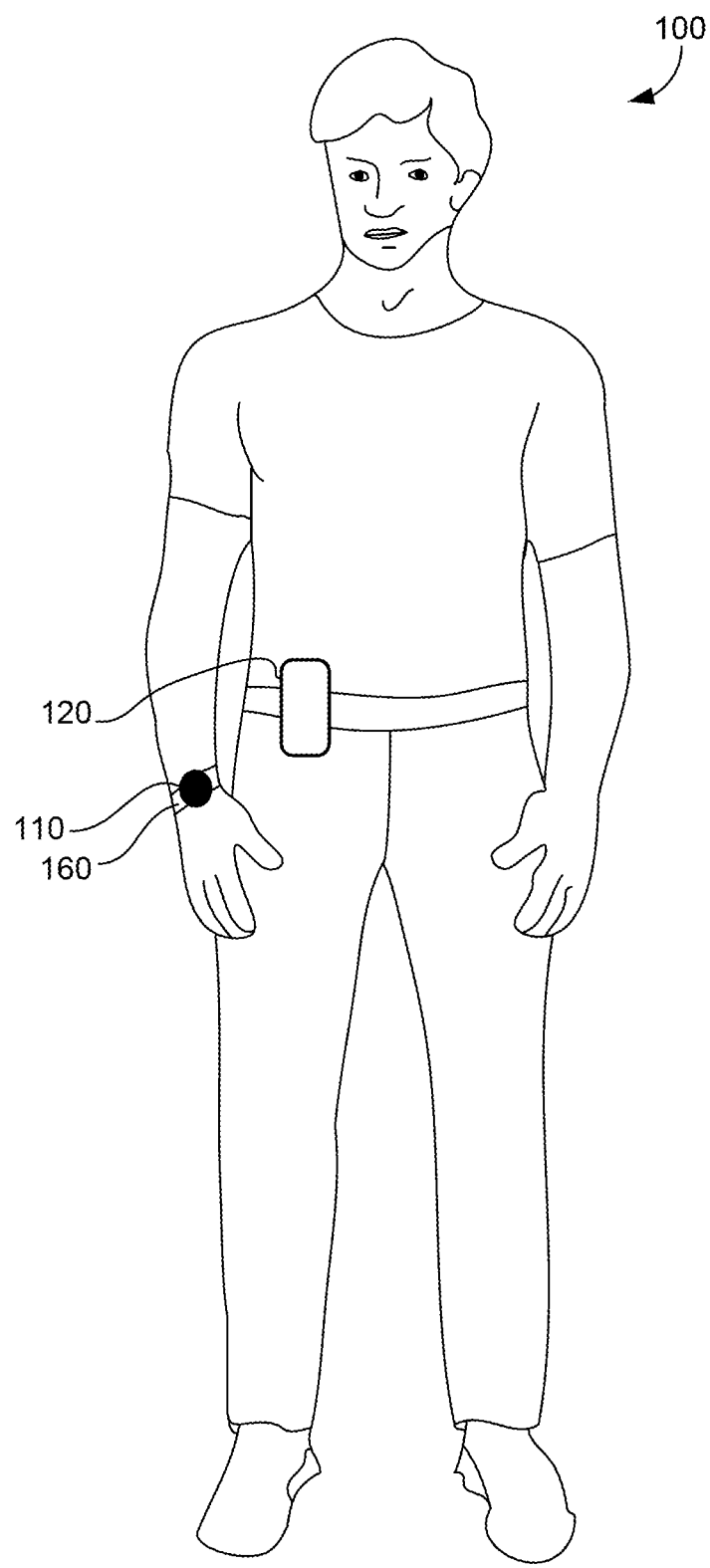
FIG. 1D is a schematic illustration of an example of the user wearing a wearable apparatus according to a disclosed embodiment.

FIG. 1D illustrates user 100 wearing apparatus 110 that is physically connected to a wrist strap 160, consistent with a disclosed embodiment. Although the aiming direction of apparatus 110, according to this embodiment, may not match the field-of-view of user 100, apparatus 110 may include the ability to identify a hand-related trigger based on the tracked eye movement of a user 100 indicating that user 100 is looking in the direction of the wrist strap 160. Wrist strap 160 may also include an accelerometer, a gyroscope, or other sensor for determining movement or orientation of a user's 100 hand for identifying a hand-related trigger.

Figure 2:
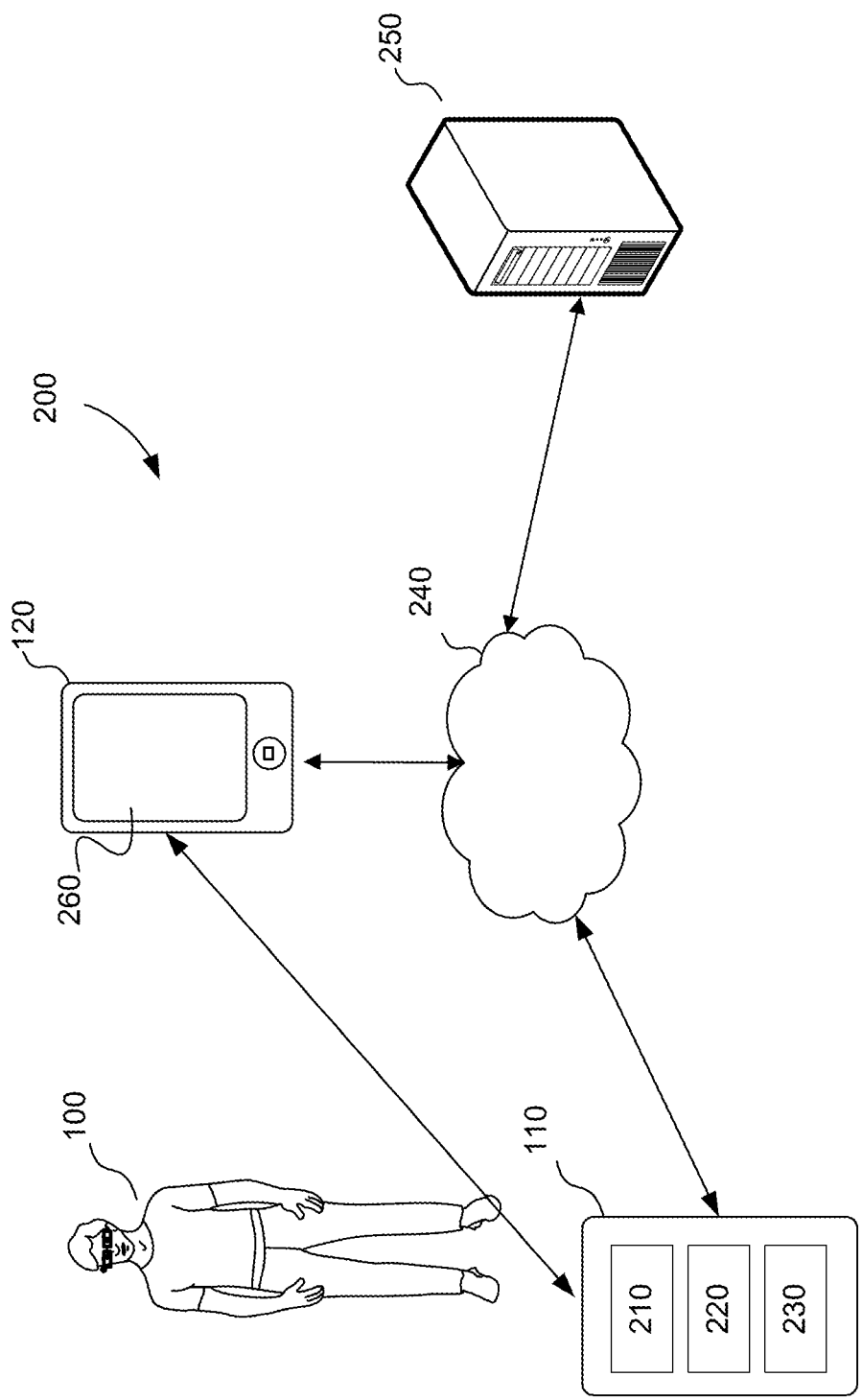
FIG. 2 is a schematic illustration of an example system consistent with the disclosed embodiments.

FIG. 2 is a schematic illustration of an exemplary system 200 including a wearable apparatus 110, worn by user 100, and an optional computing device 120 and/or a server 250 capable of communicating with apparatus 110 via a network 240, consistent with disclosed embodiments. In some embodiments, apparatus 110 may capture and analyze image data, identify a hand-related trigger present in the image data, and perform an action and/or provide feedback to a user 100, based at least in part on the identification of the hand-related trigger. In some embodiments, optional computing device 120 and/or server 250 may provide additional functionality to enhance interactions of user 100 with his or her environment, as described in greater detail below.

According to the disclosed embodiments, apparatus 110 may include an image sensor system 220 for capturing real-time image data of the field-of-view of user 100. In some embodiments, apparatus 110 may also include a processing unit 210 for controlling and performing the disclosed functionality of apparatus 110, such as to control the capture of image data, analyze the image data, and perform an action and/or output a feedback based on a hand-related trigger identified in the image data. According to the disclosed embodiments, a hand-related trigger may include a gesture performed by user 100 involving a portion of a hand of user 100. Further, consistent with some embodiments, a hand-related trigger may include a wrist-related trigger. Additionally, in some embodiments, apparatus 110 may include a feedback outputting unit 230 for producing an output of information to user 100.

As discussed above, apparatus 110 may include an image sensor 220 for capturing image data. The term "image sensor" refers to a device capable of detecting and converting optical signals in the near-infrared, infrared, visible, and ultraviolet spectrums into electrical signals. The electrical signals may be used to form an image or a video stream (i.e. image data) based on the detected signal. The term "image data" includes any form of data retrieved from optical signals in the near-infrared, infrared, visible, and ultraviolet spectrums. Examples of image sensors may include semiconductor charge-coupled devices (CCD), active pixel sensors in complementary metal-oxide-semiconductor (CMOS), or N-type metal-oxide-semiconductor (NMOS, Live MOS). In some cases, image sensor 220 may be part of a camera included in apparatus 110.

Apparatus 110 may also include a processor 210 for controlling image sensor 220 to capture image data and for analyzing the image data according to the disclosed embodiments. As discussed in further detail below with respect to FIG. 5A, processor 210 may include a "processing device" for performing logic operations on one or more inputs of image data and other data according to stored or accessible software instructions providing desired functionality. In some embodiments, processor 210 may also control feedback outputting unit 230 to provide feedback to user 100 including information based on the analyzed image data and the stored software instructions. As the term is used herein, a "processing device" may access memory where executable instructions are stored or, in some embodiments, a "processing device" itself may include executable instructions (e.g., stored in memory included in the processing device).

In some embodiments, the information or feedback information provided to user 100 may include time information. The time information may include any information related to a current time of day and, as described further below, may be presented in any sensory perceptive manner. In some embodiments, time information may include a current time of day in a preconfigured format (e.g., 2:30 pm or 14:30). Time information may include the time in the user's current time zone (e.g., based on a determined location of user 100), as well as an indication of the time zone and/or a time of day in another desired location. In some embodiments, time information may include a number of hours or minutes relative to one or more predetermined times of day. For example, in some embodiments, time information may include an indication that three hours and fifteen minutes remain until a particular hour (e.g., until 6:00 pm), or some other predetermined time. Time information may also include a duration of time passed since the beginning of a particular activity, such as the start of a meeting or the start of a jog, or any other activity. In some embodiments, the activity may be determined based on analyzed image data. In other embodiments, time information may also include additional information related to a current time and one or more other routine, periodic, or scheduled events. For example, time information may include an indication of the number of minutes remaining until the next scheduled event, as may be determined from a calendar function or other information retrieved from computing device 120 or server 250, as discussed in further detail below.

Feedback outputting unit 230 may include one or more feedback systems for providing the output of information to user 100. In the disclosed embodiments, the audible or visual feedback may be provided via any type of connected audible or visual system or both. Feedback of information according to the disclosed embodiments may include audible feedback to user 100 (e.g., using a Bluetooth™ or other wired or wirelessly connected speaker, or a bone conduction headphone). Feedback outputting unit 230 of some embodiments may additionally or alternatively produce a visible output of information to user 100, for example, as part of an augmented reality display projected onto a lens of glasses 130 or provided via a separate heads up display in communication with apparatus 110, such as a display 260 provided as part of computing device 120, which may include an onboard automobile heads up display, an augmented reality device, a virtual reality device, a smartphone, PC, table, etc.

The term "computing device" refers to a device including a processing unit and having computing capabilities. Some examples of computing device 120 include a PC, laptop, tablet, or other computing systems such as an on-board computing system of an automobile, for example, each configured to communicate directly with apparatus 110 or server 250 over network 240. Another example of computing device 120 includes a smartphone having a display 260. In some embodiments, computing device 120 may be a computing system configured particularly for apparatus 110 and may be provided integral to apparatus 110 or tethered thereto. Apparatus 110 can also connect to computing device 120 over network 240 via any known wireless standard (e.g., Wi-Fi, Bluetooth®, etc.), as well as near-filed capacitive coupling, and other short range wireless techniques, or via a wired connection. In an embodiment in which computing device 120 is a smartphone, computing device 120 may have a dedicated application installed therein. For example, user 100 may view on display 260 data (e.g., images, video clips, extracted information, feedback information, etc.) that originate from or are triggered by apparatus 110. In addition, user 100 may select part of the data for storage in server 250.

Network 240 may be a shared, public, or private network, may encompass a wide area or local area, and may be implemented through any suitable combination of wired and/or wireless communication networks. Network 240 may further comprise an intranet or the Internet. In some embodiments, network 240 may include short range or near-field wireless communication systems for enabling communication between apparatus 110 and computing device 120 provided in close proximity to each other, such as on or near a user's person, for example. Apparatus 110 may establish a connection to network 240 autonomously, for example, using a wireless module (e.g., Wi-Fi, cellular). In some embodiments, apparatus 110 may use the wireless module when being connected to an external power source, to prolong battery life. Further, communication between apparatus 110 and server 250 may be accomplished through any suitable communication channels, such as, for example, a telephone network, an extranet, an intranet, the Internet, satellite communications, off-line communications, wireless communications, transponder communications, a local area network (LAN), a wide area network (WAN), and a virtual private network (VPN).

As shown in FIG. 2, apparatus 110 may transfer or receive data to/from server 250 via network 240. In the disclosed embodiments, the data being received from server 250 and/or computing device 120 may include numerous different types of information based on the analyzed image data, including information related to a commercial product, or a person's identity, an identified landmark, and any other information capable of being stored in or accessed by server 250. In some embodiments, data may be received and transferred via computing device 120. Server 250 and/or computing device 120 may retrieve information from different data sources (e.g., a user specific database or a user's social network account or other account, the Internet, and other managed or accessible databases) and provide information to apparatus 110 related to the analyzed image data and a recognized trigger according to the disclosed embodiments. In some embodiments, calendar-related information retrieved from the different data sources may be analyzed to provide certain time information or a time-based context for providing certain information based on the analyzed image data.

Figure 3A:
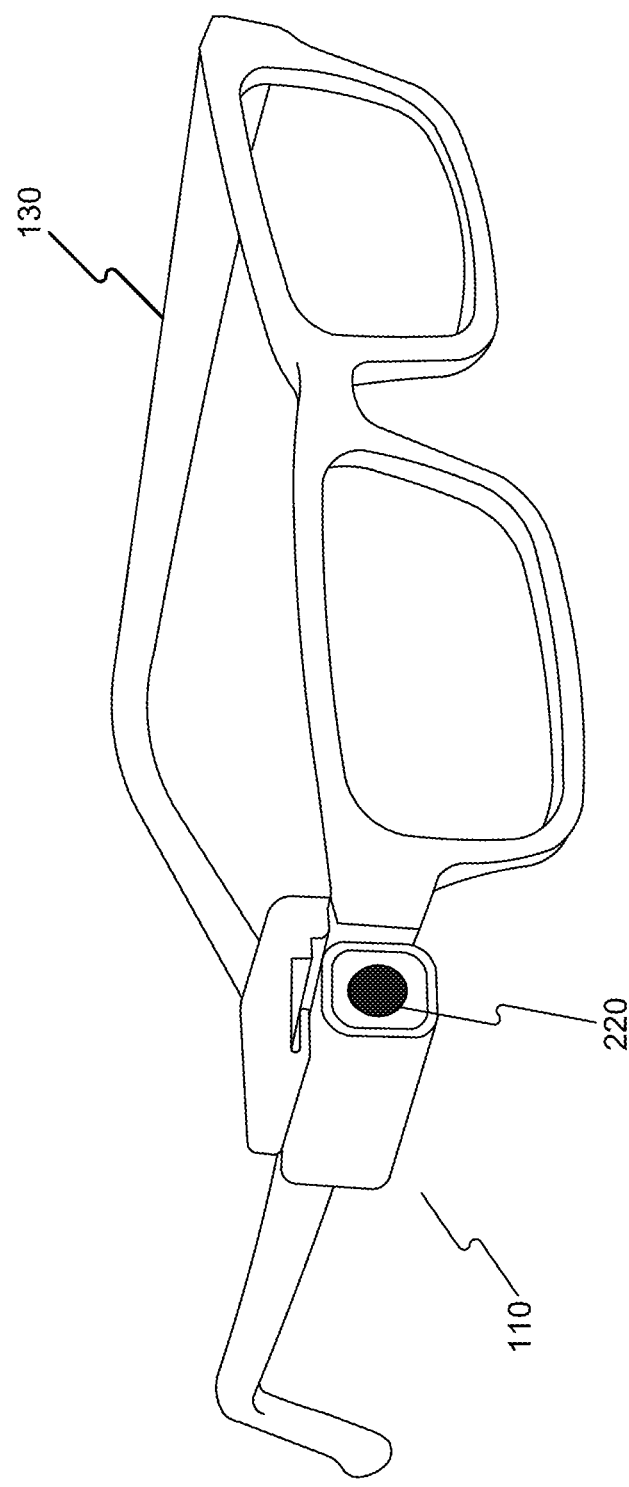
FIG. 3A is a schematic illustration of an example of the wearable apparatus shown in FIG. 1A.

An example of wearable apparatus 110 incorporated with glasses 130 according to some embodiments (as discussed in connection with FIG. 1A) is shown in greater detail in FIG. 3A. In some embodiments, apparatus 110 may be associated with a structure (not shown in FIG. 3A) that enables easy detaching and reattaching of apparatus 110 to glasses 130. In some embodiments, when apparatus 110 attaches to glasses 130, image sensor 220 acquires a set aiming direction without the need for directional calibration. The set aiming direction of image sensor 220 may substantially coincide with the field-of-view of user 100. For example, a camera associated with image sensor 220 may be installed within apparatus 110 in a predetermined angle in a position facing slightly downwards (e.g., 5-15 degrees from the horizon). Accordingly, the set aiming direction of image sensor 220 may substantially match the field-of-view of user 100.

Figure 3B:
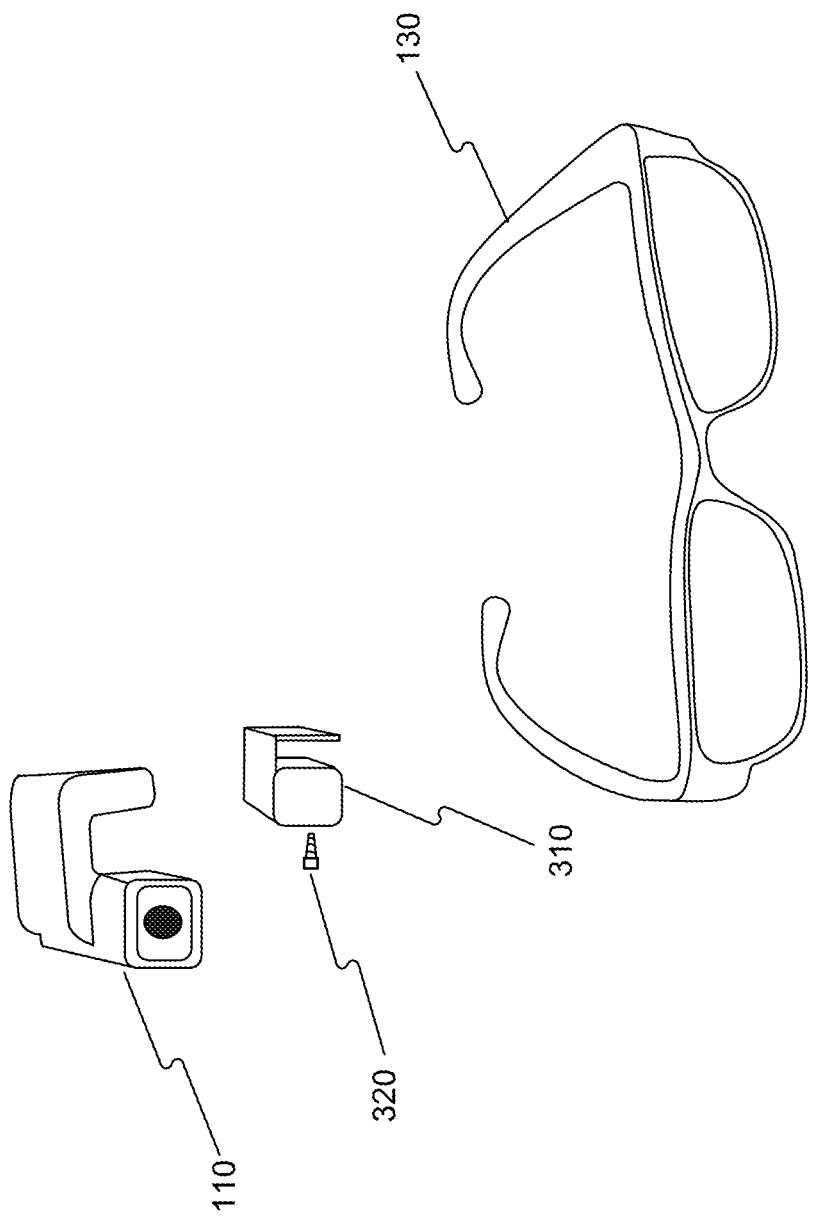
FIG. 3B is an exploded view of the example of the wearable apparatus shown in FIG. 3A.

FIG. 3B is an exploded view of the components of the embodiment discussed regarding FIG. 3A. Attaching apparatus 110 to glasses 130 may take place in the following way. Initially, a support 310 may be mounted on glasses 130 using a screw 320, in the side of support 310. Then, apparatus 110 may be clipped on support 310 such that it is aligned with the field-of-view of user 100. The term "support" includes any device or structure that enables detaching and reattaching of a device including a camera to a pair of glasses or to another object (e.g., a helmet). Support 310 may be made from plastic (e.g., polycarbonate), metal (e.g., aluminum), or a combination of plastic and metal (e.g., carbon fiber graphite). Support 310 may be mounted on any kind of glasses (e.g., eyeglasses, sunglasses, 3D glasses, safety glasses, etc.) using screws, bolts, snaps, or any fastening means used in the art.

In some embodiments, support 310 may include a quick release mechanism for disengaging and reengaging apparatus 110. For example, support 310 and apparatus 110 may include magnetic elements. As an alternative example, support 310 may include a male latch member and apparatus 110 may include a female receptacle. In other embodiments, support 310 can be an integral part of a pair of glasses, or sold separately and installed by an optometrist. For example, support 310 may be configured for mounting on the arms of glasses 130 near the frame front, but before the hinge. Alternatively, support 310 may be configured for mounting on the bridge of glasses 130.

In some embodiments, apparatus 110 may be provided as part of a glasses frame 130, with or without lenses. Additionally, in some embodiments, apparatus 110 may be configured to provide an augmented reality display projected onto a lens of glasses 130 (if provided), or alternatively, may include a display for projecting time information, for example, according to the disclosed embodiments. Apparatus 110 may include the additional display or alternatively, may be in communication with a separately provided display system that may or may not be attached to glasses 130.

Figure 4A:
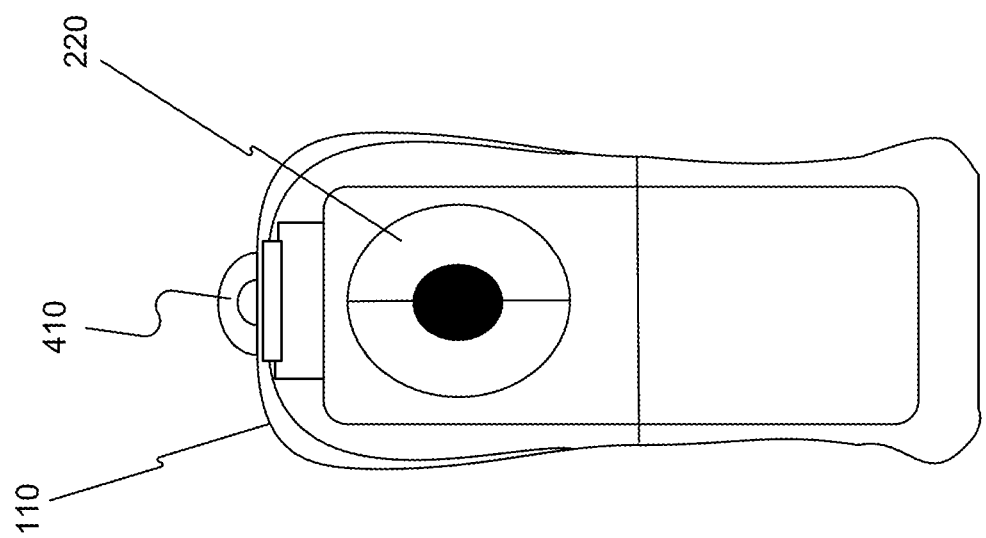
FIG. 4A is a schematic illustration of an example of the wearable apparatus shown in FIG. 1B from a first viewpoint.

In some embodiments, apparatus 110 may be implemented in a form other than wearable glasses, as described above with respect to FIGS. 1B-1D, for example. FIG. 4A is a schematic illustration of an example of an additional embodiment of apparatus 110 from a first viewpoint. The viewpoint shown in FIG. 4A is from the front of apparatus 110. Apparatus 110 includes an image sensor 220, a clip (not shown), a function button (not shown) and a hanging ring 410 for attaching apparatus 110 to, for example, necklace 140, as shown in FIG. 1B. When apparatus 110 hangs on necklace 140, the aiming direction of image sensor 220 may not fully coincide with the field-of-view of user 100, but the aiming direction would still correlate with the field-of-view of user 100.

Figure 4B:
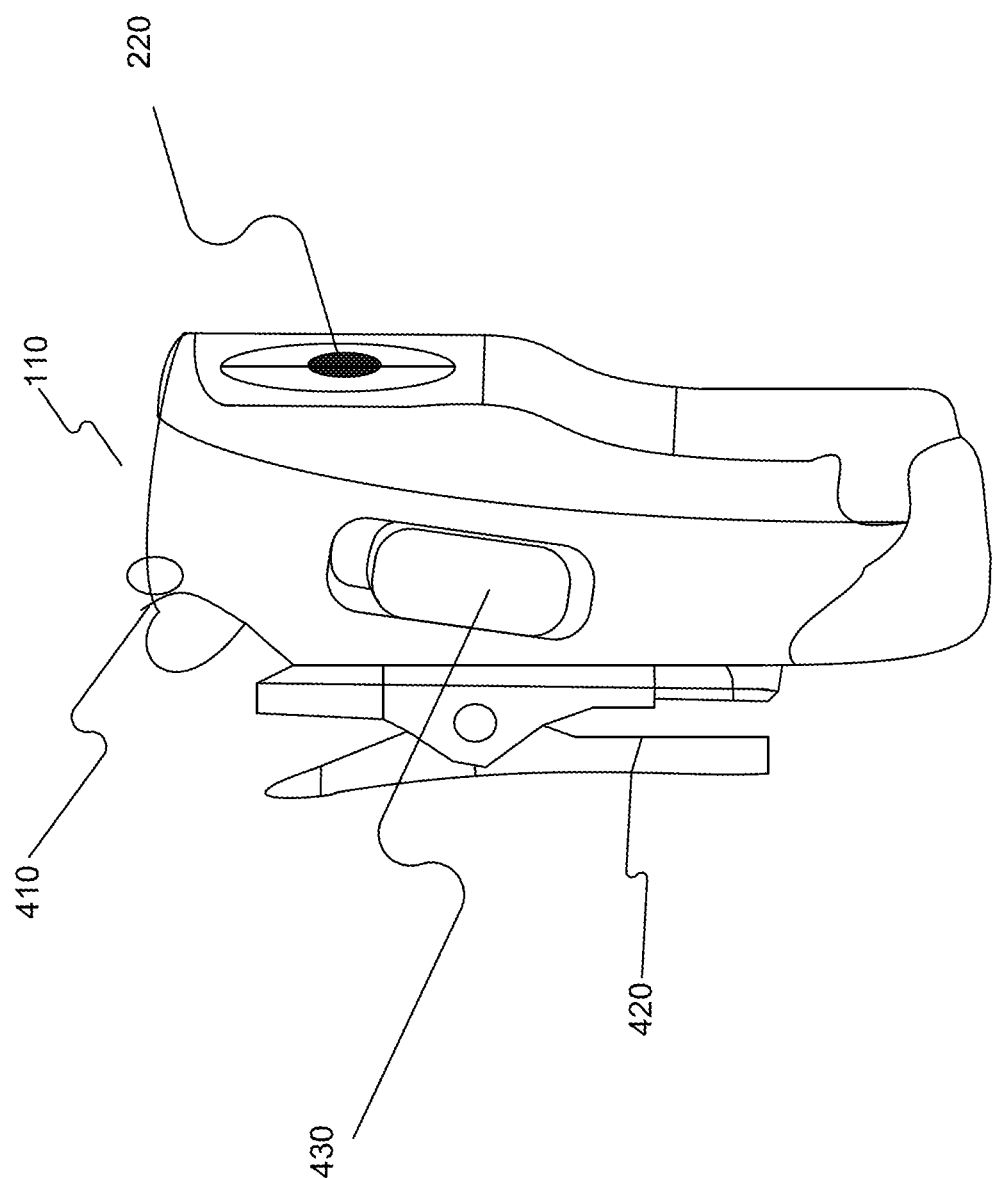
FIG. 4B is a schematic illustration of the example of the wearable apparatus shown in FIG. 1B from a second viewpoint.

FIG. 4B is a schematic illustration of the example of a second embodiment of apparatus 110, from a second viewpoint. The viewpoint shown in FIG. 4B is from a side orientation of apparatus 110. In addition to hanging ring 410, as shown in FIG. 4B, apparatus 110 may further include a clip 420. User 100 can use clip 420 to attach apparatus 110 to a shirt or belt 150, as illustrated in FIG. 1C. Clip 420 may provide an easy mechanism for disengaging and reengaging apparatus 110 from different articles of clothing. In other embodiments, apparatus 110 may include a female receptacle for connecting with a male latch of a car mount or universal stand.

In some embodiments, apparatus 110 includes a function button 430 for enabling user 100 to provide input to apparatus 110. Function button 430 may accept different types of tactile input (e.g., a tap, a click, a double-click, a long press, a right-to-left slide, a left-to-right slide). In some embodiments, each type of input may be associated with a different action. For example, a tap may be associated with the function of taking a picture, while a right-to-left slide may be associated with the function of recording a video.

The example embodiments discussed above with respect to FIGS. 3A, 3B, 4A, and 4B are not limiting. In some embodiments, apparatus 110 may be implemented in any suitable configuration for performing the disclosed methods. For example, referring back to FIG. 2, the disclosed embodiments may implement an apparatus 110 according to any configuration including an image sensor 220 and a processor unit 210 to perform image analysis and for communicating with a feedback unit 230.

Figure 5A:
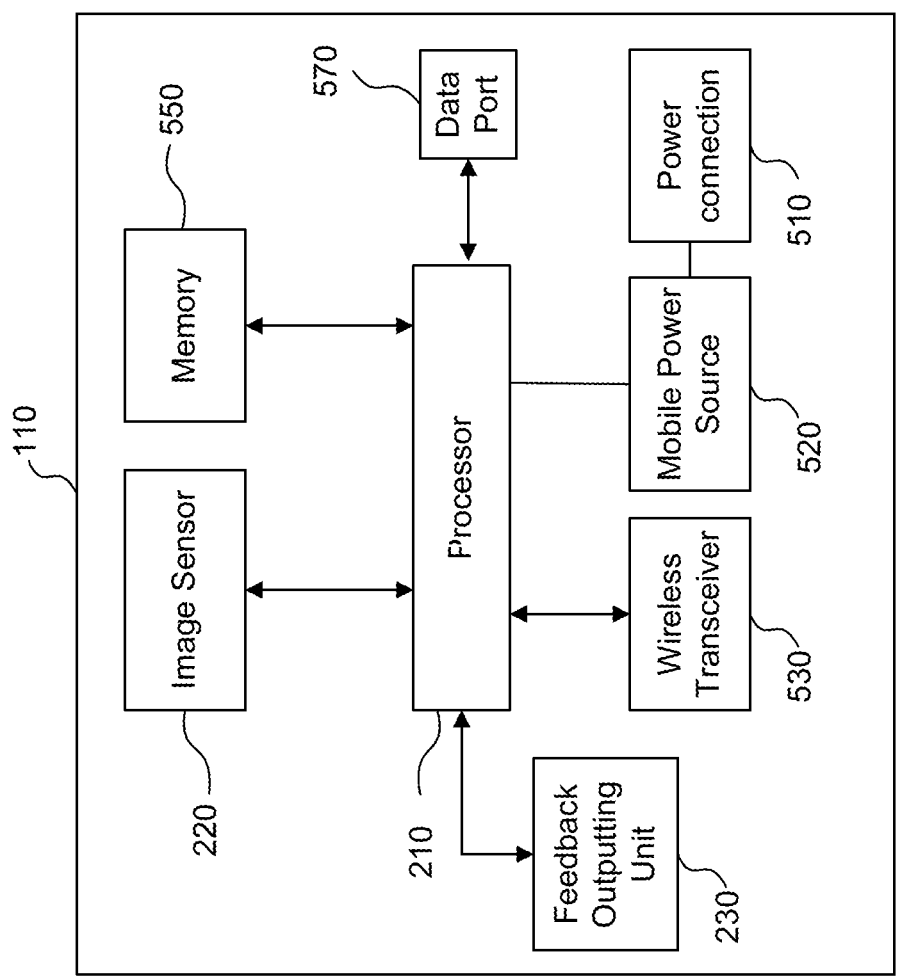
FIG. 5A is a block diagram illustrating an example of the components of a wearable apparatus according to a first embodiment.

FIG. 5A is a block diagram illustrating the components of apparatus 110 according to an example embodiment. As shown in FIG. 5A, and as similarly discussed above, apparatus 110 includes an image sensor 220, a memory 550, a processor 210, a feedback outputting unit 230, a wireless transceiver 530, and a mobile power source 520. In other embodiments, apparatus 110 may also include buttons, other sensors such as a microphone, and inertial measurements devices such as accelerometers, gyroscopes, magnetometers, temperature sensors, color sensors, light sensors, etc. Apparatus 110 may further include a data port 570 and a power connection 510 with suitable interfaces for connecting with an external power source or an external device (not shown).

Processor 210, depicted in FIG. 5A, may include any suitable processing device. The term "processing device" includes any physical device having an electric circuit that performs a logic operation on input or inputs. For example, processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the processing device may, for example, be pre-loaded into a memory integrated with or embedded into the processing device or may be stored in a separate memory (e.g., memory 550). Memory 550 may comprise a Random Access Memory (RAM), a Read-Only Memory (ROM), a hard disk, an optical disk, a magnetic medium, a flash memory, other permanent, fixed, or volatile memory, or any other mechanism capable of storing instructions.

Although, in the embodiment illustrated in FIG. 5A, apparatus 110 includes one processing device (e.g., processor 210), apparatus 110 may include more than one processing device. Each processing device may have a similar construction, or the processing devices may be of differing constructions that are electrically connected or disconnected from each other. For example, the processing devices may be separate circuits or integrated in a single circuit. When more than one processing device is used, the processing devices may be configured to operate independently or collaboratively. The processing devices may be coupled electrically, magnetically, optically, acoustically, mechanically or by other means that permit them to interact.

In some embodiments, processor 210 may process a plurality of images captured from the environment of user 100 to determine different parameters related to capturing subsequent images. For example, processor 210 can determine, based on information derived from captured image data, a value for at least one of the following: an image resolution, a compression ratio, a cropping parameter, frame rate, a focus point, an exposure time, an aperture size, and a light sensitivity. The determined value may be used in capturing at least one subsequent image. Additionally, processor 210 can detect images including at least one hand-related trigger in the environment of the user and perform an action and/or provide an output of information to a user via feedback outputting unit 230.

In another embodiment, processor 210 can change the aiming direction of image sensor 220. For example, when apparatus 110 is attached with clip 420, the aiming direction of image sensor 220 may not coincide with the field-of-view of user 100. Processor 210 may recognize certain situations from the analyzed image data and adjust the aiming direction of image sensor 220 to capture relevant image data. For example, in one embodiment, processor 210 may detect an interaction with another individual and sense that the individual is not fully in view, because image sensor 220 is tilted down. Responsive thereto, processor 210 may adjust the aiming direction of image sensor 220 to capture image data of the individual. Other scenarios are also contemplated where processor 210 may recognize the need to adjust an aiming direction of image sensor 220.

In some embodiments, processor 210 may communicate data to feedback-outputting unit 230, which may include any device configured to provide information to a user 100. Feedback outputting unit 230 may be provided as part of apparatus 110 (as shown) or may be provided external to apparatus 110 and communicatively coupled thereto. Feedback-outputting unit 230 may be configured to output visual or nonvisual feedback based on signals received from processor 210, such as when processor 210 recognizes a hand-related trigger in the analyzed image data.

The term "feedback" refers to any output or information provided in response to processing at least one image in an environment. In some embodiments, as similarly described above, feedback may include an audible or visible indication of time information, detected text or numerals, the value of currency, a branded product, a person's identity, the identity of a landmark or other environmental situation or condition including the street names at an intersection or the color of a traffic light, etc., as well as other information associated with each of these. For example, in some embodiments, feedback may include additional information regarding the amount of currency still needed to complete a transaction, information regarding the identified person, historical information or times and prices of admission etc. of a detected landmark, etc. In some embodiments, feedback may include an audible tone, a tactile response, and/or information previously recorded by user 100. Feedback-outputting unit 230 may comprise appropriate components for outputting acoustical and tactile feedback. For example, feedback-outputting unit 230 may comprise audio headphones, a hearing aid type device, a speaker, a bone conduction headphone, interfaces that provide tactile cues, vibrotactile stimulators, etc. In some embodiments, processor 210 may communicate signals with an external feedback outputting unit 230 via a wireless transceiver 530, a wired connection, or some other communication interface. In some embodiments, feedback outputting unit 230 may also include any suitable display device for visually displaying information to user 100.

As shown in FIG. 5A, apparatus 110 includes memory 550. Memory 550 may include one or more sets of instructions accessible to processor 210 to perform the disclosed methods, including instructions for recognizing a hand-related trigger in the image data. In some embodiments memory 550 may store image data (e.g., images, videos) captured from the environment of user 100. In addition, memory 550 may store information specific to user 100, such as image representations of known individuals, favorite products, personal items, and calendar or appointment information, etc. In some embodiments, processor 210 may determine, for example, which type of image data to store based on available storage space in memory 550. In another embodiment, processor 210 may extract information from the image data stored in memory 550.

As further shown in FIG. 5A, apparatus 110 includes mobile power source 520. The term "mobile power source" includes any device capable of providing electrical power, which can be easily carried by hand (e.g., mobile power source 520 may weigh less than a pound). The mobility of the power source enables user 100 to use apparatus 110 in a variety of situations. In some embodiments, mobile power source 520 may include one or more batteries (e.g., nickel-cadmium batteries, nickel-metal hydride batteries, and lithium-ion batteries) or any other type of electrical power supply. In other embodiments, mobile power source 520 may be rechargeable and contained within a casing that holds apparatus 110. In yet other embodiments, mobile power source 520 may include one or more energy harvesting devices for converting ambient energy into electrical energy (e.g., portable solar power units, human vibration units, etc.).

Mobile power source 520 may power one or more wireless transceivers (e.g., wireless transceiver 530 in FIG. 5A). The term "wireless transceiver" refers to any device configured to exchange transmissions over an air interface by use of radio frequency, infrared frequency, magnetic field, or electric field. Wireless transceiver 530 may use any known standard to transmit and/or receive data (e.g., Wi-Fi, Bluetooth®, Bluetooth Smart, 802.15.4, or ZigBee). In some embodiments, wireless transceiver 530 may transmit data (e.g., raw image data, processed image data, extracted information) from apparatus 110 to computing device 120 and/or server 250. Wireless transceiver 530 may also receive data from computing device 120 and/or server 250. In other embodiments, wireless transceiver 530 may transmit data and instructions to an external feedback outputting unit 230.

Figure 5B:
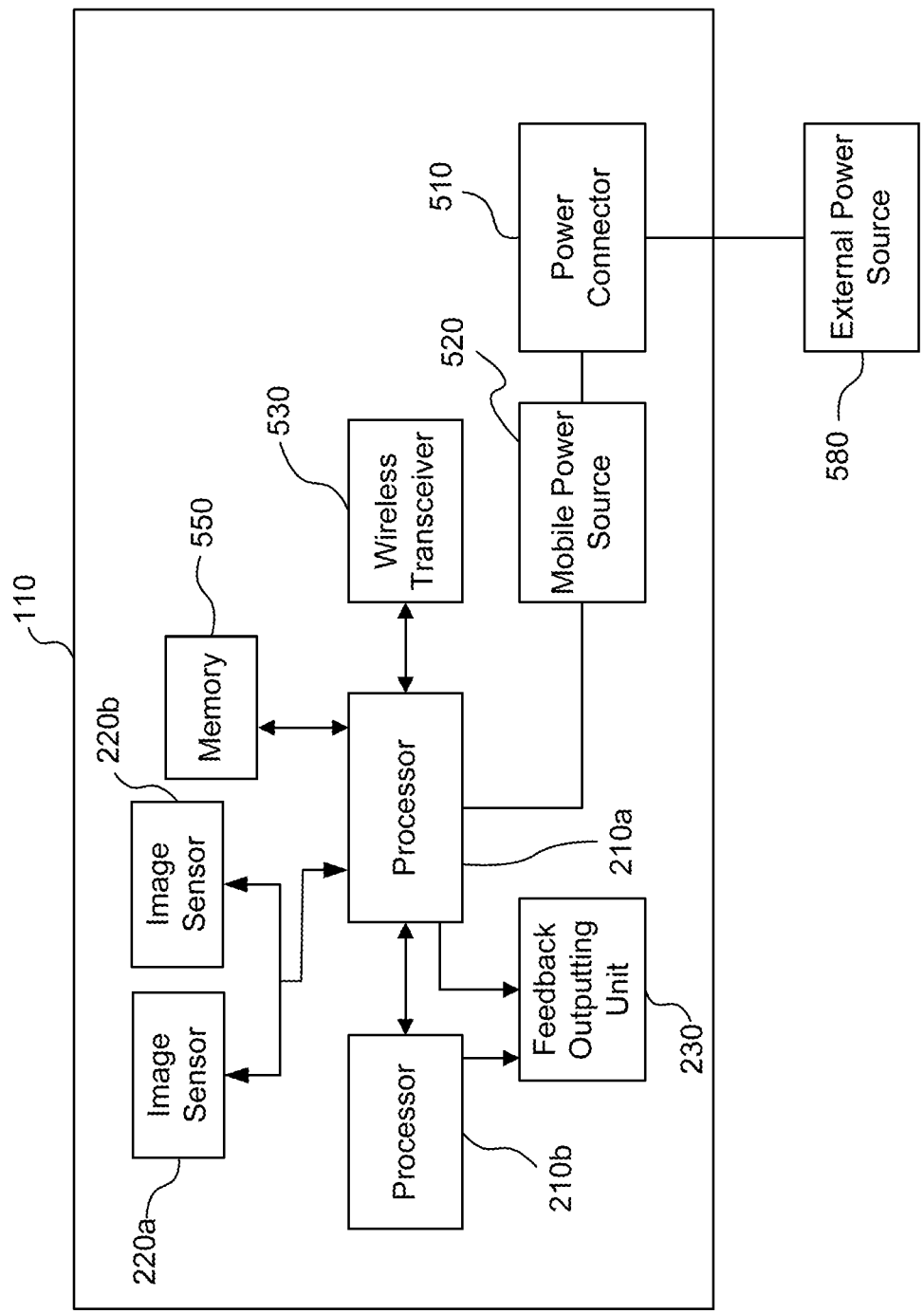
FIG. 5B is a block diagram illustrating an example of the components of a wearable apparatus according to a second embodiment.

FIG. 5B is a block diagram illustrating the components of apparatus 110 according to another example embodiment. In some embodiments, apparatus 110 includes a first image sensor 220a, a second image sensor 220b, a memory 550, a first processor 210a, a second processor 210b, a feedback outputting unit 230, a wireless transceiver 530, a mobile power source 520, and a power connector 510. In the arrangement shown in FIG. 5B, each of the image sensors may provide images in a different image resolution or face a different direction. Alternatively, each image sensor may be associated with a different camera (e.g., a wide angle camera, a narrow angle camera, an IR camera, etc.). In some embodiments, apparatus 110 can select which image sensor to use based on various factors. For example, processor 210a may determine, based on available storage space in memory 550, to capture subsequent images in a certain resolution.

Apparatus 110 may operate in a first processing-mode and in a second processing-mode, such that the first processing-mode may consume less power than the second processing-mode. For example, in the first processing-mode, apparatus 110 may capture images and process the captured images to make real-time decisions based on an identifying hand-related trigger, for example. In the second processing-mode, apparatus 110 may extract information from stored images in memory 550 and delete images from memory 550. In some embodiments, mobile power source 520 may provide more than fifteen hours of processing in the first processing-mode and about three hours of processing in the second processing-mode. Accordingly, different processing-modes may allow mobile power source 520 to produce sufficient power for powering apparatus 110 for various time periods (e.g., more than two hours, more than four hours, more than ten hours, etc.).

In some embodiments, apparatus 110 may use first processor 210a in the first processing-mode when powered by mobile power source 520, and second processor 210b in the second processing-mode when powered by external power source 580 that is connectable via power connector 510. In other embodiments, apparatus 110 may determine, based on predefined conditions, which processors or which processing modes to use. Apparatus 110 may operate in the second processing-mode even when apparatus 110 is not powered by external power source 580. For example, apparatus 110 may determine that it should operate in the second processing-mode when apparatus 110 is not powered by external power source 580, if the available storage space in memory 550 for storing new image data is lower than a predefined threshold.

Although one wireless transceiver is depicted in FIG. 5B, apparatus 110 may include more than one wireless transceiver (e.g., two wireless transceivers). In an arrangement with more than one wireless transceiver, each of the wireless transceivers may use a different standard to transmit and/or receive data. In some embodiments, a first wireless transceiver may communicate with server 250 or computing device 120 using a cellular standard (e.g., LTE or GSM), and a second wireless transceiver may communicate with server 250 or computing device 120 using a short-range standard (e.g., Wi-Fi or Bluetooth®). In some embodiments, apparatus 110 may use the first wireless transceiver when the wearable apparatus is powered by a mobile power source included in the wearable apparatus and use the second wireless transceiver when the wearable apparatus is powered by an external power source.

Figure 5C:
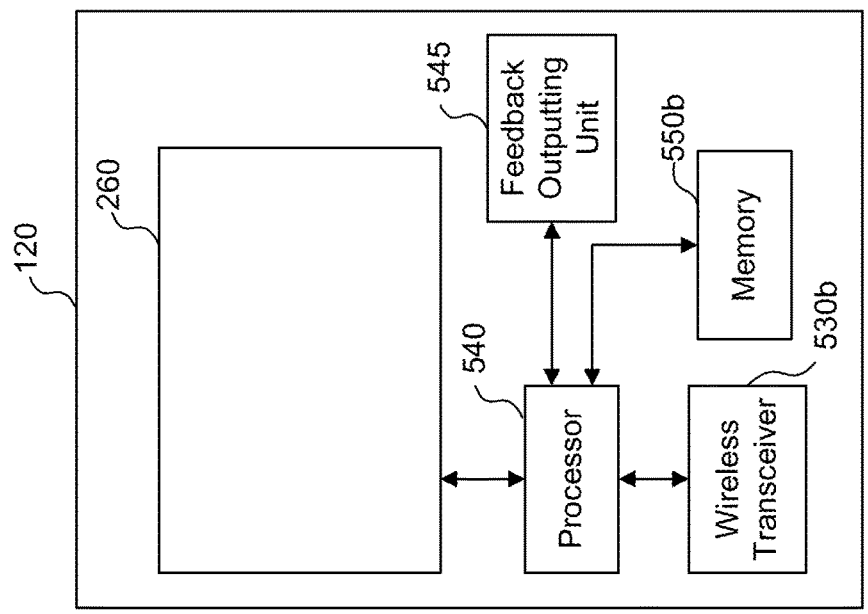
FIG. 5C is a block diagram illustrating an example of the components of a wearable apparatus according to a third embodiment.
Figure 5C:
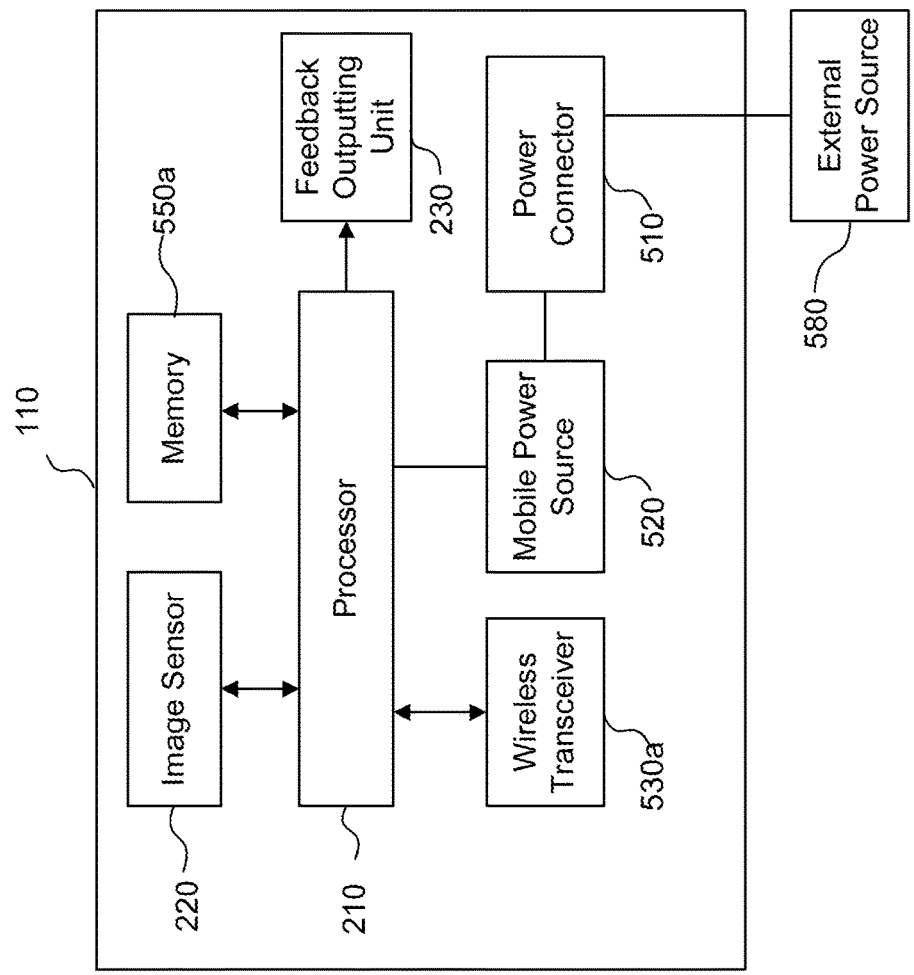

FIG. 5C is a block diagram illustrating the components of apparatus 110 according to another example embodiment including computing device 120. In this embodiment, apparatus 110 includes an image sensor 220, a memory 550a, a first processor 210, a feedback-outputting unit 230, a wireless transceiver 530a, a mobile power source 520, and a power connector 510. As further shown in FIG. 5C, computing device 120 includes a processor 540, a feedback-outputting unit 545, a memory 550b, a wireless transceiver 530b, and a display 260. One example of computing device 120 is a smartphone or tablet having a dedicated application installed therein. In other embodiments, computing device 120 may include any configuration such as an on-board automobile computing system, a PC, a laptop, and any other system consistent with the disclosed embodiments. In this example, user 100 may view feedback output in response to identification of a hand-related trigger on display 260. Additionally, user 100 may view other data (e.g., images, video clips, object information, schedule information, extracted information, etc.) on display 260. In addition, user 100 may communicate with server 250 via computing device 120.

In some embodiments, processor 210 and processor 540 are configured to extract information from captured image data. The term "extracting information" includes any process by which information associated with objects, individuals, locations, events, etc., is identified in the captured image data by any means known to those of ordinary skill in the art. In some embodiments, apparatus 110 may use the extracted information to send feedback or other real-time indications to feedback outputting unit 230 or to computing device 120. In some embodiments, processor 210 may identify in the image data the individual standing in front of user 100 and send computing device 120 the name of the individual and the last time user 100 met the individual. In another embodiment, processor 210 may identify in the image data, one or more visible triggers, including a hand-related trigger, and determine whether the trigger is associated with a person other than the user of the wearable apparatus to selectively determine whether to perform an action associated with the trigger. One such action may be to provide a feedback to user 100 via feedback-outputting unit 230 provided as part of (or in communication with) apparatus 110 or via a feedback unit 545 provided as part of computing device 120. For example, feedback-outputting unit 545 may be in communication with display 260 to cause the display 260 to visibly output information. In some embodiments, processor 210 may identify in the image data a hand-related trigger and send computing device 120 an indication of the trigger. Processor 540 may then process the received trigger information and provide an output via feedback outputting unit 545 or display 260 based on the hand-related trigger. In other embodiments, processor 540 may determine a hand-related trigger and provide suitable feedback similar to the above, based on image data received from apparatus 110. In some embodiments, processor 540 may provide instructions or other information, such as environmental information to apparatus 110 based on an identified hand-related trigger.

In some embodiments, processor 210 may identify other environmental information in the analyzed images, such as an individual standing in front user 100, and send computing device 120 information related to the analyzed information such as the name of the individual and the last time user 100 met the individual. In a different embodiment, processor 540 may extract statistical information from captured image data and forward the statistical information to server 250. For example, certain information regarding the types of items a user purchases, or the frequency a user patronizes a particular merchant, etc., may be determined by processor 540. Based on this information, server 250 may send computing device 120 coupons and discounts associated with the user's preferences.

When apparatus 110 is connected or wirelessly connected to computing device 120, apparatus 110 may transmit at least part of the image data stored in memory 550a for storage in memory 550b. In some embodiments, after computing device 120 confirms that transferring the part of image data was successful, processor 540 may delete the part of the image data. The term "delete" means that the image is marked as 'deleted' and other image data may be stored in its place but does not necessarily mean that the image data was physically removed from the memory.

As will be appreciated by a person skilled in the art having the benefit of this disclosure, numerous variations and/or modifications may be made to the disclosed embodiments. Not all components are essential for the operation of apparatus 110. Any component may be located in any appropriate apparatus and the components may be rearranged into a variety of configurations while providing the functionality of the disclosed embodiments. For example, in some embodiments, apparatus 110 may include a camera, a processor, and a wireless transceiver for sending data to another device. Therefore, the foregoing configurations are examples and, regardless of the configurations discussed above, apparatus 110 can capture, store, and/or process images.

Further, the foregoing and following description refers to storing and/or processing images or image data. In the embodiments disclosed herein, the stored and/or processed images or image data may comprise a representation of one or more images captured by image sensor 220. As the term is used herein, a "representation" of an image (or image data) may include an entire image or a portion of an image. A representation of an image (or image data) may have the same resolution or a lower resolution as the image (or image data), and/or a representation of an image (or image data) may be altered in some respect (e.g., be compressed, have a lower resolution, have one or more colors that are altered, etc.).

For example, apparatus 110 may capture an image and store a representation of the image that is compressed as a .JPG file. As another example, apparatus 110 may capture an image in color, but store a black-and-white representation of the color image. As yet another example, apparatus 110 may capture an image and store a different representation of the image (e.g., a portion of the image) For example, apparatus 110 may store a portion of an image that includes a face of a person who appears in the image, but that does not substantially include the environment surrounding the person. Similarly, apparatus 110 may, for example, store a portion of an image that includes a product that appears in the image, but does not substantially include the environment surrounding the product. As yet another example, apparatus 110 may store a representation of an image at a reduced resolution (i.e., at a resolution that is of a lower value than that of the captured image). Storing representations of images may allow apparatus 110 to save storage space in memory 550. Furthermore, processing representations of images may allow apparatus 110 to improve processing efficiency and/or help to preserve battery life.

In addition to the above, in some embodiments, any one of apparatus 110 or computing device 120, via processor 210 or 540, may further process the captured image data to provide additional functionality to recognize objects and/or gestures and/or other information in the captured image data. In some embodiments, actions may be taken based on the identified objects, gestures, or other information. In some embodiments, processor 210 or 540 may identify in the image data, one or more visible triggers, including a hand-related trigger, and determine whether the trigger is associated with a person other than the user to determine whether to perform an action associated with the trigger.

Some embodiments of the present disclosure may include an apparatus securable to an article of clothing of a user. Such an apparatus may include two portions, connectable by a connector. A capturing unit may be designed to be worn on the outside of a user's clothing and may include an image sensor for capturing images of a user's environment. The capturing unit may be connected to or connectable to a power unit, which may be configured to house a power source and a processing device. The capturing unit may be a small device including a camera or other device for capturing images. The capturing unit may be designed to be inconspicuous and unobtrusive, and may be configured to communicate with a power unit concealed by a user's clothing. The power unit may include bulkier aspects of the system, such as transceiver antennas, at least one battery, a processing device, etc. In some embodiments, communication between the capturing unit and the power unit may be provided by a data cable included in the connector, while in other embodiments, communication may be wirelessly achieved between the capturing unit and the power unit. Some embodiments may permit alteration of the orientation of an image sensor of the capture unit, for example to better capture images of interest.

Figure 6:
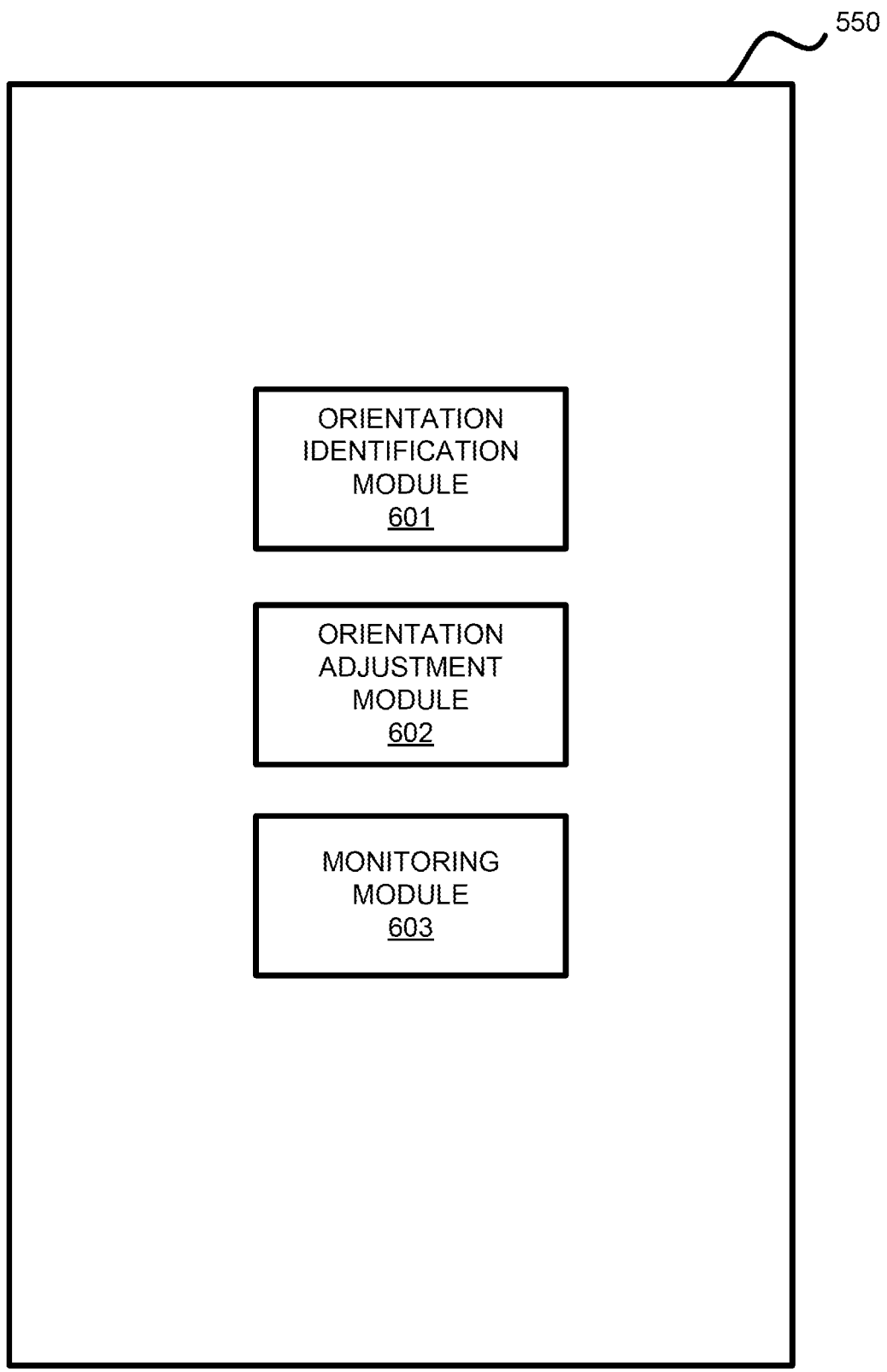
FIG. 6 illustrates an exemplary embodiment of a memory containing software modules consistent with the present disclosure.

FIG. 6 illustrates an exemplary embodiment of a memory containing software modules consistent with the present disclosure. Included in memory 550 are orientation identification module 601, orientation adjustment module 602, and motion tracking module 603. Modules 601, 602, 603 may contain software instructions for execution by at least one processing device, e.g., processor 210, included with a wearable apparatus. Orientation identification module 601, orientation adjustment module 602, and motion tracking module 603 may cooperate to provide orientation adjustment for a capturing unit incorporated into wireless apparatus 110.

Figure 7:
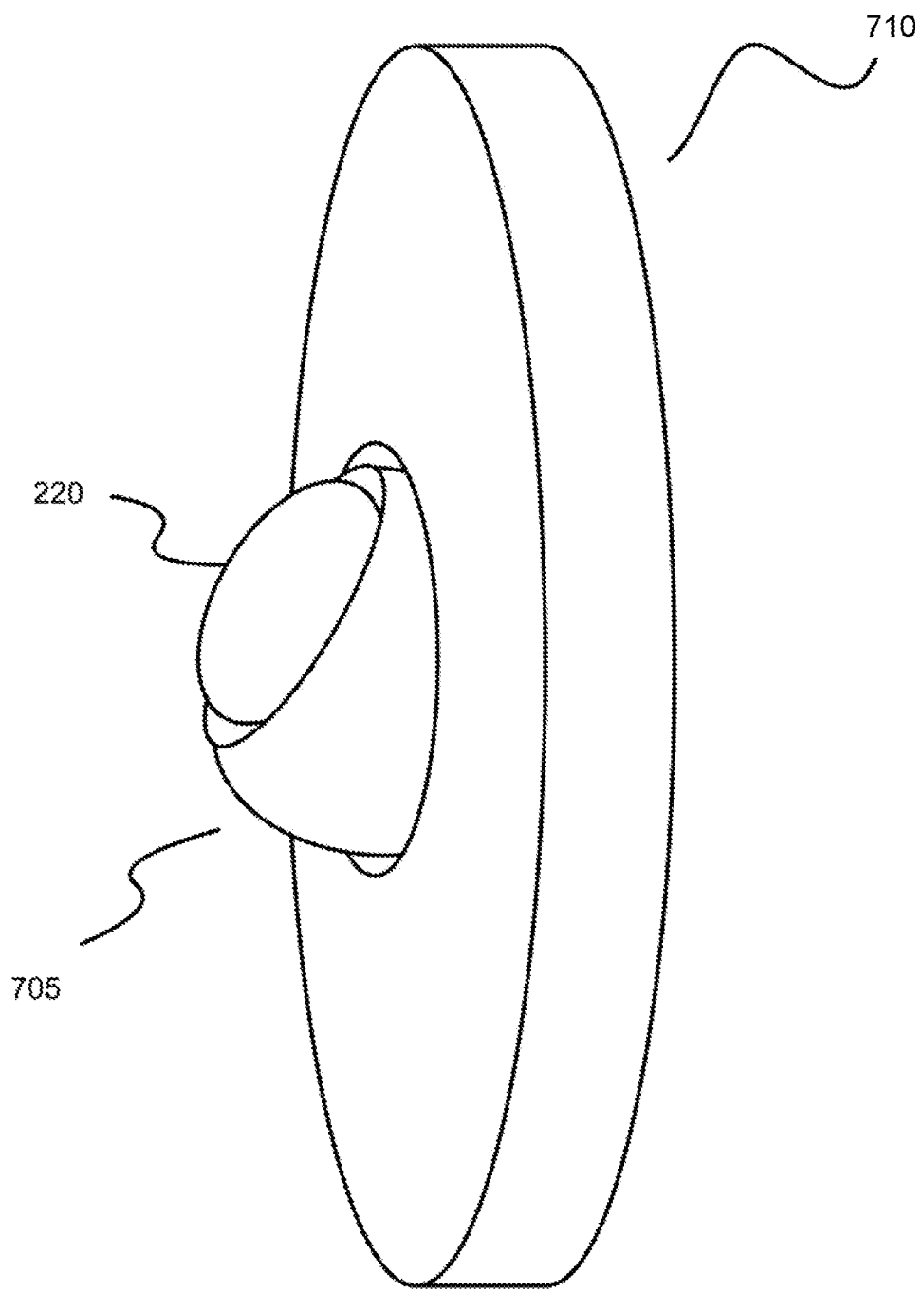
FIG. 7 is a schematic illustration of an embodiment of a wearable apparatus including an orientable image capture unit.

FIG. 7 illustrates an exemplary capturing unit 710 including an orientation adjustment unit 705. Orientation adjustment unit 705 may be configured to permit the adjustment of image sensor 220. As illustrated in FIG. 7, orientation adjustment unit 705 may include an eye-ball type adjustment mechanism. In alternative embodiments, orientation adjustment unit 705 may include gimbals, adjustable stalks, pivotable mounts, and any other suitable unit for adjusting an orientation of image sensor 220.

Image sensor 220 may be configured to be movable with the head of user 100 in such a manner that an aiming direction of image sensor 220 substantially coincides with a field of view of user 100. For example, as described above, a camera associated with image sensor 220 may be installed within capturing unit 710 at a predetermined angle in a position facing slightly upwards or downwards, depending on an intended location of capturing unit 710. Accordingly, the set aiming direction of image sensor 220 may match the field-of-view of user 100. In some embodiments, processor 210 may change the orientation of image sensor 220 using image data provided from image sensor 220. For example, processor 210 may recognize that a user is reading a book and determine that the aiming direction of image sensor 220 is offset from the text. That is, because the words in the beginning of each line of text are not fully in view, processor 210 may determine that image sensor 220 is tilted in the wrong direction. Responsive thereto, processor 210 may adjust the aiming direction of image sensor 220.

Orientation identification module 601 may be configured to identify an orientation of an image sensor 220 of capturing unit 710. An orientation of an image sensor 220 may be identified, for example, by analysis of images captured by image sensor 220 of capturing unit 710, by tilt or attitude sensing devices within capturing unit 710, and by measuring a relative direction of orientation adjustment unit 705 with respect to the remainder of capturing unit 710.

Orientation adjustment module 602 may be configured to adjust an orientation of image sensor 220 of capturing unit 710. As discussed above, image sensor 220 may be mounted on an orientation adjustment unit 705 configured for movement. Orientation adjustment unit 705 may be configured for rotational and/or lateral movement in response to commands from orientation adjustment module 602. In some embodiments orientation adjustment unit 705 may be adjust an orientation of image sensor 220 via motors, electromagnets, permanent magnets, and/or any suitable combination thereof.

In some embodiments, monitoring module 603 may be provided for continuous monitoring. Such continuous monitoring may include tracking a movement of at least a portion of an object included in one or more images captured by the image sensor. For example, in one embodiment, apparatus 110 may track an object as long as the object remains substantially within the field-of-view of image sensor 220. In additional embodiments, monitoring module 603 may engage orientation adjustment module 602 to instruct orientation adjustment unit 705 to continually orient image sensor 220 towards an object of interest. For example, in one embodiment, monitoring module 603 may cause image sensor 220 to adjust an orientation to ensure that a certain designated object, for example, the face of a particular person, remains within the field-of view of image sensor 220, even as that designated object moves about. In another embodiment, monitoring module 603 may continuously monitor an area of interest included in one or more images captured by the image sensor. For example, a user may be occupied by a certain task, for example, typing on a laptop, while image sensor 220 remains oriented in a particular direction and continuously monitors a portion of each image from a series of images to detect a trigger or other event. For example, image sensor 210 may be oriented towards a piece of laboratory equipment and monitoring module 603 may be configured to monitor a status light on the laboratory equipment for a change in status, while the user's attention is otherwise occupied.

In some embodiments consistent with the present disclosure, capturing unit 710 may include a plurality of image sensors 220. The plurality of image sensors 220 may each be configured to capture different image data. For example, when a plurality of image sensors 220 are provided, the image sensors 220 may capture images having different resolutions, may capture wider or narrower fields of view, and may have different levels of magnification. Image sensors 220 may be provided with varying lenses to permit these different configurations. In some embodiments, a plurality of image sensors 220 may include image sensors 220 having different orientations. Thus, each of the plurality of image sensors 220 may be pointed in a different direction to capture different images. The fields of view of image sensors 220 may be overlapping in some embodiments. The plurality of image sensors 220 may each be configured for orientation adjustment, for example, by being paired with an image adjustment unit 705. In some embodiments, monitoring module 603, or another module associated with memory 550, may be configured to individually adjust the orientations of the plurality of image sensors 220 as well as to turn each of the plurality of image sensors 220 on or off as may be required. In some embodiments, monitoring an object or person captured by an image sensor 220 may include tracking movement of the object across the fields of view of the plurality of image sensors 220.

Embodiments consistent with the present disclosure may include connectors configured to connect a capturing unit and a power unit of a wearable apparatus. Capturing units consistent with the present disclosure may include least one image sensor configured to capture images of an environment of a user. Power units consistent with the present disclosure may be configured to house a power source and/or at least one processing device. Connectors consistent with the present disclosure may be configured to connect the capturing unit and the power unit and may be configured to secure the apparatus to an article of clothing such that the capturing unit is positioned over an outer surface of the article of clothing and the power unit is positioned under an inner surface of the article of clothing. Exemplary embodiments of capturing units, connectors, and power units consistent with the disclosure are discussed in further detail with respect to FIGS. 8-14.

Figure 8:
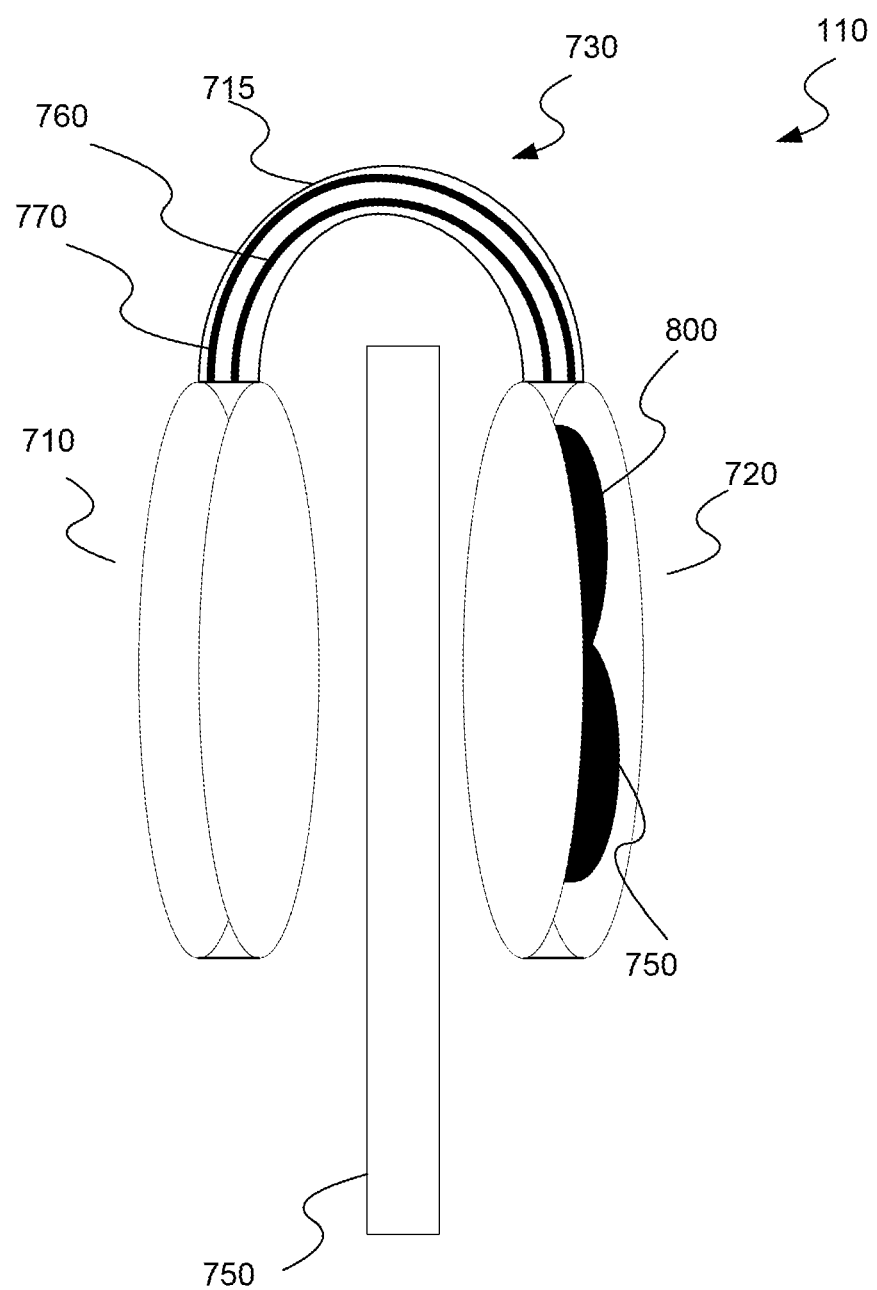
FIG. 8 is a schematic illustration of an embodiment of a wearable apparatus securable to an article of clothing consistent with the present disclosure.

FIG. 8 is a schematic illustration of an embodiment of wearable apparatus 110 securable to an article of clothing consistent with the present disclosure. As illustrated in FIG. 8, capturing unit 710 and power unit 720 may be connected by a connector 730 such that capturing unit 710 is positioned on one side of an article of clothing 750 and power unit 720 is positioned on the opposite side of the clothing 750. In some embodiments, capturing unit 710 may be positioned over an outer surface of the article of clothing 750 and power unit 720 may be located under an inner surface of the article of clothing 750. The power unit 720 may be configured to be placed against the skin of a user.

Capturing unit 710 may include an image sensor 220 and an orientation adjustment unit 705 (as illustrated in FIG. 7). Power unit 720 may include mobile power source 520 and processor 210. Power unit 720 may further include any combination of elements previously discussed that may be a part of wearable apparatus 110, including, but not limited to, wireless transceiver 530, feedback outputting unit 230, memory 550, and data port 570.

Connector 730 may include a clip 715 or other mechanical connection designed to clip or attach capturing unit 710 and power unit 720 to an article of clothing 750 as illustrated in FIG. 8. As illustrated, clip 715 may connect to each of capturing unit 710 and power unit 720 at a perimeter thereof and may wrap around an edge of the article of clothing 750 to affix the capturing unit 710 and power unit 720 in place. Connector 730 may further include a power cable 760 and a data cable 770. Power cable 760 may be capable of conveying power from mobile power source 520 to image sensor 220 of capturing unit 710. Power cable 760 may also be configured to provide power to any other elements of capturing unit 710, e.g., orientation adjustment unit 705. Data cable 770 may be capable of conveying captured image data from image sensor 220 in capturing unit 710 to processor 800 in the power unit 720. Data cable 770 may be further capable of conveying additional data between capturing unit 710 and processor 800, e.g., control instructions for orientation adjustment unit 705.

Figure 9:
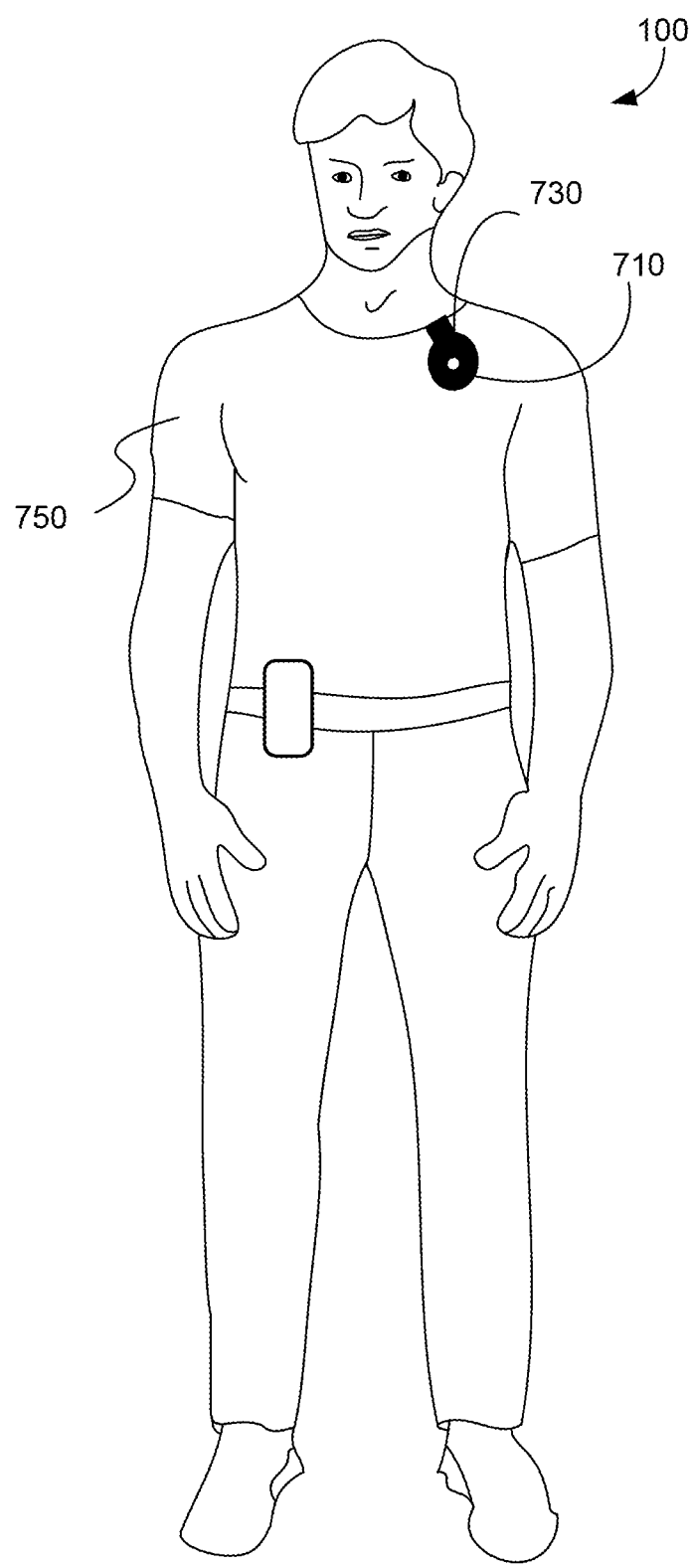
FIG. 9 is a schematic illustration of a user wearing a wearable apparatus consistent with an embodiment of the present disclosure.

FIG. 9 is a schematic illustration of a user 100 wearing a wearable apparatus 110 consistent with an embodiment of the present disclosure. As illustrated in FIG. 9, capturing unit 710 is located on an exterior surface of the clothing 750 of user 100. Capturing unit 710 is connected to power unit 720 (not seen in this illustration) via connector 730, which wraps around an edge of clothing 750.

Figure 10:
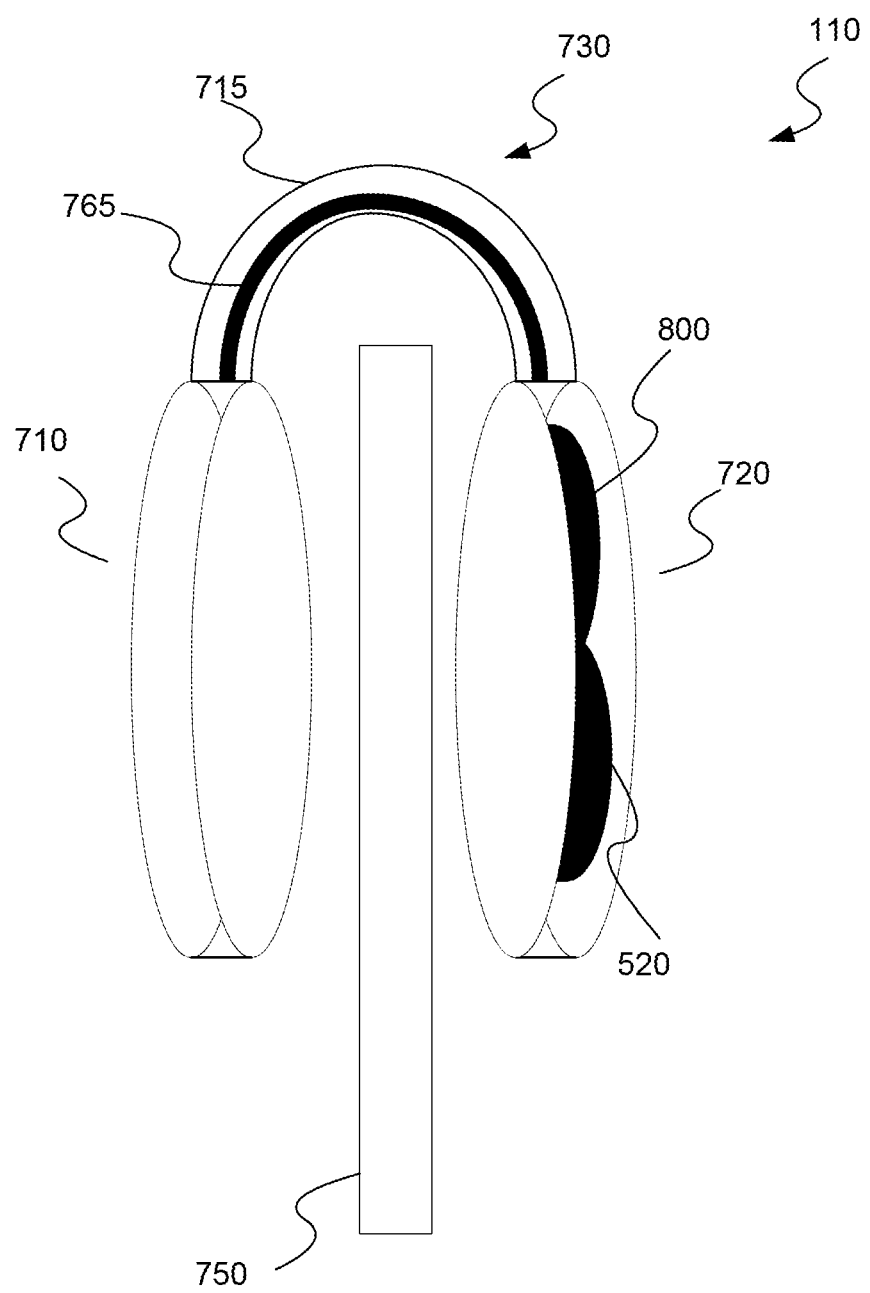
FIG. 10 is a schematic illustration of an embodiment of a wearable apparatus securable to an article of clothing consistent with the present disclosure.

In some embodiments, connector 730 may include a flexible printed circuit board (PCB). FIG. 10 illustrates an exemplary embodiment wherein connector 730 includes a flexible printed circuit board 765. Flexible printed circuit board 765 may include data connections and power connections between capturing unit 710 and power unit 720. Thus, in some embodiments, flexible printed circuit board 765 may serve to replace power cable 760 and data cable 770. In alternative embodiments, flexible printed circuit board 765 may be included in addition to at least one of power cable 760 and data cable 770. In various embodiments discussed herein, flexible printed circuit board 765 may be substituted for, or included in addition to, power cable 760 and data cable 770.

Figure 11:
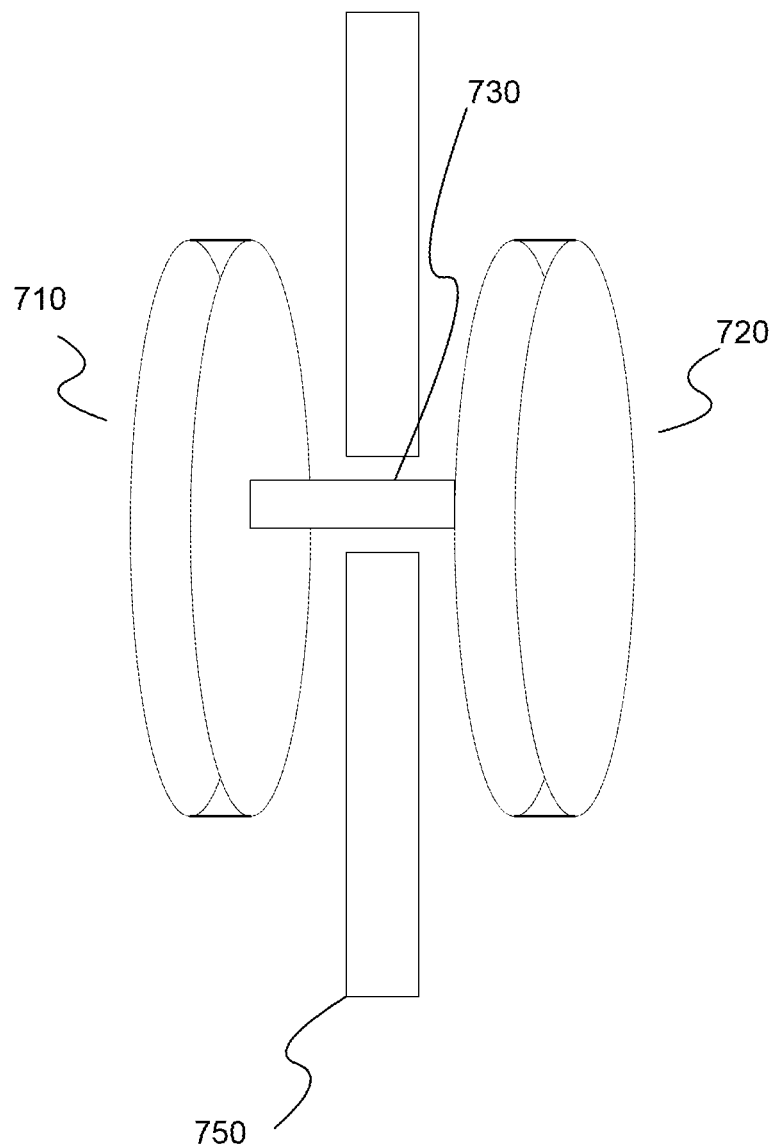
FIG. 11 is a schematic illustration of an embodiment of a wearable apparatus securable to an article of clothing consistent with the present disclosure.

FIG. 11 is a schematic illustration of another embodiment of a wearable apparatus securable to an article of clothing consistent with the present disclosure. As illustrated in FIG. 11, connector 730 may be centrally located with respect to capturing unit 710 and power unit 720. Central location of connector 730 may facilitate affixing apparatus 110 to clothing 750 through a hole in clothing 750 such as, for example, a button-hole in an existing article of clothing 750 or a specialty hole in an article of clothing 750 designed to accommodate wearable apparatus 110.

Figure 12:
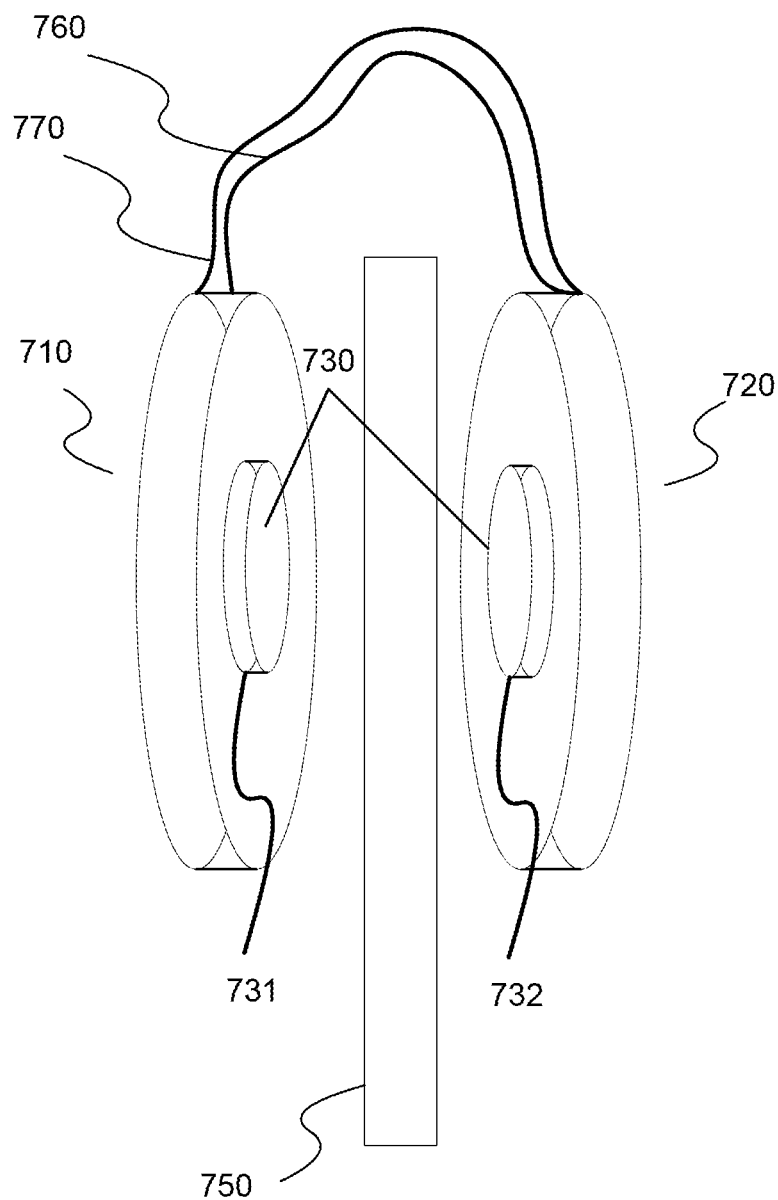
FIG. 12 is a schematic illustration of an embodiment of a wearable apparatus securable to an article of clothing consistent with the present disclosure.

FIG. 12 is a schematic illustration of still another embodiment of wearable apparatus 110 securable to an article of clothing. As illustrated in FIG. 12, connector 730 may include a first magnet 731 and a second magnet 732. First magnet 731 and second magnet 732 may secure capturing unit 710 to power unit 720 with the article of clothing positioned between first magnet 731 and second magnet 732. In embodiments including first magnet 731 and second magnet 732, power cable 760 and data cable 770 may also be included. In these embodiments, power cable 760 and data cable 770 may be of any length and may provide a flexible power and data connection between capturing unit 710 and power unit 720. Embodiments including first magnet 731 and second magnet 732 may further include a flexible PCB 765 connection in addition to or instead of power cable 760 and/or data cable 770. In some embodiments, first magnet 731 or second magnet 732 may be replaced by an object comprising a metal material.

Figure 13:
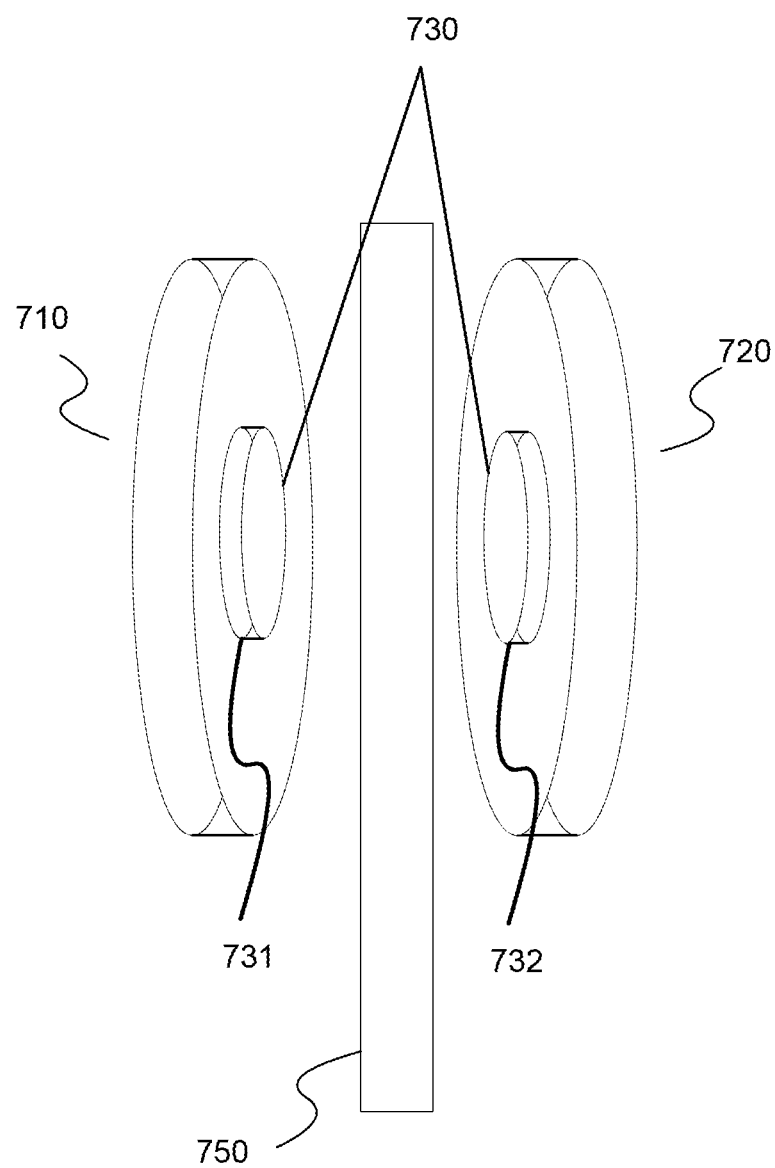
FIG. 13 is a schematic illustration of an embodiment of a wearable apparatus securable to an article of clothing consistent with the present disclosure.

FIG. 13 is a schematic illustration of yet another embodiment of a wearable apparatus 110 securable to an article of clothing. FIG. 13 illustrates an embodiment wherein power and data may be wirelessly transferred between capturing unit 710 and power unit 720. As illustrated in FIG. 13, first magnet 731 and second magnet 732 may be provided as connector 730 to secure capturing unit 710 and power unit 720 to an article of clothing 750. Power and/or data may be transferred between capturing unit 710 and power unit 720 via any suitable wireless technology, for example, magnetic and/or capacitive coupling, near field communication technologies, radiofrequency transfer, and any other wireless technology suitable for transferring data and/or power across short distances.

Figure 14:
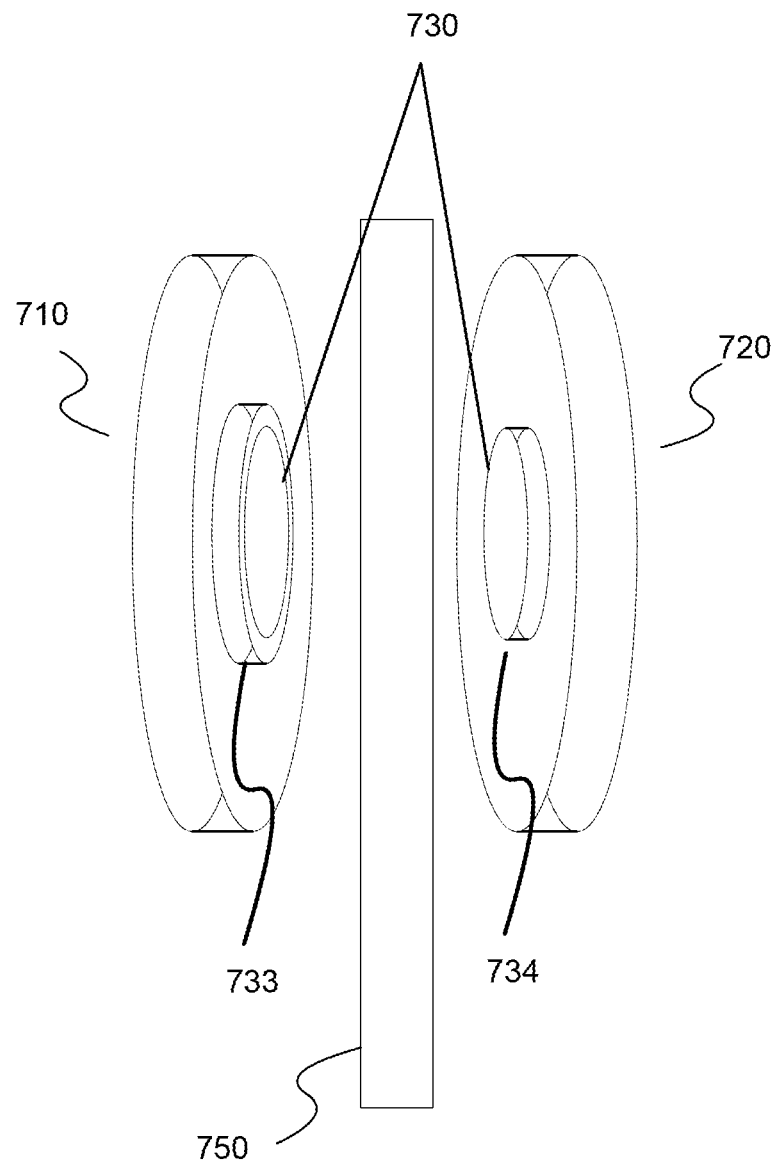
FIG. 14 is a schematic illustration of an embodiment of a wearable apparatus securable to an article of clothing consistent with the present disclosure.

FIG. 14 illustrates still another embodiment of wearable apparatus 110 securable to an article of clothing 750 of a user. As illustrated in FIG. 14, connector 730 may include features designed for a contact fit. For example, capturing unit 710 may include a ring 733 with a hollow center having a diameter slightly larger than a disk-shaped protrusion 734 located on power unit 720. When pressed together with fabric of an article of clothing 750 between them, disk-shaped protrusion 734 may fit tightly inside ring 733, securing capturing unit 710 to power unit 720. FIG. 14 illustrates an embodiment that does not include any cabling or other physical connection between capturing unit 710 and power unit 720. In this embodiment, capturing unit 710 and power unit 720 may transfer power and data wirelessly. In alternative embodiments, capturing unit 710 and power unit 720 may transfer power and data via at least one of cable 760, data cable 770, and flexible printed circuit board 765.

Figure 15:
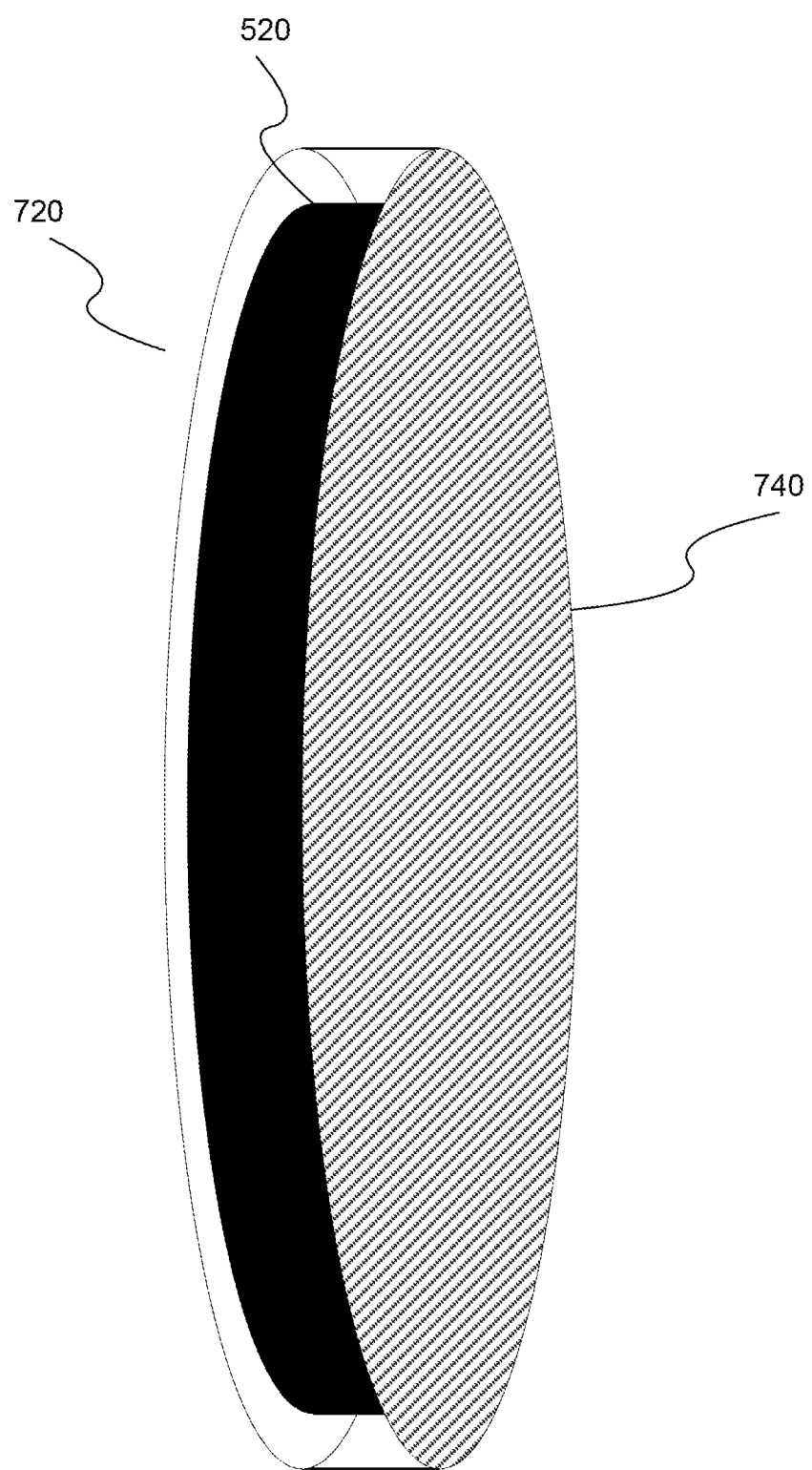
FIG. 15 is a schematic illustration of an embodiment of a wearable apparatus power unit including a power source.

FIG. 15 illustrates another aspect of power unit 720 consistent with embodiments described herein. Power unit 720 may be configured to be positioned directly against the user's skin. To facilitate such positioning, power unit 720 may further include at least one surface coated with a biocompatible material 740. Biocompatible materials 740 may include materials that will not negatively react with the skin of the user when worn against the skin for extended periods of time. Such materials may include, for example, silicone, PTFE, kapton, polyimide, titanium, nitinol, platinum, and others. As illustrated in FIG. 15, power unit 720 may be sized such that an inner volume of the power unit is substantially filled by mobile power source 520. That is, in some embodiments, the inner volume of power unit 720 may be such that the volume does not accommodate any additional components except for mobile power source 520. In some embodiments, mobile power source 520 may take advantage of its close proximity to the skin of user's skin. For example, mobile power source 520 may use the Peltier effect to produce power and/or charge the power source.

Figure 16:
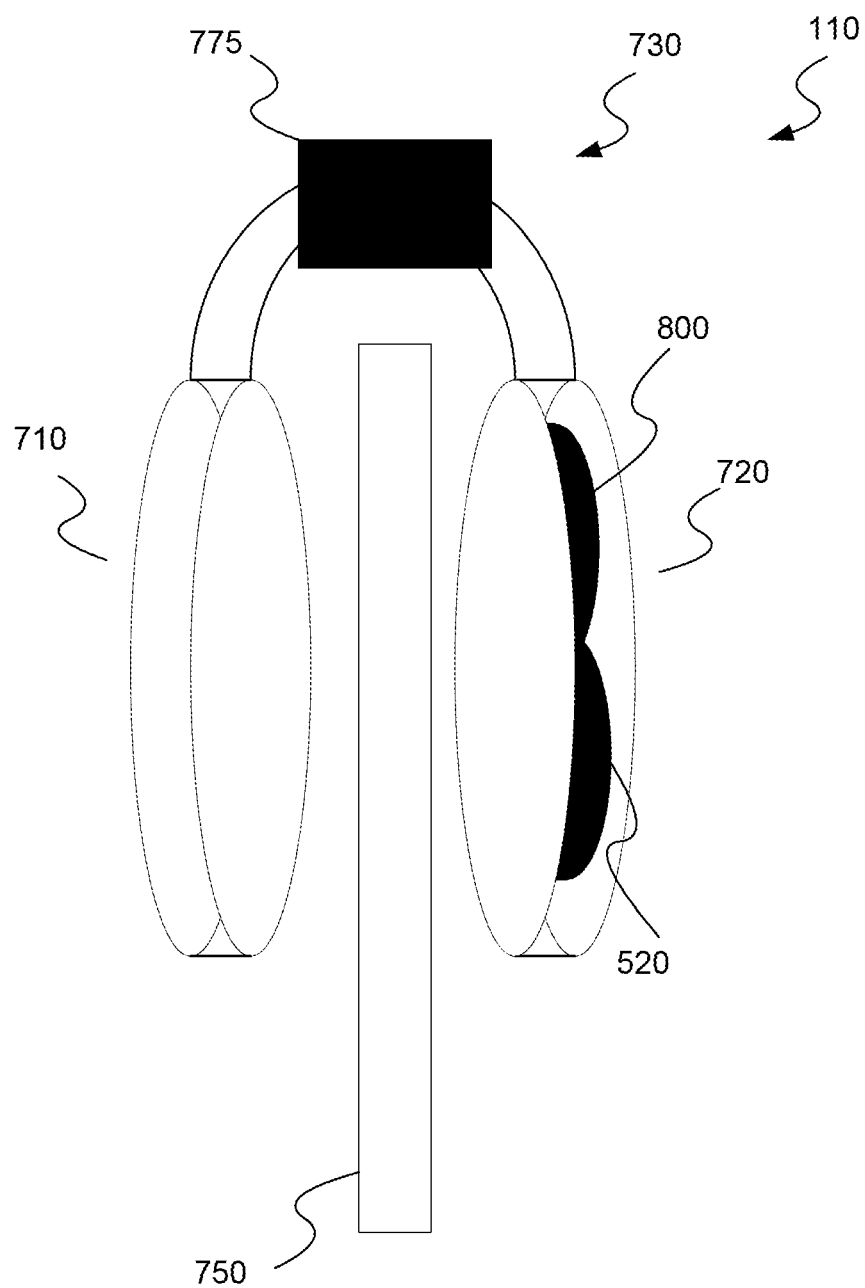
FIG. 16 is a schematic illustration of an exemplary embodiment of a wearable apparatus including protective circuitry.

In further embodiments, an apparatus securable to an article of clothing may further include protective circuitry associated with power source 520 housed in in power unit 720. FIG. 16 illustrates an exemplary embodiment including protective circuitry 775. As illustrated in FIG. 16, protective circuitry 775 may be located remotely with respect to power unit 720. In alternative embodiments, protective circuitry 775 may also be located in capturing unit 710, on flexible printed circuit board 765, or in power unit 720.

Protective circuitry 775 may be configured to protect image sensor 220 and/or other elements of capturing unit 710 from potentially dangerous currents and/or voltages produced by mobile power source 520. Protective circuitry 775 may include passive components such as capacitors, resistors, diodes, inductors, etc., to provide protection to elements of capturing unit 710. In some embodiments, protective circuitry 775 may also include active components, such as transistors, to provide protection to elements of capturing unit 710. For example, in some embodiments, protective circuitry 775 may comprise one or more resistors serving as fuses. Each fuse may comprise a wire or strip that melts (thereby braking a connection between circuitry of image capturing unit 710 and circuitry of power unit 720) when current flowing through the fuse exceeds a predetermined limit (e.g., 500 milliamps, 900 milliamps, 1 amp, 1.1 amps, 2 amp, 2.1 amps, 3 amps, etc.) Any or all of the previously described embodiments may incorporate protective circuitry 775.

In some embodiments, the wearable apparatus may transmit data to a computing device (e.g., a smartphone, tablet, watch, computer, etc.) over one or more networks via any known wireless standard (e.g., cellular, Wi-Fi, Bluetooth®, etc.), or via near-filed capacitive coupling, other short range wireless techniques, or via a wired connection. Similarly, the wearable apparatus may receive data from the computing device over one or more networks via any known wireless standard (e.g., cellular, Wi-Fi, Bluetooth®, etc.), or via near-filed capacitive coupling, other short range wireless techniques, or via a wired connection. The data transmitted to the wearable apparatus and/or received by the wireless apparatus may include images, portions of images, identifiers related to information appearing in analyzed images or associated with analyzed audio, or any other data representing image and/or audio data. For example, an image may be analyzed and an identifier related to an activity occurring in the image may be transmitted to the computing device (e.g., the "paired device"). In the embodiments described herein, the wearable apparatus may process images and/or audio locally (on board the wearable apparatus) and/or remotely (via a computing device). Further, in the embodiments described herein, the wearable apparatus may transmit data related to the analysis of images and/or audio to a computing device for further analysis, display, and/or transmission to another device (e.g., a paired device). Further, a paired device may execute one or more applications (apps) to process, display, and/or analyze data (e.g., identifiers, text, images, audio, etc.) received from the wearable apparatus.

Some of the disclosed embodiments may involve systems, devices, methods, and software products for determining at least one keyword. For example, at least one keyword may be determined based on data collected by apparatus 110. At least one search query may be determined based on the at least one keyword. The at least one search query may be transmitted to a search engine.

In some embodiments, at least one keyword may be determined based on at least one or more images captured by image sensor 220. In some cases, the at least one keyword may be selected from a keywords pool stored in memory. In some cases, optical character recognition (OCR) may be performed on at least one image captured by image sensor 220, and the at least one keyword may be determined based on the OCR result. In some cases, at least one image captured by image sensor 220 may be analyzed to recognize: a person, an object, a location, a scene, and so forth. Further, the at least one keyword may be determined based on the recognized person, object, location, scene, etc. For example, the at least one keyword may comprise: a person's name, an object's name, a place's name, a date, a sport team's name, a movie's name, a book's name, and so forth.

In some embodiments, at least one keyword may be determined based on the user's behavior. The user's behavior may be determined based on an analysis of the one or more images captured by image sensor 220. In some embodiments, at least one keyword may be determined based on activities of a user and/or other person. The one or more images captured by image sensor 220 may be analyzed to identify the activities of the user and/or the other person who appears in one or more images captured by image sensor 220. In some embodiments, at least one keyword may be determined based on at least one or more audio segments captured by apparatus 110. In some embodiments, at least one keyword may be determined based on at least GPS information associated with the user. In some embodiments, at least one keyword may be determined based on at least the current time and/or date.

In some embodiments, at least one search query may be determined based on at least one keyword. In some cases, the at least one search query may comprise the at least one keyword. In some cases, the at least one search query may comprise the at least one keyword and additional keywords provided by the user. In some cases, the at least one search query may comprise the at least one keyword and one or more images, such as images captured by image sensor 220. In some cases, the at least one search query may comprise the at least one keyword and one or more audio segments, such as audio segments captured by apparatus 110.

In some embodiments, the at least one search query may be transmitted to a search engine. In some embodiments, search results provided by the search engine in response to the at least one search query may be provided to the user. In some embodiments, the at least one search query may be used to access a database.

For example, in one embodiment, the keywords may include a name of a type of food, such as quinoa, or a brand name of a food product; and the search will output information related to desirable quantities of consumption, facts about the nutritional profile, and so forth. In another example, in one embodiment, the keywords may include a name of a restaurant, and the search will output information related to the restaurant, such as a menu, opening hours, reviews, and so forth. The name of the restaurant may be obtained using OCR on an image of signage, using GPS information, and so forth. In another example, in one embodiment, the keywords may include a name of a person, and the search will provide information from a social network profile of the person. The name of the person may be obtained using OCR on an image of a name tag attached to the person's shirt, using face recognition algorithms, and so forth. In another example, in one embodiment, the keywords may include a name of a book, and the search will output information related to the book, such as reviews, sales statistics, information regarding the author of the book, and so forth. In another example, in one embodiment, the keywords may include a name of a movie, and the search will output information related to the movie, such as reviews, box office statistics, information regarding the cast of the movie, show times, and so forth. In another example, in one embodiment, the keywords may include a name of a sport team, and the search will output information related to the sport team, such as statistics, latest results, future schedule, information regarding the players of the sport team, and so forth. For example, the name of the sport team may be obtained using audio recognition algorithms.

Biometrics Confirm an Identity of a User of a Wearable Device

Wearable camera systems may be personal to a particular owner (or group of owners). If someone other than the owner begins using the device, it may be helpful for the system to detect the new user and alter data collection/recording functions. Otherwise, the system might assume that the owner has had interactions that the owner (or current user) did not have, or that the owner or current user has performed actions that he or she did not. One way to accomplish this is to enable the camera to detect biometric information of the wearer and trigger a second mode if the wearer is not the owner. The data from which the biometric information is detected may include audio of the wearer's voice and/or video of the wearer's hands and/or face.

In some embodiments, the identity of the wearer of a wearable apparatus may be authenticated. The authentication may be performed continuously, at selected times, and so forth. In some cases, the authentication may be based, at least in part, on image data captured using the wearable apparatus. In some cases, the authentication may be based, at least in part, on audio data captured using the wearable apparatus. In some cases, the authentication may be based, at least in part, on biometric data captured using the wearable apparatus.

In some embodiments, a wearable apparatus may obtain a plurality of images captured from an environment of a user of the wearable apparatus. At least one profile of the user may be obtained. At least one processor of the wearable apparatus may analyze the plurality of images to authenticate the identity of the user based on the at least one user profile. In some examples, information used to authenticate the identity of the user may be transmitted to an external device. In some embodiments, feedback may be provided to the user based on the authentication of the identity of the user. In some examples, the plurality of images may be analyzed to identify motion of at least one hand of the user, and the authentication of the identity of the user may be based on the analysis of the motion of the at least one hand of the user. In some examples, the plurality of images may be analyzed to identify ego motion, and the authentication of the identity of the user may be based on the analysis of the ego motion.

In some embodiments, the wearable apparatus may be a wearable device, e.g., device 110, having a wearable housing containing at least one sensor (e.g., image sensor 220). In some embodiments, the at least one sensor includes at least one image sensor configured to capture images. In another embodiment, the at least one sensor includes at least one microphone configured to capture audio. In some embodiments, the at least one sensor may include, either alone or in combination, a microphone configured to capture audio and/or an accelerometer configured to capture motion data. The housing of wearable device 110 may be configured for attachment to an article of clothing, for example, a shirt (shown in FIG. 9), eyeglasses (shown in FIG. 1A), a necklace (shown in FIG. 1B), a belt (shown in FIG. 1C), a watch (shown in FIG. 1D), and/or any other article of clothing.

As discussed above, system 200 may comprise a wearable apparatus 110, worn by user 100, and an optional computing device 120 and/or a server 250 capable of communicating with wearable apparatus 110 via a network 240. Consistent with this disclosure, apparatus 110 may analyze image data, audio data, and/or other data received from one or more sensors to obtain information captured in a digital image, by a microphone, or via another sensor or input device and may compare the received information with stored information to authenticate the wearer, as described in greater detail below. Apparatus 110 may also transmit information to computing device 120, which may be, for example, a smartphone or tablet having a dedicated application installed therein. A graphical user interface (GUI) including a plurality of user-adjustable authentication settings may be included on display 260 of computing device 120 to visibly provide an interface for customizing authentication settings to an operating user. Additionally or alternatively, server 250 may receive information based on image data captured by wearable apparatus 110, server 250 may analyze the received information to authenticate the wearer, as described in greater detail below, and cause the wearable apparatus to operate in an unrestricted mode.

Figure 17:
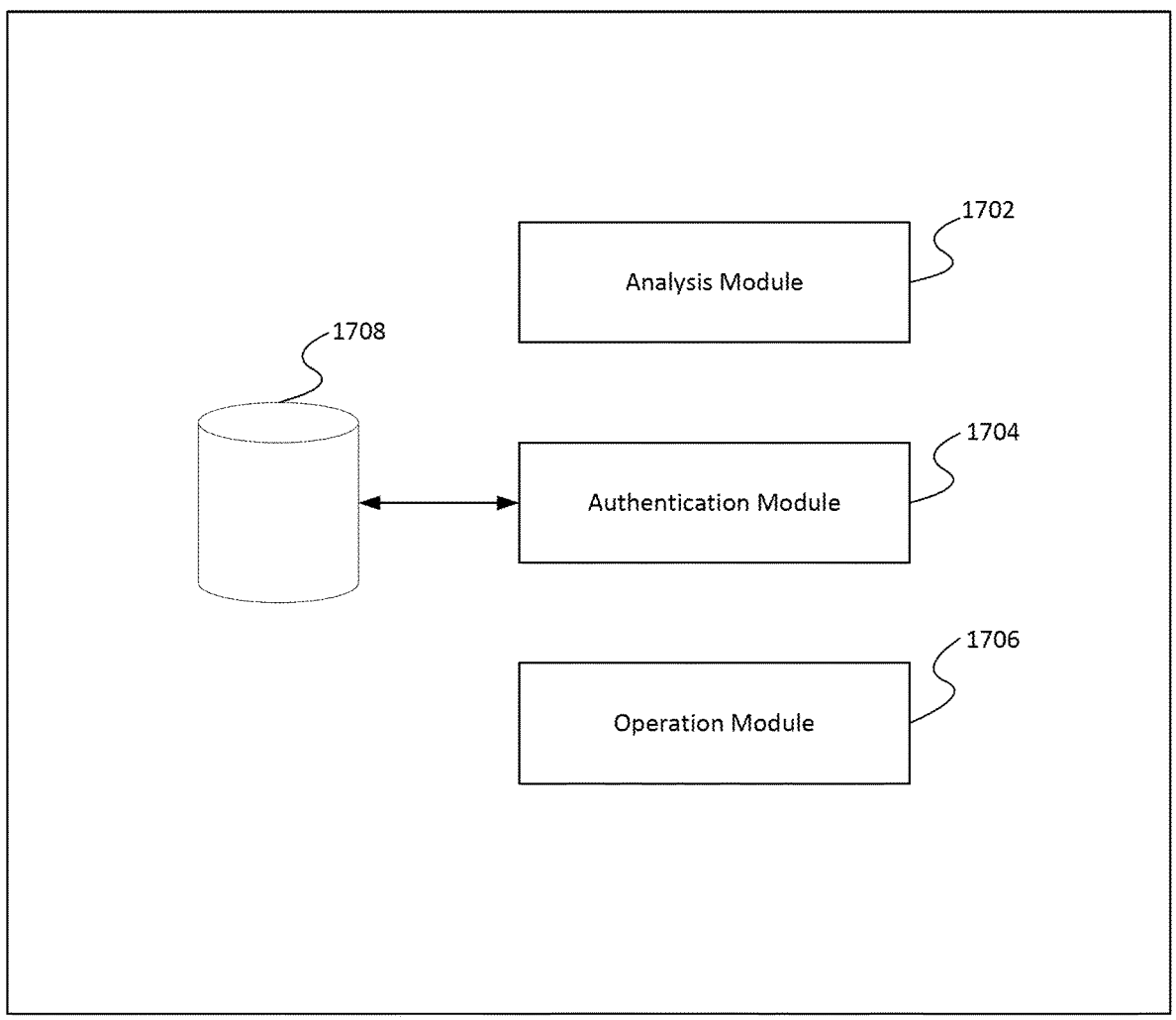
FIG. 17 illustrates an exemplary embodiment of a memory containing software modules consistent with the present disclosure.

FIG. 17 illustrates an exemplary embodiment of a memory containing software modules consistent with the present disclosure. In particular, as shown, memory 1700 may include an analysis module 1702, an authentication module 1704, an operation module 1706, and a database 1708. Modules 1702, 1704, and 1706 may contain software instructions for execution by at least one processing device, e.g., processor 210, included with a wearable device (e.g., wearable apparatus 110). Analysis module 1702, authentication module 1704, operation module 1706, and database 1708 may cooperate to analyze a captured image or other input, obtain information based on the analysis, authenticate the wearer based on the information, and cause the device to operate in an unrestricted mode upon successful authentication of the wearer. In some embodiments, memory 1700 may be included in, for example, memory 550, discussed above. Further, in other embodiments, parts of memory 1700 may be distributed over more than one location (e.g., stored in a server 250 in communication with, for example, network 240).

In some embodiments, analysis module 1702 may analyze at least one image captured by a wearable image sensor included in the housing of the wearable device from an environment of a user of the wearable device. Analysis module 1702 may include software instructions for receiving data from wearable apparatus 110, such as a wearable camera system, and may include software instructions for analyzing data obtained by one or more sensors of wearable apparatus 110 to authenticate the wearer. Data received from the one or more sensors may include audio and image data, captured by, for example, an image sensor or a microphone associated with the wearable device. Analysis module 1702 may use voice recognition techniques to identify a voice or a particular word spoken by the wearer in audio data captured by the microphone. Image data may include raw images and may include image data that has been processed. Raw images may be provided, for example, in the form of still images and video data, either with or without embedded metadata. In some embodiments, image data and audio data may be preprocessed prior to being handled by analysis module 1702. Preprocessing may include, for example, noise reduction, artifact removal, compression, and other image pre-processing techniques.

In some embodiments, analysis may be performed by performing a facial recognition algorithm designed to detect facial features (e.g., mouth, eyes, etc.), facial contours, paralinguistic indicators such as facial gestures or expressions, body shape, or any other suitable identifying feature of a person. In other embodiments, at least one person may be identified using a thermal signature algorithm designed to detect the presence of at least one person based on the heat generated by the at least one person. In such embodiments, wearable device 110 may capture thermal images, either alone or in combination with visual images, for processing by the thermal signature algorithm. Thermal recognition of the at least one person may be desirable in implementations in which wearable device 110 is operating in reduced lighting situations. In some embodiments, at least one person may be identified through application of one or more classification techniques. In some embodiments, an image classification technique may include at least one or more of image enhancement, edge detection, image analysis, and data extraction.

In some embodiments, authentication module 1704 may detect whether the wearer of the housing is authenticated with the wearable device based on analysis of a plurality of images captured by at least one image sensor. For example, authentication module 1704 may detect whether the wearer of the housing is authenticated with the wearable device based on analysis of a face of the wearer depicted in at least one image captured by the at least one image sensor. In some embodiments, authentication module 1704 may perform analysis including identifying a predetermined hand gesture to detect whether the wearer is authenticated with the wearable device. For example, authentication may be based on determining that the wearer made a gesture associated with a profile of the wearer for purposes of authenticating the wearer. In another embodiment, the at least one processor is further configured to detect whether the wearer of the housing is authenticated with the wearable device based on analysis of a face of the wearer depicted in at least one image captured by the at least one image sensor.

Authentication module 1704 may analyze audio data captured by at least one microphone and use one or more voice recognition algorithms to associate the voice captured in the audio data with the wearer of the wearable apparatus. For example, the at least one sensor may include at least one microphone, and the at least one processor may be further configured to detect whether the wearer of the housing is authenticated with the wearable device based on analysis of audio captured by the at least one microphone. The analysis of the audio captured by the at least one microphone may include detecting a password in the captured audio. In another embodiment, the analysis of the audio captured by the at least one microphone includes recognizing a voice in the captured audio. In another embodiment, the at least one sensor may be an accelerometer configured to record gait pattern information and/or a gesture performed by the wearer. In another embodiment, authentication module 1704 may use a voice-to-text algorithm to identify one or more words or phrases spoken by a wearer of the wearable apparatus In yet another embodiment, the wearable apparatus may include a sensor capable of detecting a fingerprint or other biometric information associated with the wearer.

Authentication module 1704 may then determine whether the wearer is authenticated based on a comparison of the received information from analysis module 1702 with wearer identification information stored in database 1708. Identification information may include one or more of image, audio, and accelerometer data indicative of the face of the wearer, body of the wearer, voice of the wearer, gait pattern of the wearer, a password associated with the wearer, or the like. Authentication module 1704 may access database 1708 and receive identification information associated with the information received from analysis module 1702. For example, if authentication module 1704 receives audio information, authentication module 1704 may retrieve stored audio information from database 1708.

Authentication module 1704 may compare the stored information received from database 1708 with the information received from analysis module 1702. Authentication module 1704 may authenticate the wearer if the information from analysis module 1702 matches the stored identification information. In some embodiments, the wearer may be verified if the information received from the at least one sensor matches the stored data within a certain threshold. For example, the wearer may be verified if the password captured by a microphone of the wearable devices is a ninety-eight percent match to the audio data stored in database 1708.

Based on whether the wearer is verified by authentication module 1704, operation module 1706 may cause the wearable apparatus to operate in an unrestricted mode, if the wearer is verified, or in a restricted mode if the wearer is not verified. If the wearer is not authenticated, operation module 1706 may restrict at least one data capturing function, for example, image or audio capture functions. In another embodiment, restricted mode may include causing data capturing functions to occur less frequently than in an unrestricted mode. In another embodiment, data capture functions performed by the one or more sensors may be prevented while the wearable apparatus is operating in a restricted mode. The restricted mode may further include restricting at least one data access function. For example, an unauthenticated wearer may be prevented from accessing data associated with an authenticated wearer that is stored on the wearable device. Such prevention may include not providing to the wearer information (e.g., names, addresses, e-mail addresses, phone numbers, etc.) related to individuals met by the unauthenticated wearer, even if such individuals are recognized by apparatus 110.

In some embodiments, an unrestricted mode may be a mode in which the wearer may access data stored on the wearable device and/or data capture functions operate at full or normal capacity (i.e., functionality is not restricted). In some embodiments, the wearable device may be configured to receive input from a wearer, indicative of a desired level of security associated with the wearable device and/or one or more functions of the wearable device. For example, wearable device 110 may receive, from the wearer, input indicating a level of security associated with the wearable device, which may include a set of information required to authenticate the wearer. The information required to authenticate the wearer may include at least one of biometric information, a gesture, a typed password, or a spoken password. In some embodiments, the level of security is associated with a functionality of the wearable device.

In some embodiments, the wearer may configure the wearable device to require an authentication gesture to operate the data capture functions without restriction and may require biometric information and or/gesture information to authenticate the wearer to access data, e.g., profile data, stored on the wearable device. In other embodiments, operation module 1706 may cause the wearable device 110 to enter a restricted mode after a predetermined period of time during which authentication information is not collected by data capture devices. For example, if the wearer removes the device and places it on a table, the wearable device may enter a restricted mode after a predetermined time period (e.g., after 30 seconds, after a minute, after five minutes, etc.).

Figure 18A:
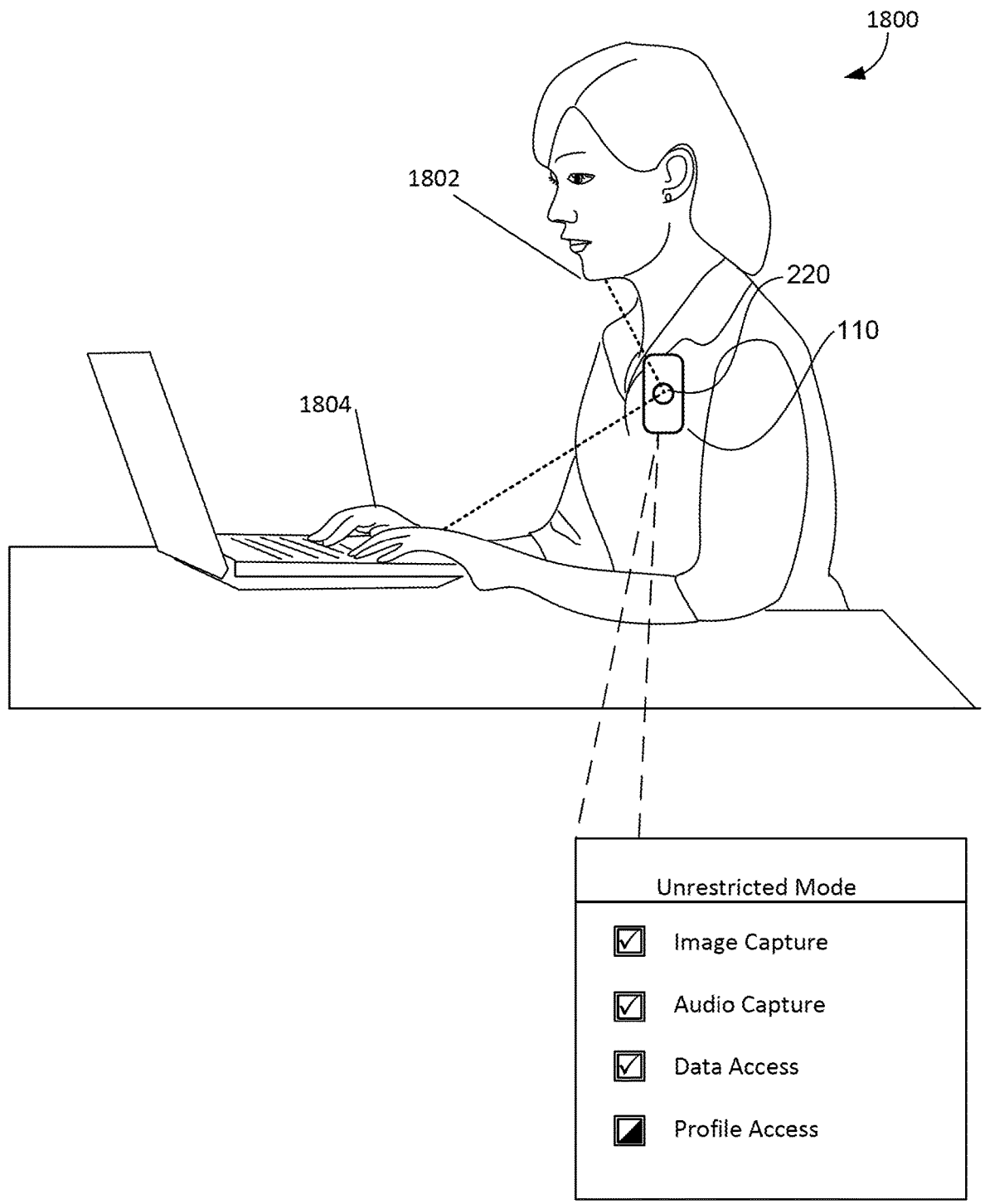
FIG. 18A is a schematic illustration of an example of an authenticated user wearing a wearable device according to a disclosed embodiment.

FIG. 18A illustrates an example of a wearer 1800 of the wearable device 110. A sensor, e.g., image sensor 220, may capture a plurality of images including image data indicative of the wearer's face (including, for example, chin 1802) and/or the user's hands 1804. Analysis module 1702 may receive the image data from image sensor 220 and analyze the image data to identify, for example, one or more features of the user's face (e.g., chin 1802) and/or hands 1804 of the wearer 1800. Based on a comparison of the feature data with feature data stored as identification data in database 1708, authentication module 1704 may authenticate the wearer 1800.

Upon verification by authentication module 1704, operation module 1706 may cause the wearable device 110 to operate in an unrestricted mode. The unrestricted mode may cause the device to operate image capture, audio capture, and data access functions without restriction. In some embodiments, wearable device 110 may store profile data associated with an authenticated wearer. Upon authentication based on feature recognition of the wearer's face (e.g., chin 1802) and/or hands 1804, unrestricted mode may require further authentication of the wearer before the wearer may access and/or modify certain profile information. As an example, wearable device 110 may require that wearer 1800 speak a password or perform a hand gesture prior to an attempt to modify profile information. The user may be authenticated based on at least two of the biometric information, the gesture, and the spoken password. In another example, the user may be required to enter a password using an associated computing platform, such as a mobile phone paired with wearable device 110

Figure 18B:
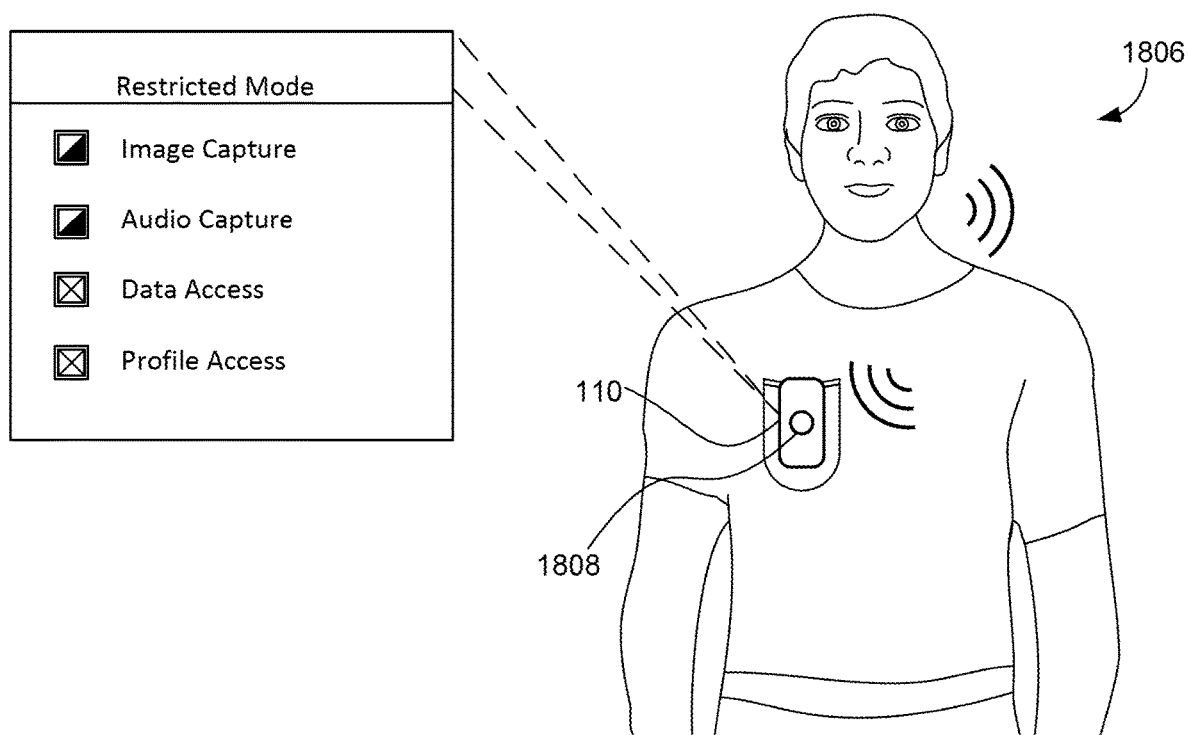
FIG. 18B is a schematic illustration of an example of an unauthenticated user wearing a wearable device according to a disclosed embodiment.

FIG. 18B illustrates an example of an unauthenticated wearer 1806 of a wearable device 110. A sensor, e.g., microphone 1808, may capture audio data spoken by the wearer 1806. Analysis module 1702 may receive the audio data from microphone 1808 and analyze the audio data to identify a password spoken by the wearer 1806 and/or to execute a voice recognition algorithm. Based on a comparison of the audio data with audio data stored as identification data in database 1708, authentication module 1704 may determine the wearer 1806 is not an authorized user of wearable device 110. In some embodiments, authentication module 1704 may require both password and voice recognition to authenticate a user. In other embodiments, authentication module 1704 may require either password or voice recognition information.

Once authentication module 1704 determines that wearer 1806 is unauthenticated, operation module 1706 may cause the wearable device 110 to operate in a restricted mode. In some embodiments, the restricted mode may cause image capture and audio capture functions to operate at a restricted capacity, e.g., by collecting information at a lower frequency, lower resolution, or another different parameter than in an unrestricted mode. In restricted mode, the wearer 1806 may not have access to data or profile data stored on wearable device 110. In some embodiments, when an unauthenticated wearer is identified, wearable device 110 may cause an alert to be provided via a display of a device associated with an authenticated user.

Figure 19:
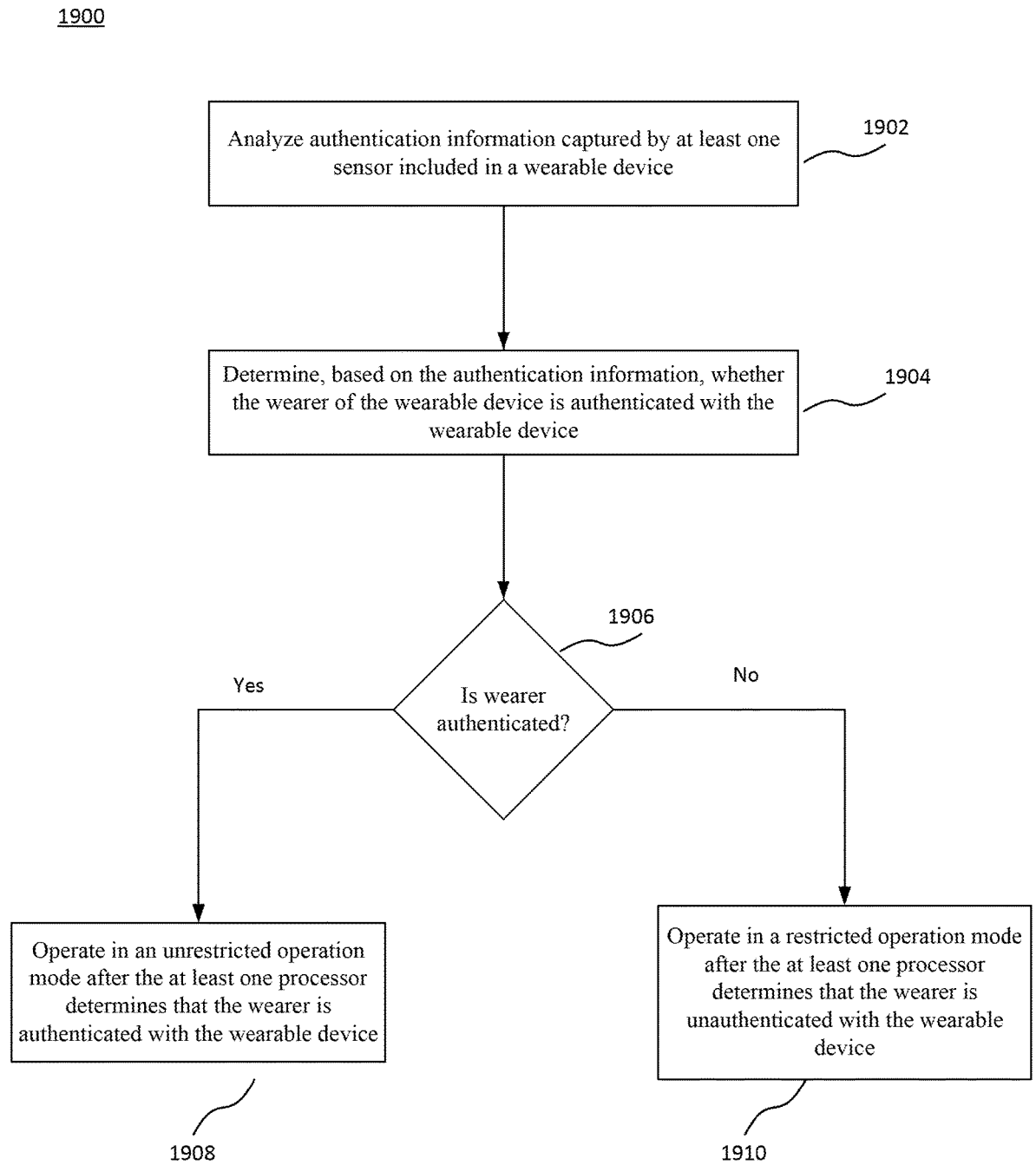
FIG. 19 is a flowchart of an example of a method for authenticating an identity of a user of a wearable apparatus.

FIG. 19 illustrates a flowchart of an example method 1900 for authenticating an identity of a wearer of a wearable device and operating in accordance with the authentication results. Method 1900 may be implemented by at least one processing device (e.g., one or more processors of server 250) receiving information from one or more sensors (e.g., image sensor 220 of wearable apparatus 110). For example, the processing device may analyze authentication information captured by at least one sensor included in the wearable device; determine, based on the authentication information, whether the wearer of the wearable device is authenticated with the wearable device; and operate in an unrestricted operation mode after the at least one processor determines that the wearer is authenticated with the wearable device.

At step 1902, the processing device may analyze authentication information captured by at least one sensor included in the wearable device. For example, analysis module 1702 may receive image data from an image sensor, audio data from a microphone, gait pattern data from an accelerometer, and/or biometric information from a biometric sensor. As previously described, analysis module 1702 may use one or more data processing algorithms to identify features of the received data. For example, the at least one sensor includes at least one image sensor, and the at least one processor is further configured to detect whether the wearer of the housing is authenticated with the wearable device based on analysis of a plurality of images captured by the at least one image sensor. Analysis module 1702 may use image processing algorithms to identify a face of the wearer or one or more data processing algorithms to determine an average gait pattern of the wearer.

At step 1904, the processing device may determine whether the wearer of the wearable device is authenticated with the wearable device. As previously described, authentication module 1704 may compare the collected authentication information generated by analysis module 1702 with identification information indicative of an authorized wearer stored in database 1708. Based on the degree to which the authentication information corresponds to the identification information, authentication module 1704 may make a determination of whether the wearer is authenticated. In some embodiments, a wearer may be authenticated if the authentication information is a match to the identification information by a predetermined amount, e.g., 98% match, 95% match, etc. In other embodiments, a match may be associated with a threshold, e.g., between a 98% and 95% match.

In some embodiments, in cases in which available information is not sufficiently clear as to whether or not the wearer is authenticated or unauthenticated (for example, the certainty is between two thresholds or lower than a predetermined threshold), a default mode may be used. In some embodiments, the default mode may be the restricted operation mode.

In some embodiments, the authentication information includes at least one of biometric information, a gesture, or a spoken or otherwise entered (e.g., typed) password. Biometric information may include at least one of a fingerprint of the user, a voice of the user, or a face of the user. Step 1904 may include determining whether the wearer of the wearable device is authenticated by comparing biometric information captured by the at least one sensor with biometric information stored in a memory of the wearable device. In another embodiment, determining whether the wearer of the wearable device is authenticated may comprise comparing the gesture with a predefined gesture stored in a memory of the wearable device. In another embodiment, determining whether the wearer of the wearable device is authenticated comprises comparing the spoken password with audio data stored in a memory of the wearable device.

At step 1906, operation module 1706 may receive an indication of whether the wearer was authenticated by authentication module 1704. If the wearer is authenticated, at step 1908, the processing device may cause the wearable device to operate in an unrestricted operation mode. If the wearer is unauthenticated, at step 1910, the at least one processor is further configured to operate in the restricted operation mode after the at least one processor detects that the wearer of the housing is not authenticated with the wearable device. In some embodiments, the processing device may restrict at least one data capturing function during operation in the restricted operation mode. For example, the at least one data access function may include providing access to data associated with a profile of an authenticated user of the wearable device, such that the processing device prevents the wearer from accessing the data associated with the profile during operation in the restricted operation mode and permits the wearer to access the data associated with the profile during operation in the unrestricted operation mode. Alternatively or in addition, if the wearer is unauthorized, the wearable device may prompt the wearer to provide additional authentication information.

In some embodiments, the at least one sensor may include at least one image sensor, the at least one data capturing function may include image capturing, and the at least one processor may be configured to capture images less frequently or at lower resolution during operation in the restricted operation mode than during operation in the unrestricted operation mode. In other embodiments, the at least one sensor may include at least one microphone, the at least one data capturing function may include audio capturing, and the at least one processor may be further configured to capture audio less frequently or at lower quality during operation in the restricted operation mode than during operation in the unrestricted operation mode. Further, the processing device may be configured to prevent at least one data capturing function during operation in the restricted operation mode and/or to restrict at least one data access function during operation in the restricted operation mode.

Automatic Low Radiation Mode for a Wearable Device

To reduce radiation to the wearer, a wearable camera system may detect whether it is currently being worn, and if so, remain in a low radiation mode. In some embodiments, the disclosed apparatus and methods may address concerns regarding exposure to radiation from, for example, a transmitter or transducer (e.g., a cellular transmitter or transducer or a Wi-Fi transmitter or transducer) of a wearable apparatus. For example, higher radiation generating activities of the apparatus may occur when the apparatus is not being worn by the user. On the other hand, non-essential functions, such as remote transmissions, may be reserved for a time when the apparatus detects that it is not being worn.

In some embodiments, the wearable apparatus may be a wearable device, e.g., device 110, having a housing configured to be worn by a user and containing at least one sensor (e.g., image sensor 220) configured to generate an output indicative of at least one aspect of an environment of the user. In some embodiments, the at least one sensor may include, either alone or in combination, a microphone configured to capture audio and/or at least one image sensor configured to capture images. The housing of wearable device 110 may be configured for attachment to an article of clothing, for example, a shirt (shown in FIG. 9), eyeglasses (shown in FIG. 1A), a necklace (shown in FIG. 1B), a belt (shown in FIG. 1C), a watch (shown in FIG. 1D), and/or any other article of clothing.

In some embodiments, the housing may contain a transducer or a transmitter and at least one processor. The transducer or transmitter may be, for example, a cellular transmitter or receiver or a Wi-Fi transmitter or receiver. The transducer or transmitter may be configured to alternately operate in a normal radiation mode and a low radiation mode. For example, the transmitter may be permitted to function at a normal capacity when operating in the normal radiation mode and at a reduced capacity when operating in the low radiation mode. During operation at the normal capacity the transmitter may transmit at a higher radiation intensity than during operation at the reduced capacity.

In some embodiments, at least one processing device may detect, based on the output generated by the at least one sensor, whether the housing is currently worn by the user and cause the transmitter to operate in the low radiation mode after detecting that the housing is being worn by the user. In another embodiment, the at least one processing device may be configured to cause the transmitter to operate in the normal radiation mode after detecting that the housing is not being worn by the user. In some embodiments, at least one processing device of wearable device 110 may detect, based on the output generated by at least one sensor, whether the housing is in an environment associated with the low radiation mode and cause the transmitter to operate in the low radiation mode after detecting the housing is in an environment associated with the low radiation mode. For example, the at least one processor may be configured to cause the transmitter to operate in the normal radiation mode after detecting that the housing is in an environment associated with the normal radiation mode. An environment associated with a low radiation mode may include, for example, an elevator or a vehicle. An environment associated with a normal radiation mode may be, for example, an outdoor location.

As discussed above, system 200 may comprise a wearable apparatus 110, worn by user 100, and an optional computing device 120 and/or a server 250 capable of communicating with wearable apparatus 110 via a network 240. Consistent with this disclosure, apparatus 110 may analyze image data, audio data, and/or other data received from one or more sensors to determine one or more aspects of the environment of the wearer, as described in greater detail below. Apparatus 110 may also transmit information to computing device 120, which may be, for example, a smartphone or tablet having a dedicated application installed therein. A graphical user interface (GUI) including a plurality of user-adjustable radiation settings may be included on display 260 of computing device 120 to visibly provide an interface for customizing transmission modes or associating certain aspects with low or high transmission modes. Additionally or alternatively, server 250 may receive information based on image data captured by wearable apparatus 110, server 250 may analyze the received information to determine one or more aspects of the environment of the wearer and alter the operation of a transmitter of the wearable device.

Figure 20:
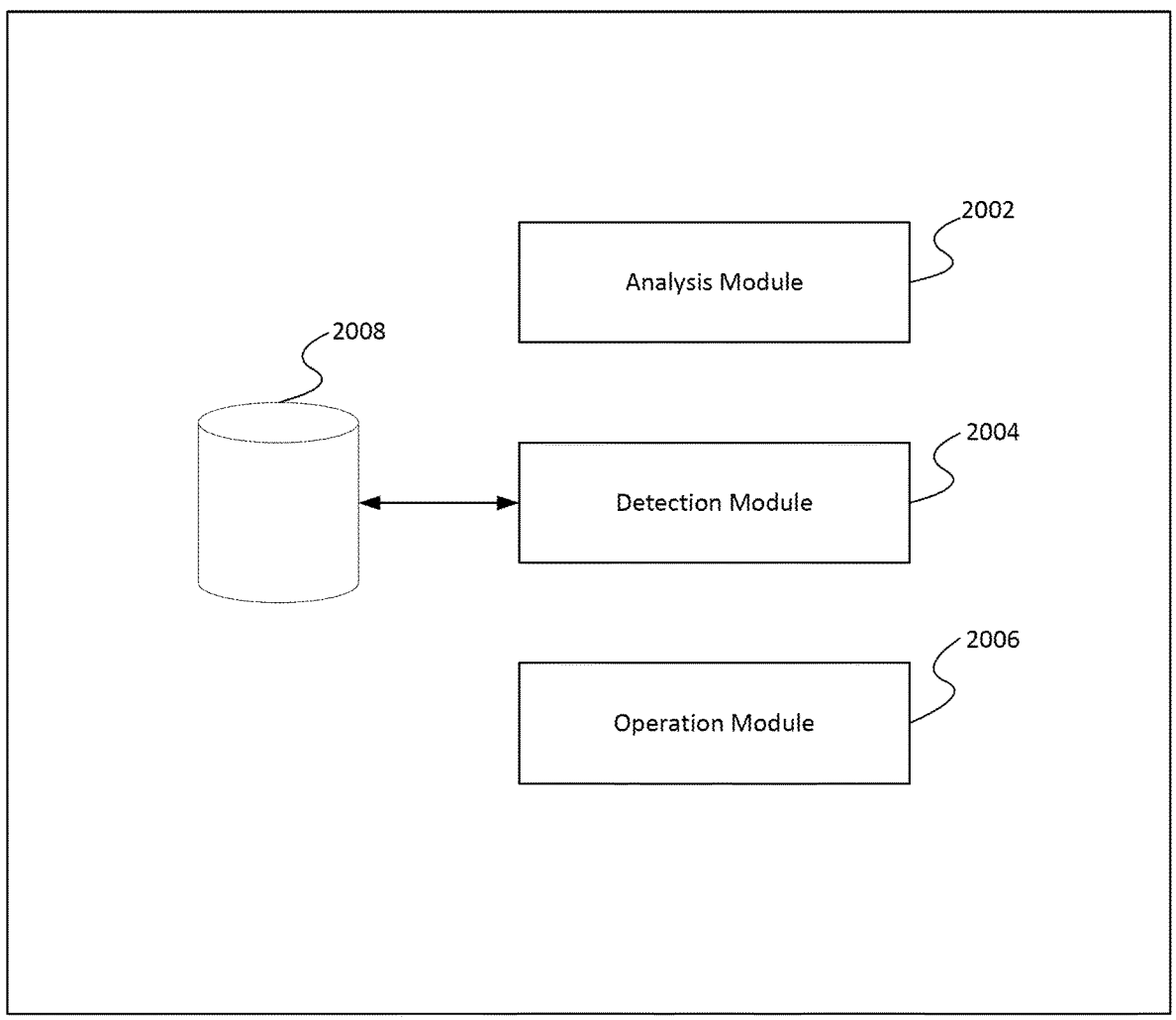
FIG. 20 illustrates an exemplary embodiment of a memory containing software modules consistent with the present disclosure.

FIG. 20 illustrates an exemplary embodiment of a memory containing software modules consistent with the present disclosure. In particular, as shown, memory 2000 may include an analysis module 2002, a detection module 2004, an operation module 2006, and a database 2008. Modules 2002, 2004, and 2006 may contain software instructions for execution by at least one processing device, e.g., processor 210, included with a wearable device (e.g., wearable apparatus 110). Analysis module 2002, detection module 2004, operation module 2006, and database 2008 may cooperate to analyze a captured image or other input, determine one or more aspects present in the environment of the user, and cause the device to operate in either a normal radiation mode or a low radiation mode. In some embodiments, memory 2000 may be included in, for example, memory 550, discussed above. Further, in other embodiments, the components of memory 2000 may be distributed over more than one location (e.g. stored in a server 250 in communication with, for example, network 240).

In some embodiments, analysis module 2002 may analyze at least one image captured by an image sensor included in the housing of the wearable device from an environment of a user of the wearable device. Analysis module 2002 may be configured to identify one or more aspects in the at least one image. For example, an aspect may be an object (e.g., tree, vehicle, computer, etc.). The combination of one or more detected aspects may be indicative of a particular environment (e.g., an office, the interior of a vehicle, an elevator, etc.) An aspect may also include a portion of the wearer's face and/or a portion of the wearer's clothing, indicating that the device is currently worn by the wearer.

Analysis module 2002 may include software instructions for receiving data from wearable apparatus 110, such as a wearable camera system, and may include software instructions for analyzing data obtained by one or more sensors of wearable apparatus 110 to identify one or more aspect present in the environment of the wearer. Data received from the one or more sensors may include audio and image data, captured by, for example, an image sensor or a microphone associated with the wearable device. Analysis module 2002 may use voice recognition techniques to identify a voice or a particular word spoken by the wearer in audio data captured by the microphone. For example, such techniques may identify a voice using voice recognition or one or more sounds indicative of a particular environment (e.g., a meeting, a presentation, a restaurant, etc.). Image data may include raw images and may include image data that has been processed or processing results thereof. Raw images may be provided, for example, in the form of still images and video data, either with or without embedded metadata. In some embodiments, image data and audio data may be preprocessed prior to being handled by analysis module 2002. Preprocessing may include, for example, noise reduction, artifact removal, compression, and other image preprocessing techniques.

In some embodiments, analysis may be performed by performing a facial recognition algorithm designed to detect facial features (e.g. mouth, eyes, etc.), facial contours, paralinguistic indicators such as facial gestures or expressions, body shape, or any other suitable identifying feature of a person. In other embodiments, at least one person may be identified using a thermal signature algorithm designed to detect the presence of at least one person based on the heat generated by the at least one person. In such embodiments, the wearable device 110 may capture thermal images, either alone or in combination with visual images, for processing by the thermal signature algorithm. Thermal recognition of the at least one person may be desirable in implementations in which wearable device 110 is operating in reduced lighting situations. In some embodiments, at least one person may be identified through application of one or more classification techniques. For example, at least one image classification technique may be used to classify at least one aspect of an image, such as one or more objects present in the image, the one or more objects being indicative of an environment of the wearer. In some embodiments, an image classification technique may include at least one or more of image enhancement, edge detection, image analysis, and data extraction.

Detection module 2004 may then determine one or more aspects or features of the environment of the wearer based on information from analysis module 2002. For example, detection module 2004 may query a database 2008 to identify an environment associated with one or more aspects identified by analysis module 2002. For example, analysis module 2002 may analyze image data to identify a desk and a desktop computer present in the environment of the user. Based on these aspects (i.e., the desk and the computer), detection module 2004 may receive information from database 2008 associating a desk and a computer with an office environment. Additionally, analysis module 2002 may use one or more data processing algorithms to identify audio data indicative of one or more environments, e.g., sounds indicative of a restaurant.

Detection module 2004 may receive indications of one or more aspects identified by analysis module 2002 and query database 2008 to identify one or more environments associated with the received aspects. For example, detection module 2004 may receive data indicative of a television and coffee table and query database 2008 to identify an environment of a "living room" associated with the detected aspects.

In some embodiments, detection module 2004 may detect whether the housing is currently worn by the user by identifying at least a portion of the user in at least one of the captured images. For example, analysis module 2002 may identify the portion of the user in at least one of the captured images based on a proximity of the user to the at least one image sensor. The portion of the user may include a chin, hand, arm, etc., of the user. Furthermore, identification of non-movement for at least some time period (e.g., 30 seconds, 1 minute, 5 minutes, 10 minutes, etc.) may also indicate that the user is not wearing the device.

Based on the environment determined by detection module 2004, operation module 2006 may cause the wearable apparatus to operate in normal radiation mode, if the wearer is in an environment associated with a normal radiation mode in database 2008. If the wearer is in an environment associated with a low radiation mode, operation module 2006 may cause the transmitter to operate at a reduced capacity. For example, detection module 2004 may identify an environment of "an elevator," which is associated with a low radiation mode because the surrounding elevator inhibits the transmission of data to and from the wearable device. Thus, to reduce battery consumption and/or the radiation to the wearer, operation module 2006 may cause the transmitter to operate in a low radiation mode. In some embodiments, operation module 2006 may cause the transmitter to operate in an idle mode in which the transmitter is switched off while the wearer is in an environment that inhibits data transmissions.

In some embodiments, operation module 2006 may control the transmitter by causing the transmitter to transmit to an external device during operation in the normal radiation mode and/or preventing the transmitter from transmitting to an external device during operation in the low radiation mode. An external device may be, for example, a smartphone, a tablet, a smartwatch, and/or a server. In another embodiment, operation module 2006 may cause the transmitter to transmit to an external device at a first data transfer rate during operation in the normal radiation mode and may cause the transmitter to transmit to the external device at second data transfer rate during operation in the low radiation mode, the second data transfer rate being lower than the first data transfer rate. In other embodiments, the low radiation mode may include a mode in which the at least one transmitter is prevented from receiving data from an external device, a mode in which the at least one transmitter is prevented from transmitting data to an external device, a mode in which the at least one transmitter is switched off. Operation module 2006 may also cause the transmitter to transmit a notification to an external device indicating whether the transmitter is operating in the normal radiation mode or the low radiation mode.

Figure 21A:
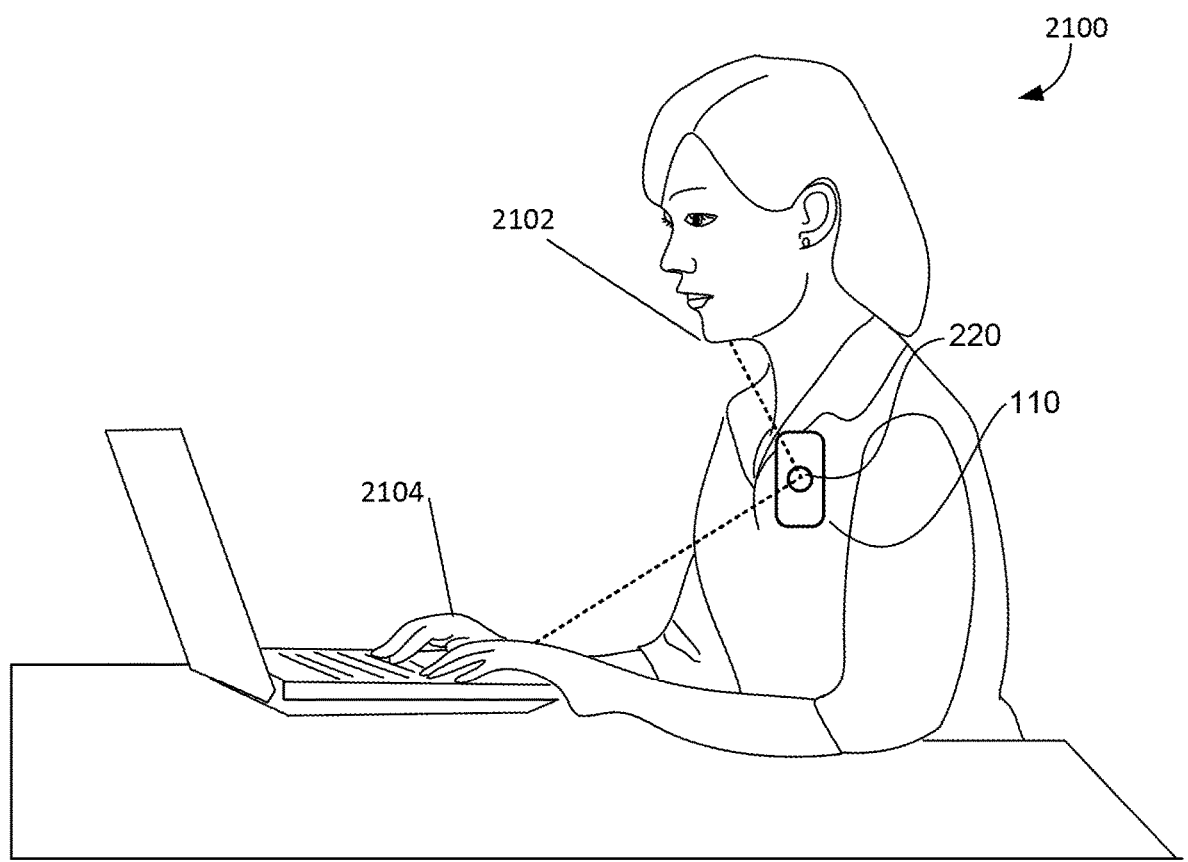
FIG. 21A is a schematic illustration of an example of a wearable device worn by a user according to a disclosed embodiment.

FIG. 21A illustrates an example of a wearer 2100 of the wearable device 110. The device may include at least one sensor such as, for example, at least one image sensor (e.g., image sensor 220) that may be configured to capture images. The sensor, e.g., image sensor 220, may capture a plurality of images including image data indicative of a number of aspects including the wearer's face (e.g., such as chin 2102) and/or hands 2104. In other embodiments, one or more aspects may include clothing associated with the user, for example, a portion of the wearer's blouse collar or an accessory, such as a watch, worn by the wearer. At least one processor of the device may be configured to detect whether the housing is currently worn by the user by identifying clothing associated with the user in at least one of the captured images. Analysis module 2002 may, for example, identify clothing associated with the user in at least one of the captured images based on a proximity of the clothing to the at least one image sensor.

In another embodiment, determining that the housing is currently worn by the wearer comprises at least one of performing voice recognition on the audio information or comparing the audio information to a predetermined volume threshold. In other embodiments, a biometric sensor of the wearable device 110 may receive biometric information, such as a heartrate, indicating the device is currently worn by user 2100.

Detection module 2004 may receive the aspect information, e.g., the proximity of clothing, a feature of the wearer's face (e.g., the wearer's chin 2102), and/or the wearer's hands 2104, from analysis module 2002 and query database 2008 to identify one or more environments associated with the identified aspects. For example, detection module 2004 may determine that the identified aspects, e.g., the wearer's chin 2102 and hands 2104, are indicative that the user is currently wearing the wearable device.

After determining that the user 2100 is currently wearing the wearable device 110, operation module 2006 may cause the wearable device 110 to operate in a low radiation mode to reduce the amount of radiation to the wearer. Low radiation mode may be associated with, for example, the transmitter operating at a reduced capacity. In another embodiment, a low radiation mode may be associated with a mode in which the transmitter is shut off such that no data is sent from or received by the transmitter.

Figure 21B:
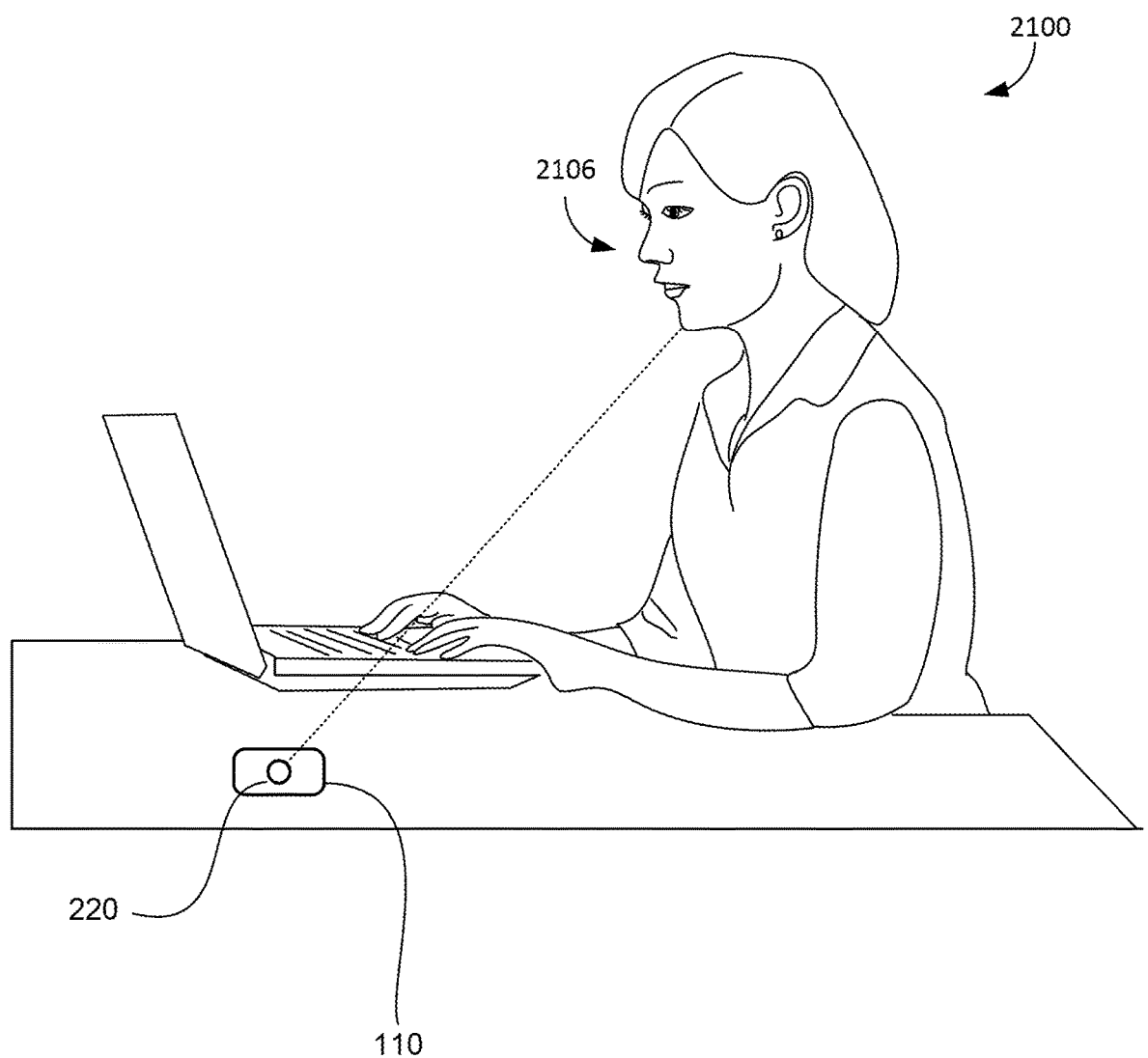
FIG. 21B is a schematic illustration of an example of a wearable device not worn by a user according to a disclosed embodiment.

FIG. 21B illustrates an example of user 2100 of a wearable device 110. In FIG. 21B, wearable device 110 is not currently worn by wearer 2100. Analysis module 2002 may receive image data indicative of the face 2106 of the user. Analysis module 2002 may use one or more facial recognition techniques to identify the face 2106 of the user 2100 in the images captured by image sensor 220. Analysis module 2002 may determine one or more aspects, for example, capture angle, the identity of the user associated with face 2106, proximity of the user 2100, etc. A fixed or stationary image (e.g., an image in which the image frame does not change position) may indicate that wearable device 110 is not currently worn by user 2100.

Based on the aspect data received from analysis module 2002, detection module 2004 may determine that the user 2100 is not currently wearing device 110, for example, based on the angle at which the image sensor 220 captured images of the user's face 2106. As another example, analysis module 2002 may analyze one or more images that are fixed or stationary to determine that wearable device 110 is not being currently worn. Detection module 2004 may provide operation module 2006 an indication of an environment (e.g., the device is not currently worn by the user), such that operation module 2006 causes the wearable device 110 to operate in a normal mode in which the transmitter operates at a normal capacity.

Figure 22A:
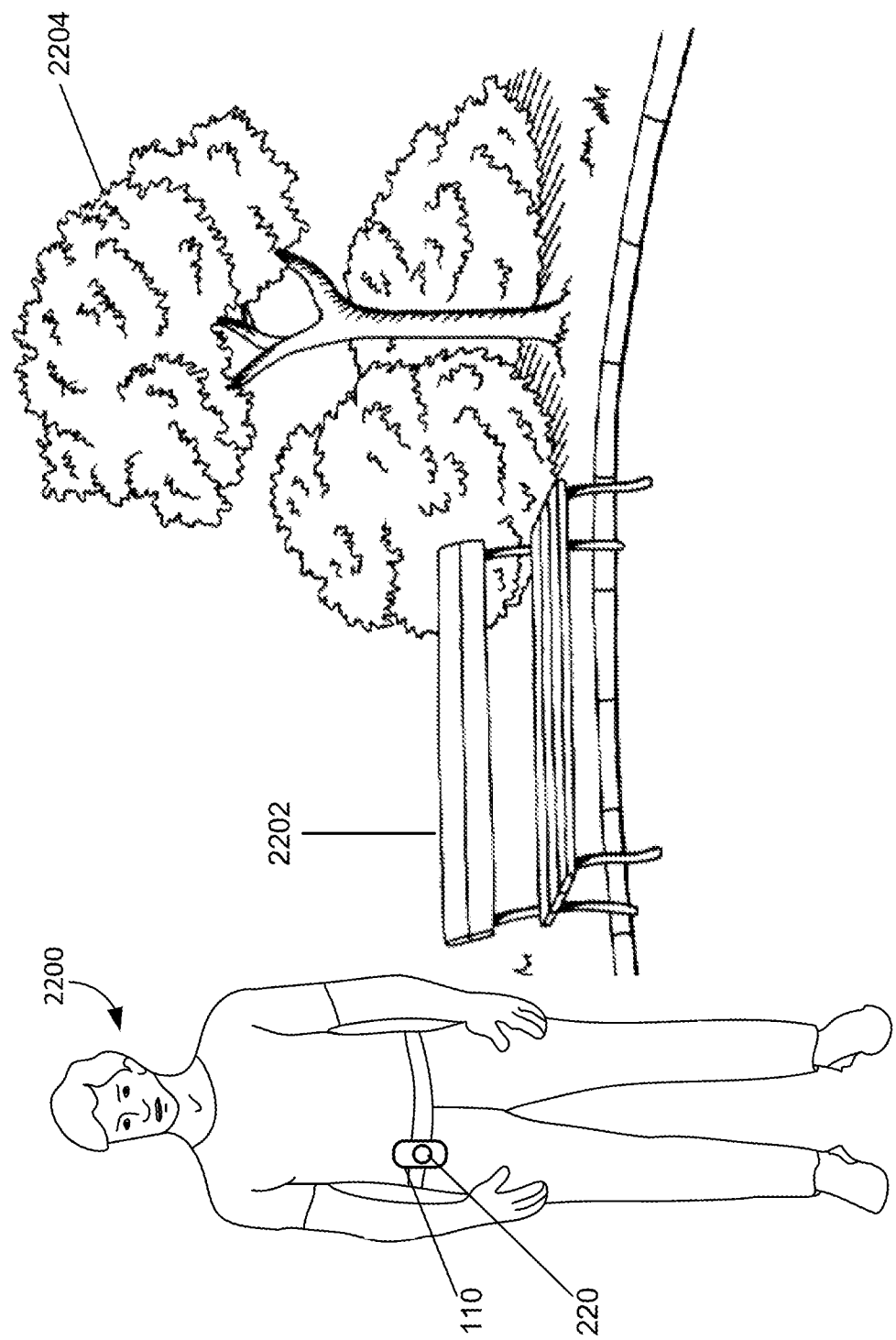
FIGS. 22A, 22B, and 22C are schematic illustrations of exemplary environments according to disclosed embodiments.

FIG. 22A illustrates an example of wearer 2200 of a wearable device 110 in an "outdoor" environment. Analysis module 2002 may receive image data from image sensor 220 and may process said image data to identify, for example, a park bench 2202 and one or more trees 2204, one or more cars, buildings, or the like. In another embodiment, analysis module 2002 may receive data indicative of an intensity of ambient light and determine that the wearer 2200 is in an area of natural light.

Based on the aspects (e.g., bench 2202 and trees 2204) received from analysis module 2002, detection module 2004 may determine that the user 2200 is in an outdoor environment that may be associated with a normal mode. Accordingly, operation module 2006 may cause the wearable device 110 to operate in a normal mode in which the transmitter operates at a normal capacity.

Figure 22B:
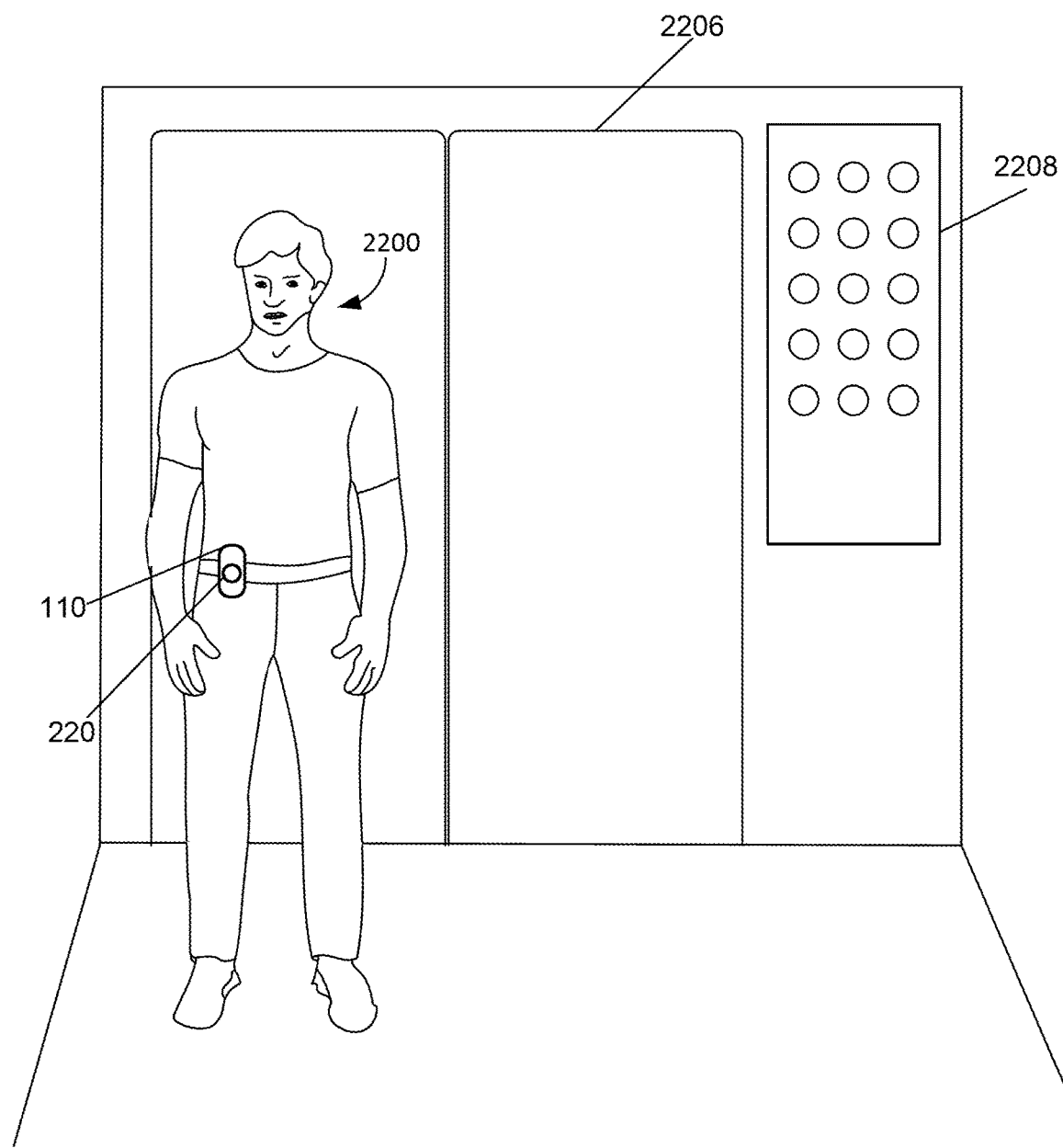

FIG. 22B illustrates an example of wearer 2200 of a wearable device 110 in an "elevator" environment. Analysis module 2002 may receive image data from image sensor 220 and may process said image data to identify, for example, double elevator doors 2206 and/or a panel of buttons 2208. In some embodiments, the wearable device 110 may include a microphone configured to capture audio data. For example, analysis module 2002 may receive audio data from the microphone and identify a "ding" or announcement at each floor as the elevator is in operation. Additional aspects may be, for example, the dimensions of the elevator and/or accelerometer information indicating the wearer 2200 is moving vertically.

Based on the aspects (e.g., doors 2206, panel 2208, and/or audio data indicative of an elevator environment) received from analysis module 2002, detection module 2004 may query database 2008 and determine that the user 2200 is in an elevator, which may be associated with a low radiation mode. Accordingly, operation module 2006 may cause the transmitter of the wearable device 110 to operate in a low radiation mode in which the transmitter operates at a reduced capacity.

Figure 22C:
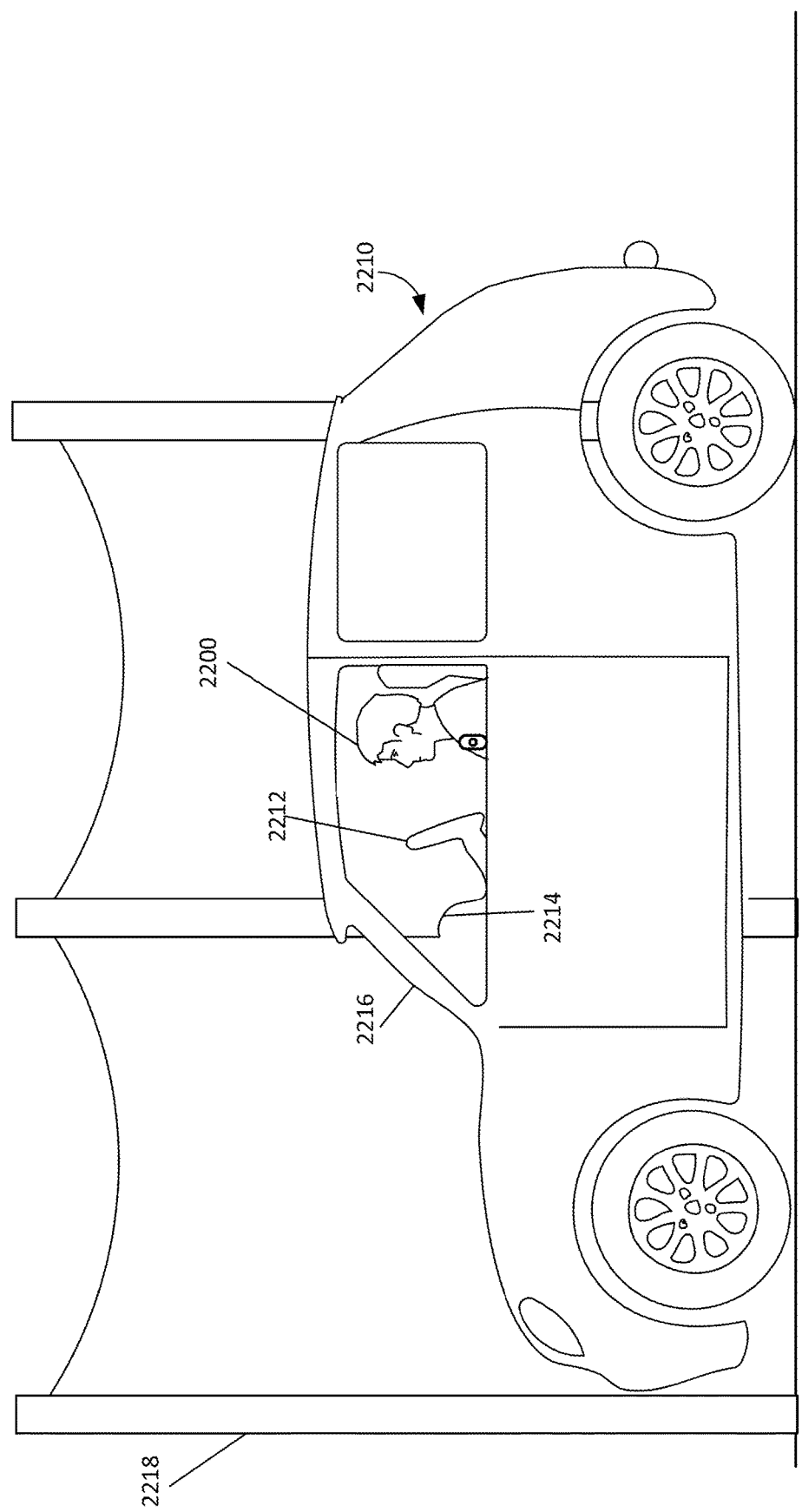

FIG. 22C illustrates an example of wearer 2200 of a wearable device 110 in a "vehicle" environment. Analysis module 2002 may receive image data from image sensor 220 and may process said image data to identify, for example, steering wheel 2212, dashboard 2214, windshield 2216, and/or other components of vehicle 2210. In some embodiments, analysis module 2002 may determine a speed and/or direction of travel of the wearer 220 based on an accelerometer of the device 110 and/or by analyzing the position of more or more objects (e.g., telephone pole 2218) in a series of images Analysis module 2002 may analyze the velocity of telephone pole 2218 and other objects outside the vehicle 2210 as compared to the vehicle component (e.g., steering wheel 2212, etc.) which appear stationary relative to the user 2200.

Based on the aspects (e.g., steering wheel 2212, dashboard 2214, windshield 2216, and/or a relative velocity of one or more objects outside the vehicle 2210) received from analysis module 2002, detection module 2004 may query database 2008 and determine that the user 2200 is in a vehicle, which may be associated with a low radiation mode. Accordingly, operation module 2006 may cause the transmitter of the wearable device 110 to operate in a low radiation mode in which the transmitter operates at a reduced capacity.

Figure 23:
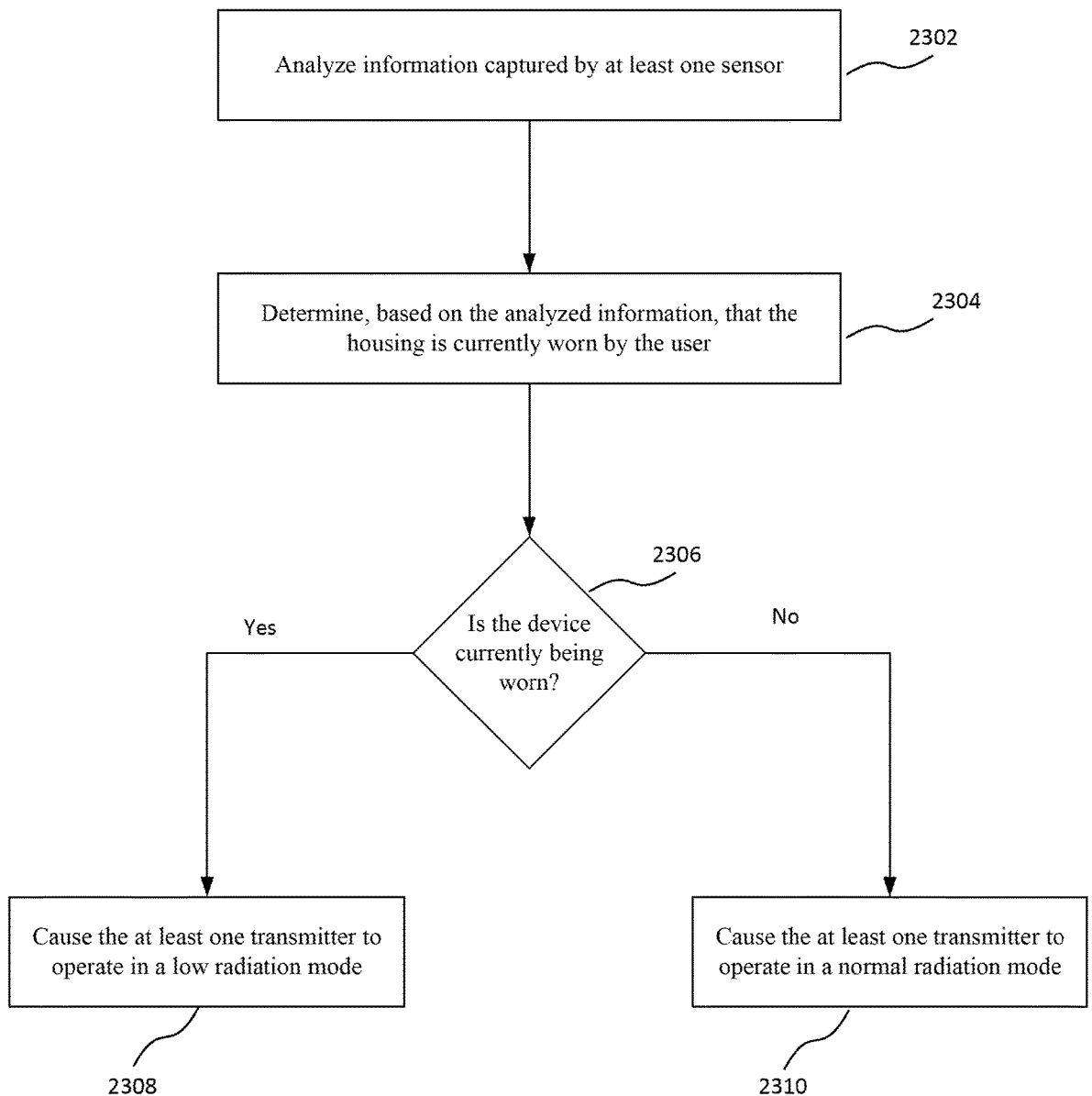
FIG. 23 is a flowchart of an example of a method for managing radiation exposure of a user of a wearable apparatus according to a disclosed embodiment.

FIG. 23 illustrates a flowchart of an example method 2300 for managing radiation exposure of a wearer of a wearable device. Method 2300 may be implemented by at least one processing device (e.g., one or more processors of server 250) receiving information from one or more sensors (e.g., image sensor 220 of wearable apparatus 110).

At step 2302, the processing device may analyze information captured by the at least one sensor. For example, analysis module 2002 may analyze information captured by the at least one sensor including at least one of image information, audio information, or biometric information. As previously described, analyzing captured information may comprise at least one of analyzing image information, analyzing audio information, analyzing accelerometer information, or analyzing biometric information. Analysis module 2002 may use one or more data processing algorithms to identify features of the received data. For example, analysis module 2002 may use image processing algorithms to identify a portion of the wearer or a portion of an article of clothing associated with the wearer.

At step 2304, the processing device may determine, based on the analyzed information, that the housing is currently worn by the wearer. As previously described, detection module 2004 may compare the aspects identified by analysis module 2002 with one or more aspects associated with an indication that the device is currently being worn in database 2008. Based on the degree to which the image information corresponds to the stored information (e.g., average proximity of the wearer's chin to the image sensor), detection module 2004 may determine whether the device is currently worn.

In some embodiments, in cases in which available information is not sufficiently clear as to whether or not to operate in the low radiation mode or the normal radiation mode (for example, the certainty is between two thresholds or lower than a predetermined threshold), a default mode may be used. In some embodiments, the default mode may be the low radiation mode.

At step 2306, operation module 2306 receives an indication of whether the wearer is currently wearing the device. If the wearer is wearing the device, at step 2308, the processing device may cause the at least one transmitter to operate in the low radiation mode in which the at least one transmitter is caused to function in a reduced capacity. In another embodiment, the at least one processing device may cause the at least one transmitter to operate in the low radiation mode when biometric information is detected by the at least one sensor. For example, a heartrate detected by a biometric sensor of the wearable device may indicate the device is currently worn by a user.

If the device is not currently worn by the user, at step 2310, the processing device may cause the at least one transmitter to operate in the normal radiation mode in which the at least one transmitter is permitted to function at a normal capacity. Thus, less radiation may be emitted by the device while operating in low radiation mode, since, at the normal capacity the transmitter transmits at a higher radiation intensity than during operation at the reduced capacity.

Figure 24:
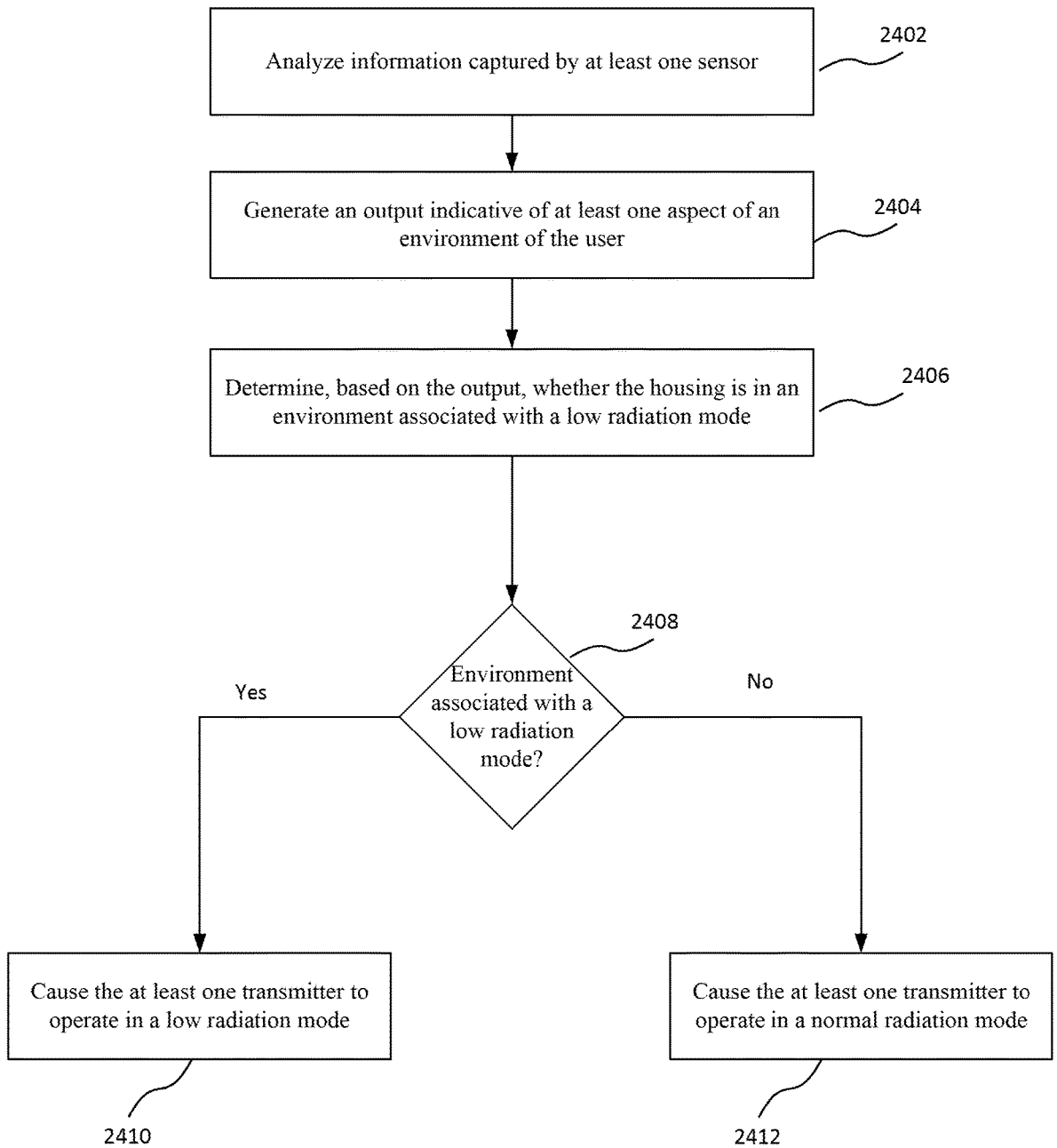
FIG. 24 is a flowchart of another example of a method for managing radiation exposure of a user of a wearable apparatus according to a disclosed embodiment.

FIG. 24 illustrates a flowchart of an example method 2400 for managing radiation exposure of a wearer of a wearable device. Method 2400 may be implemented by at least one processing device (e.g., one or more processors of server 250) receiving information from one or more sensors (e.g., image sensor 220 of wearable apparatus 110).

At step 2402, the processing device may analyze information captured by the at least one sensor. For example, analysis module 2002 may information captured by the at least one sensor including at least one of image information, audio information, or accelerometer information. As previously described, analyzing captured information may comprise at least one of analyzing image information, analyzing audio information, or analyzing accelerometer information.

At step 2404, analysis module 2002 may use one or more data processing algorithms to generate an output indicative of at least one aspect of an environment of the user. For example, analysis module 2002 may identify one or more aspects present in the environment of the wearer. Exemplary aspects may be one or more objects, one or more sounds, and/or velocity and/or acceleration information indicative of a particular environment.

At step 2406, the processing device may determine, based on the output, whether the housing is in an environment associated with a low radiation mode. As previously described, detection module 2004 may compare the aspects identified by analysis module 2002 with one or more aspects stored in database 2008 and associated with one or more environments. Detection module 2004 may use one or more algorithms to identify an environment stored in database 2008 that is associated with the one or more detected aspects. For example, an identified environment may be an environment associated with one or more aspects such that the one or more aspects are a 100%, 98%, 95%, etc., match with the aspects detected by analysis module 2002. In other embodiments, certain aspects may be weighted as having a greater correlation to an environment.

In some embodiments, in cases in which available information is not sufficiently clear as to whether or not to operate in the low radiation mode or the normal radiation mode (for example, the certainty is between two thresholds or lower than a predetermined threshold), a default mode may be used. In some embodiments, the default mode may be the low radiation mode.

At step 2408, operation module 2306 receives an indication of whether environment is associated with a low radiation mode. If the environment is associated with a low radiation mode, at step 2410, the processing device may cause the at least one transmitter to operate in the low radiation mode in which the at least one transmitter is caused to function in a reduced capacity.

If the environment is not associated with a low radiation mode, at step 2412, the processing device may cause the at least one transmitter to operate in the normal radiation mode in which the at least one transmitter is permitted to function at a normal capacity. Thus, less radiation may be emitted by the device while operating in low radiation mode, since, at the normal capacity the transmitter transmits at a higher radiation intensity than during operation at the reduced capacity.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable device, the wearable device comprising:
   a housing configured to be worn by a user;
   at least one image sensor in the housing, wherein the at least one image sensor is configured to capture images from an environment of the user;
   a transmitter in the housing; and
   at least one processor programmed to:
   alternatively operate in a normal radiation mode and a low radiation mode, wherein the transmitter is permitted to function at a normal capacity when operating in the normal radiation mode and the transmitter is caused to function at a reduced capacity when operating in the low radiation mode, and during operation at the normal capacity the transmitter transmits at a higher radiation intensity than during operation at the reduced capacity;

analyze at least one image captured by the at least one image sensor to detect whether the housing is currently worn by the user by identifying clothing associated with the user in the at least one image; and cause the transmitter to operate in the low radiation mode after detecting that the housing is being worn by the user.

2. The wearable device of claim 1, wherein the at least one processor is further configured to cause the transmitter to operate in the normal radiation mode after detecting that the housing is not being worn by the user.

3. The wearable device of claim 1, wherein the housing is configured for attachment to an article of clothing.

4. The wearable device of claim 1, wherein the transmitter includes a cellular transmitter or a Wi-Fi transmitter.

5. The wearable device of claim 1, wherein the at least one processor is further configured to identify clothing associated with the user in at least one of the captured images based on a proximity of the clothing to the at least one image sensor.

6. The wearable device of claim 1, wherein the at least one processor is further configured to detect whether the housing is currently worn by the user by identifying at least a portion of the user in at least one of the captured images.

7. The wearable device of claim 6, wherein the at least one processor is further configured to identify the portion of the user in at least one of the captured images based on a proximity of the user to the at least one image sensor.

8. The wearable device of claim 6, wherein the portion of the user includes a chin of the user.

9. The wearable device of claim 1, wherein the at least one processor is further configured to:

cause the transmitter to transmit to an external device during operation in the normal radiation mode; and prevent the transmitter from transmitting to an external device during operation in the low radiation mode.

10. The wearable device of claim 9, wherein the external device is selected from the group consisting of: a smartphone, a tablet, a smartwatch, and a server.

11. The wearable device of claim 1, wherein the at least one processor is further configured to:

cause the transmitter to transmit to an external device at a first data transfer rate during operation in the normal radiation mode; and cause the transmitter to transmit to the external device at a second data transfer rate during operation in the low radiation mode, the second data transfer rate being lower than the first data transfer rate.

12. The wearable device of claim 1, wherein the at least one processor is further configured to cause the transmitter to transmit a notification to an external device indicating whether the transmitter is operating in the normal radiation mode or the low radiation mode.

13. A wearable device, the wearable device comprising:

a housing configured to be worn by a user;

at least one image sensor in the housing, wherein the at least one image sensor is configured to capture images from an environment of the user;

a transmitter in the housing; and at least one processor programmed to:

alternatively operate in a normal radiation mode and a low radiation mode, wherein the transmitter is permitted to function at a normal capacity when operating in the normal radiation mode and the transmitter is caused to function at a reduced capacity when operating in the low radiation mode, and during operation at the normal capacity the transmitter transmits at a higher radiation intensity than during operation at the reduced capacity;

analyze at least one image captured by the at least one image sensor to detect whether the housing is in an environment associated with the low radiation mode, wherein the environment associated with the low radiation mode includes an elevator; and cause the transmitter to operate in the low radiation mode after detecting the housing is in an environment associated with the low radiation mode.

14. The wearable device of claim 13, wherein the at least one processor is further configured to cause the transmitter to operate in the normal radiation mode after detecting that the housing is in an environment associated with the normal radiation mode.

15. The wearable device of claim 13, wherein the environment associated with the low radiation mode includes a vehicle.

16. The wearable device of claim 13, wherein the environment associated with the normal radiation mode includes an outdoor location.

17. The wearable device of claim 13, wherein the at least one processor is further configured to cause the transmitter to transmit a notification to an external device indicating whether the transmitter is operating in the normal radiation mode or the low radiation mode.

18. A system for managing radiation exposure of a wearer of a wearable device, the system comprising:

a housing configured to be worn by the wearer, the housing comprising at least one image sensor and at least one transmitter, the at least one image sensor being configured to capture images from an environment of the wearer, and the at least one transmitter being permitted to function at a normal capacity when operating in a normal radiation mode and wherein the transmitter is caused to function at a reduced capacity when operating in a low radiation mode, such that during operation at the normal capacity the transmitter transmits at a higher radiation intensity than during operation at the reduced capacity; and at least one processor programmed to:

analyze at least one image captured by the at least one image sensor;

determine, based on the analysis of the at least one image, that the housing is currently worn by the wearer by identifying clothing associated with the wearer in the at least one image; and cause the at least one transmitter to operate in the low radiation mode when the wearable device is currently worn by the wearer.

19. The system of claim 18, wherein the at least one transmitter is a transceiver, and the low radiation mode comprises a mode in which the at least one transceiver is prevented from receiving data from an external device.

20. The system of claim 18, wherein the low radiation mode comprises a mode in which the at least one transmitter is prevented from transmitting data to an external device.

21. The system of claim 18, wherein the low radiation mode comprises a mode in which the at least one transmitter is switched off.

22. The system of claim 18, wherein the information captured by the at least one sensor includes at least one of image information, audio information, or biometric information.

23. The system of claim 22, wherein determining that the housing is currently worn by the wearer comprises at least one of performing voice recognition on the audio information or comparing the audio information to a predetermined volume threshold.

24. The system of claim 22, wherein the at least one processor is further programmed to cause the at least one transmitter to operate in the low radiation mode when biometric information is detected by the at least one sensor.

25. A method for reducing radiation to a wearer of a wearable device, the method comprising:

analyzing, via at least one processor included in the wearable device, at least one image captured by at least one image sensor from an environment of the wearer, the at least one image sensor being included in the wearable device;

determining, based on the analysis of the at least one image, that a housing is currently worn by the wearer by identifying clothing associated with the wearer in the at least one image, the housing comprising the at least one image sensor and at least one transmitter; and causing the at least one transmitter to operate in a low radiation mode when the wearable device is currently worn by the wearer, wherein the at least one transmitter is permitted to function at a normal capacity when operating in a normal radiation mode and wherein the transmitter is caused to function at a reduced capacity when operating in the low radiation mode, such that during operation at the normal capacity the transmitter transmits at a higher radiation intensity than during operation at the reduced capacity.

\* \* \* \* \*